United States Patent [19]

Mor et al.

[11] 4,396,979

[45] Aug. 2, 1983

[54] MICROPROCESSOR WITH IMPROVED ARITHMETIC LOGIC UNIT DATA PATH

[75] Inventors: Yeshayahu Mor, Santa Clara; Allan M. Schiffman, Mountain View, both of Calif.

[73] Assignee: Fairchild Camera & Instrument Corporation, Mountain View, Calif.

[21] Appl. No.: 155,153

[22] Filed: May 30, 1980

[51] Int. Cl.³ .............................................. G06F 7/48
[52] U.S. Cl. .................................................. 364/200
[58] Field of Search ... 364/200 MS File, 900 MS File

[56] References Cited

U.S. PATENT DOCUMENTS 4,106,090 8/1978 Erickson .............................. 364/200

4,301,505 11/1981 Catiller ................................. 364/200

Primary Examiner—Gareth D. Shaw
Assistant Examiner—Ronni S. Malamud
Attorney, Agent, or Firm—Kenneth Olsen; Michael J. Pollock; Warren M. Becker

[57] ABSTRACT

A microprocessor for facilitating the execution of instructions which require repetitive shift and arithmetic logic unit operations comprises an arithmetic logic unit having a first and a second input and an output, a plurality of registers, at least one of which is a bidirectionally shifting register and multiplexing apparatus for selectively coupling each of said plurality of registers to said first and said second inputs and said output of said arithmetic logic unit.

3 Claims, 74 Drawing Figures

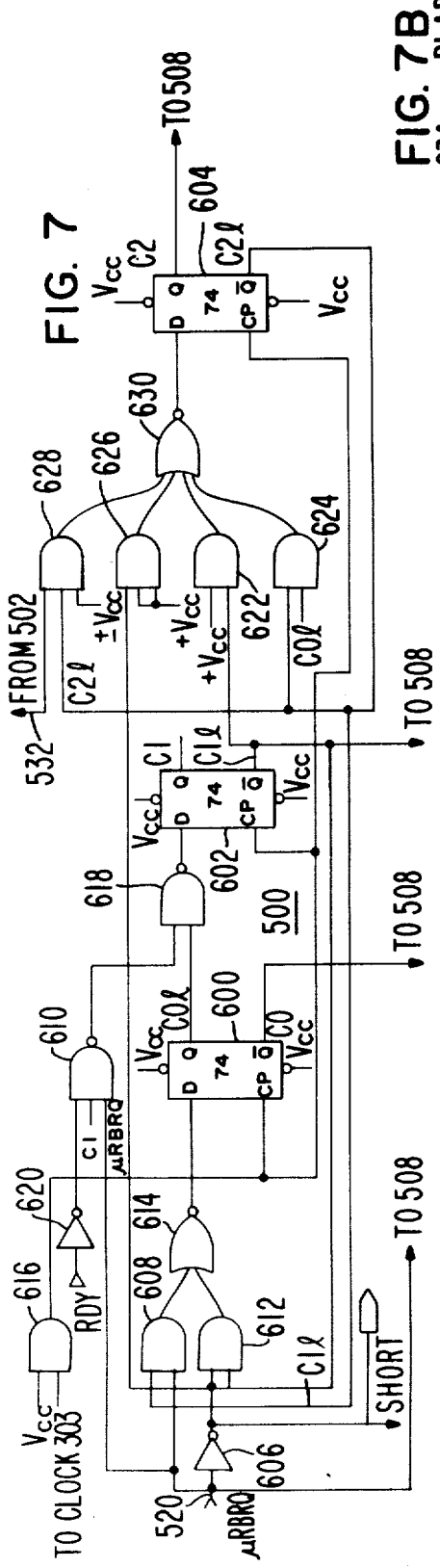

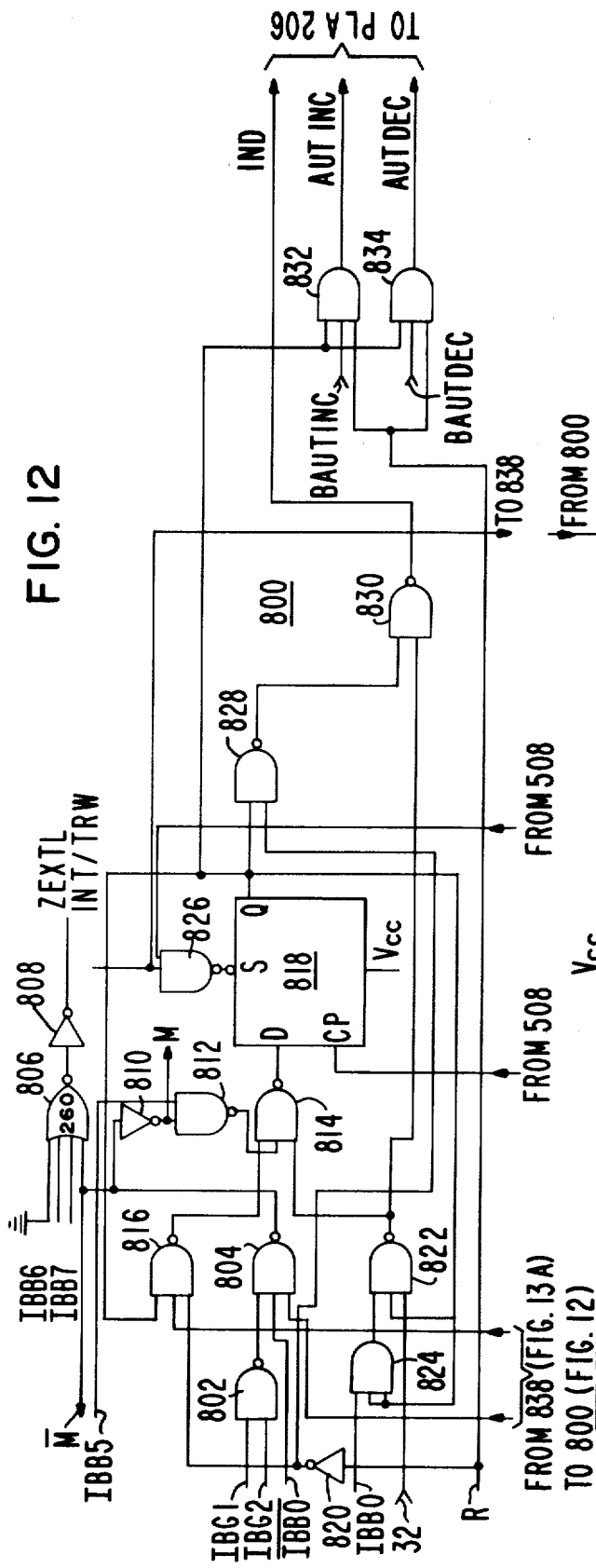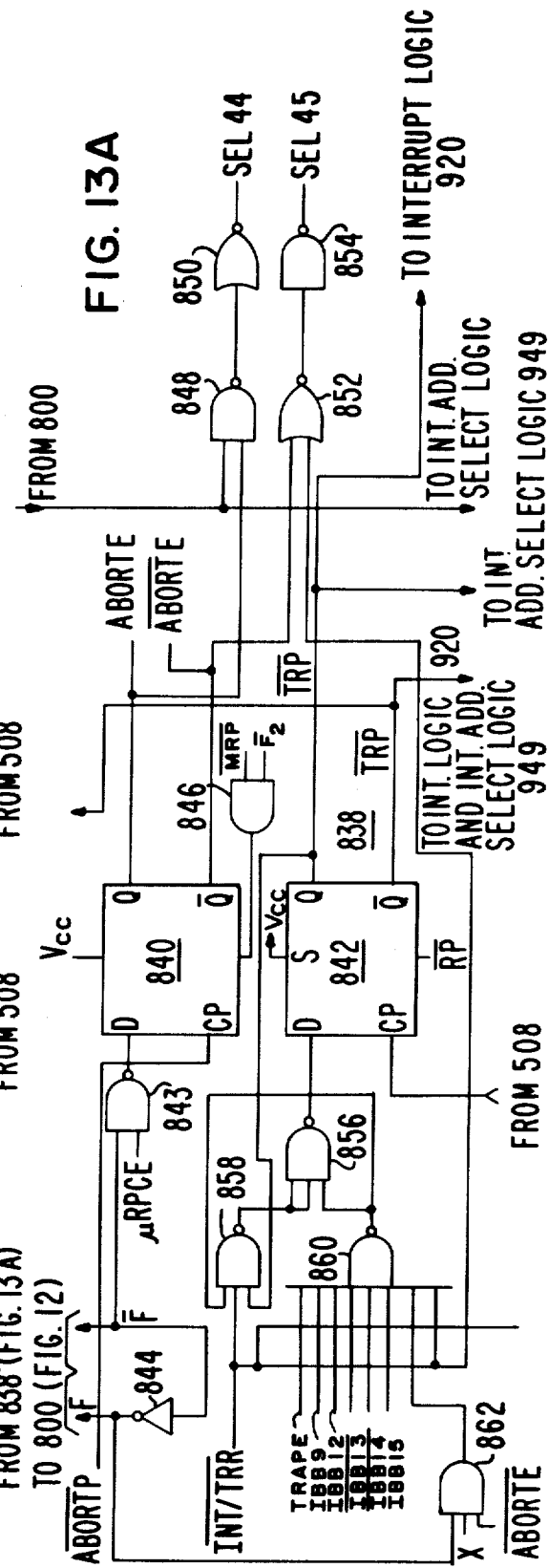

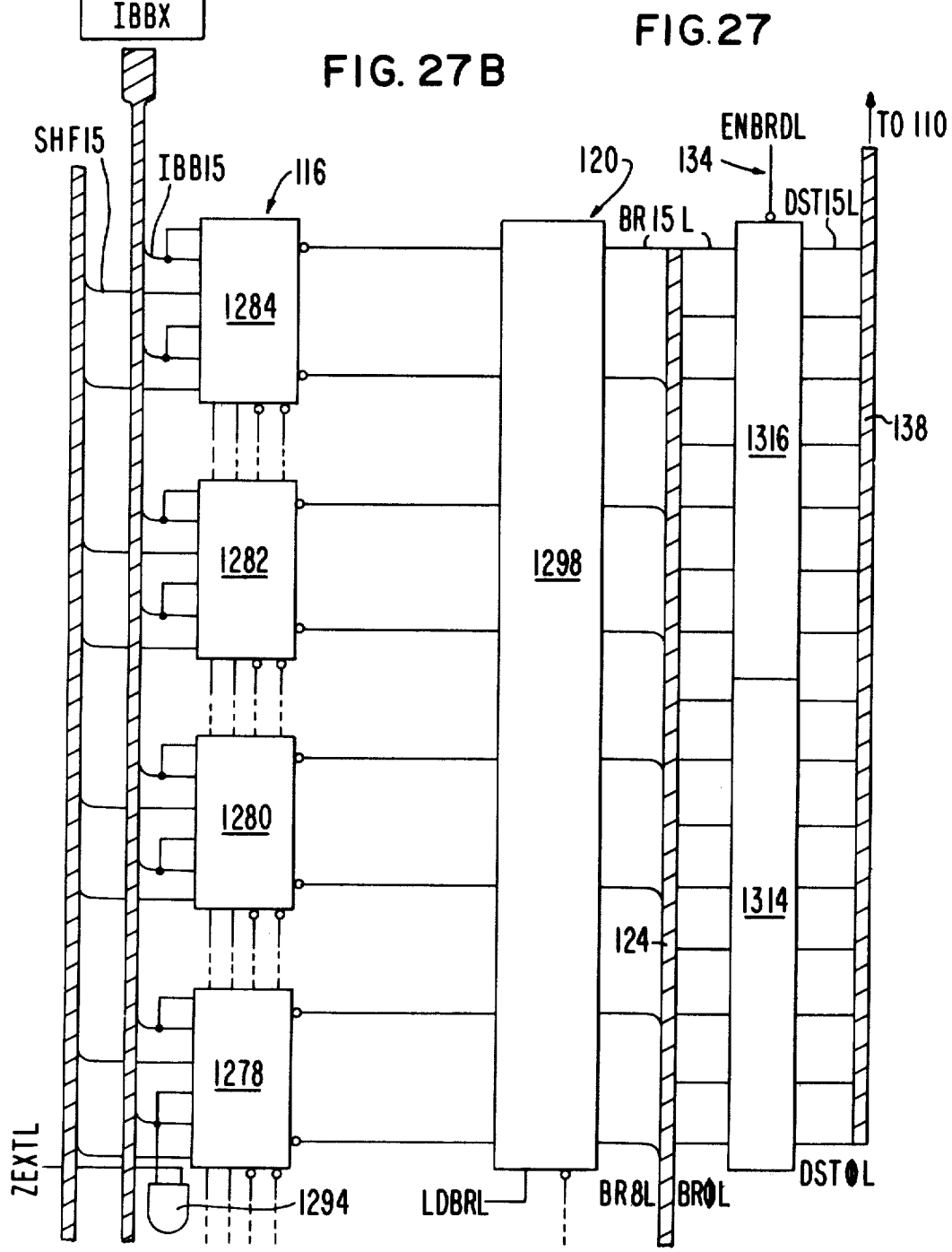

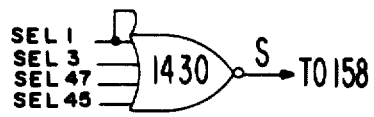 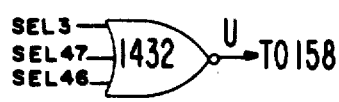 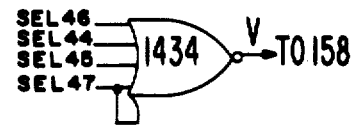
FIG. 30A  FIG. 30B  FIG. 30C
FIG. 31
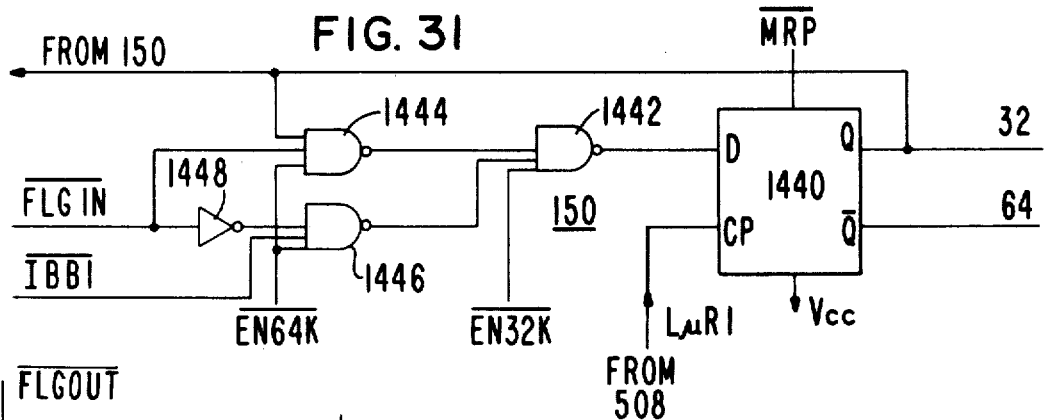
FIG. 32
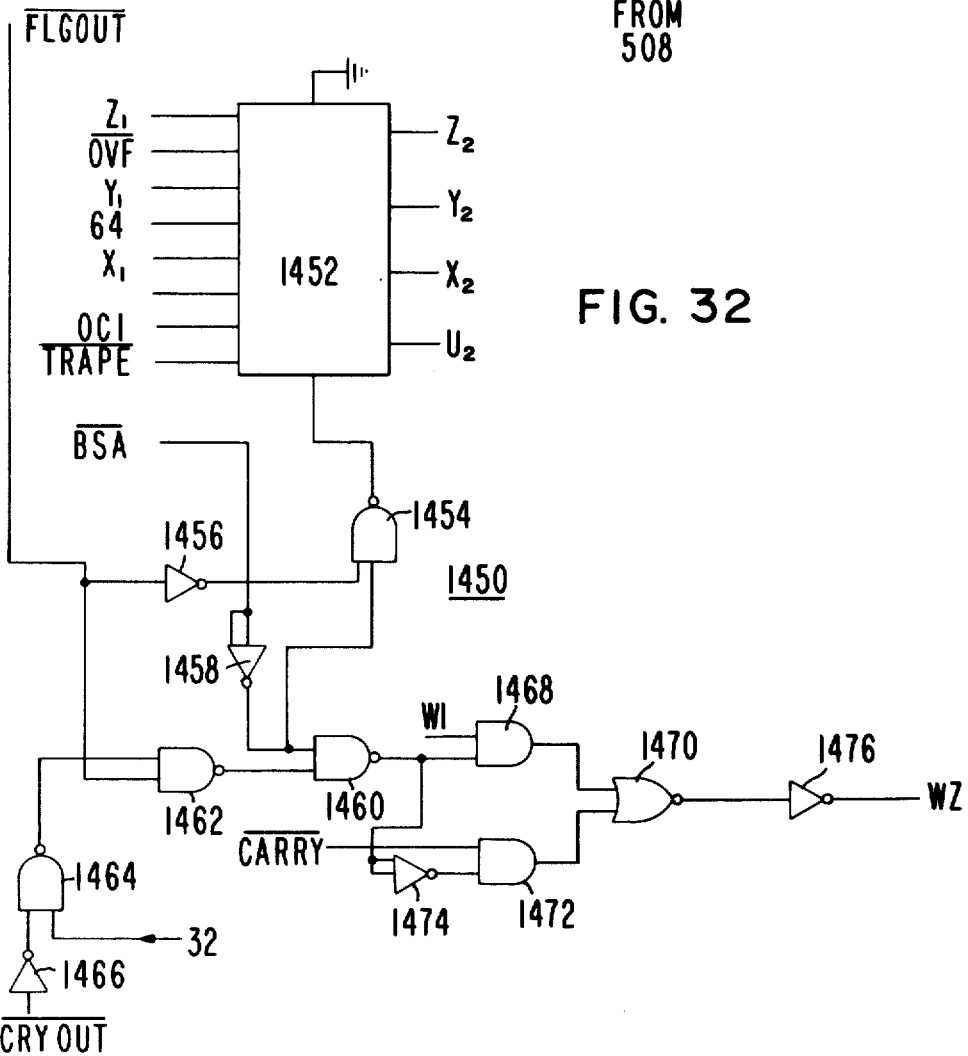

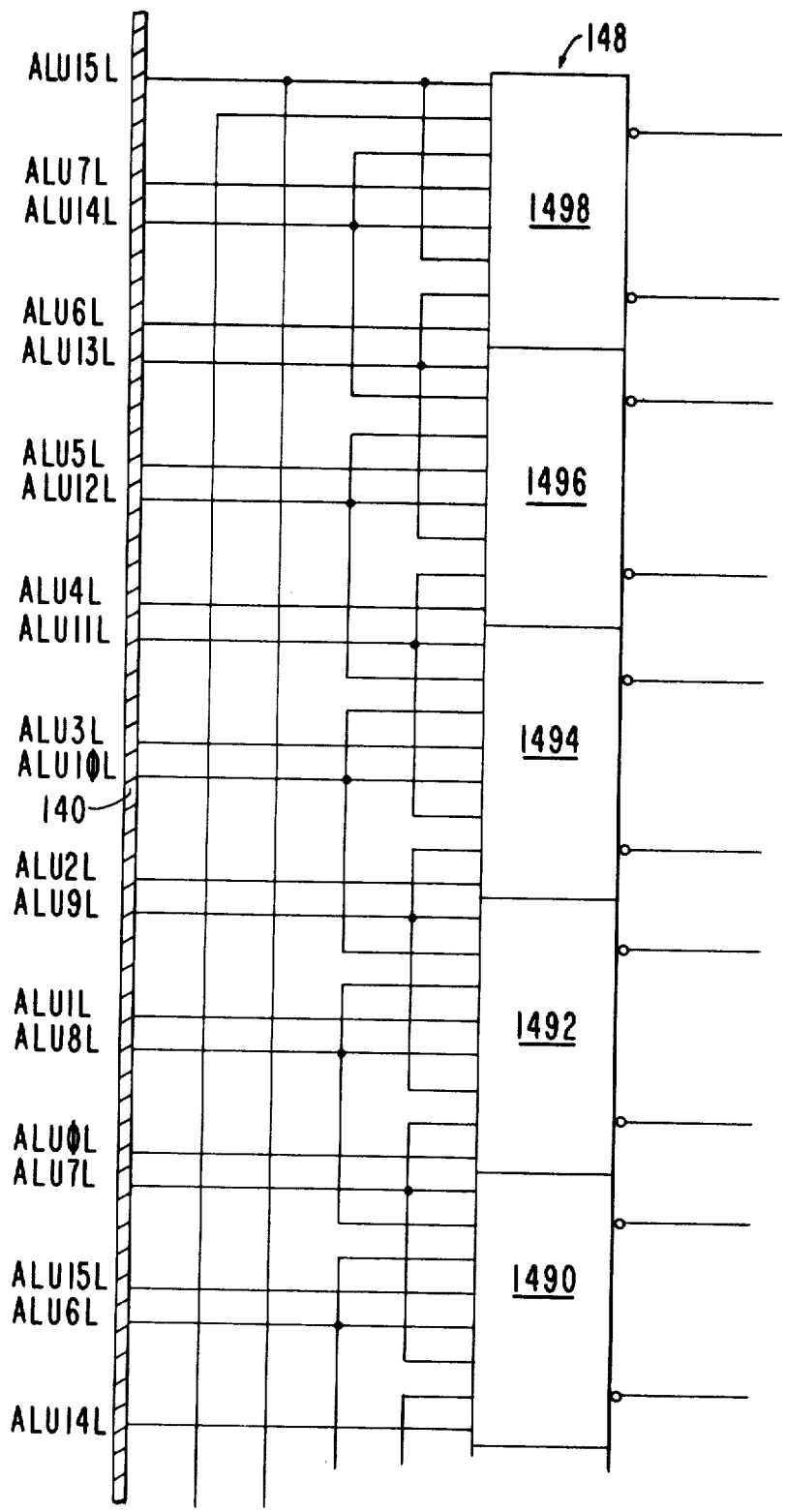
FIG. 33A
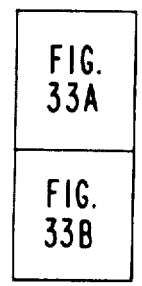

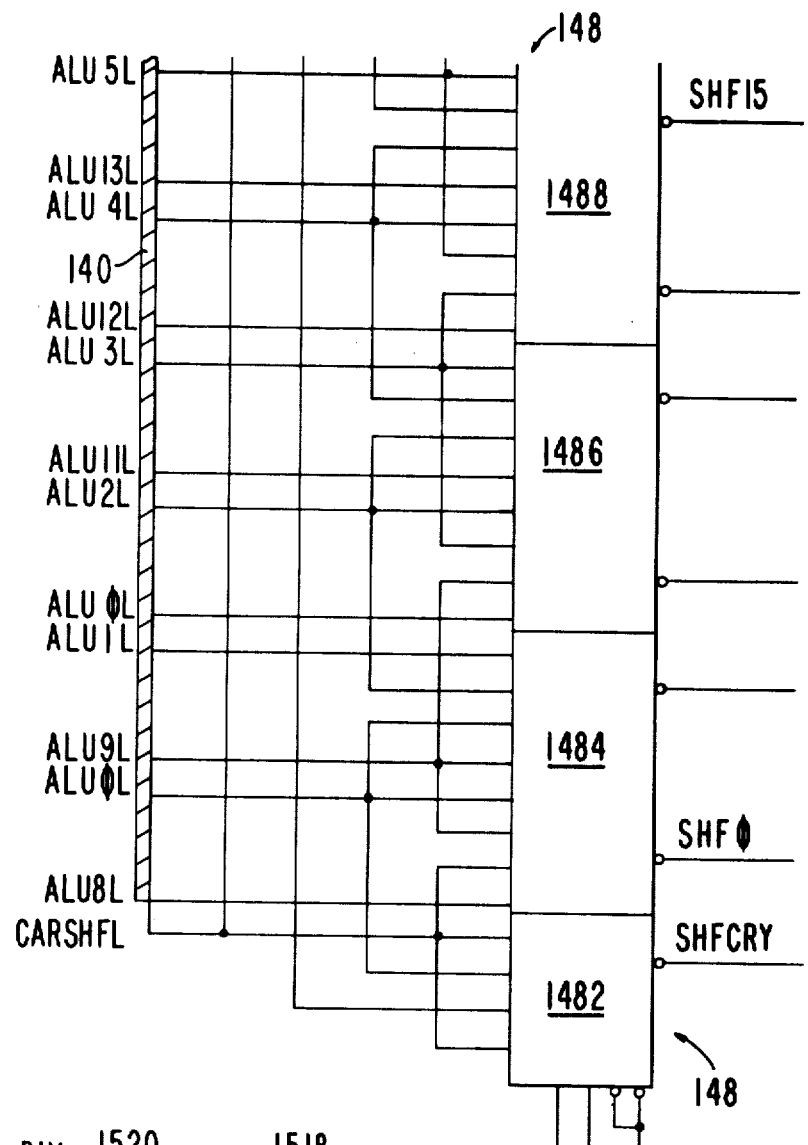
FIG. 33B
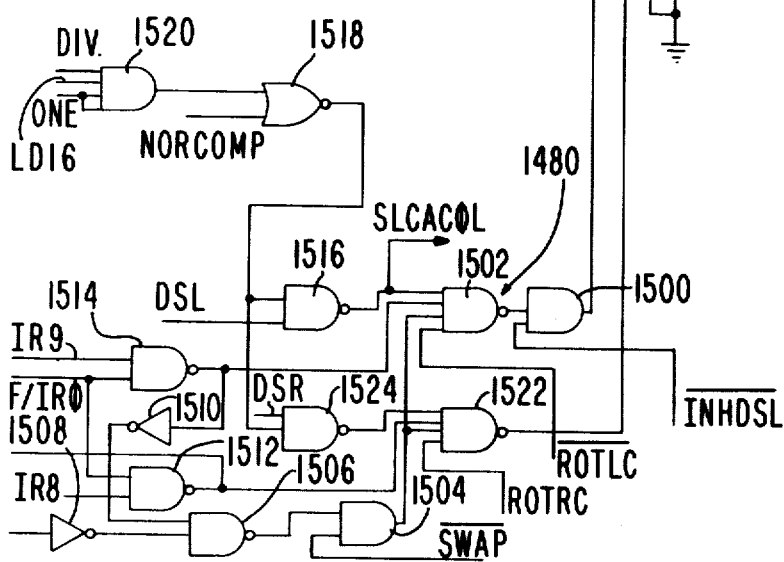
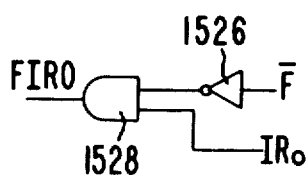
FIG. 34

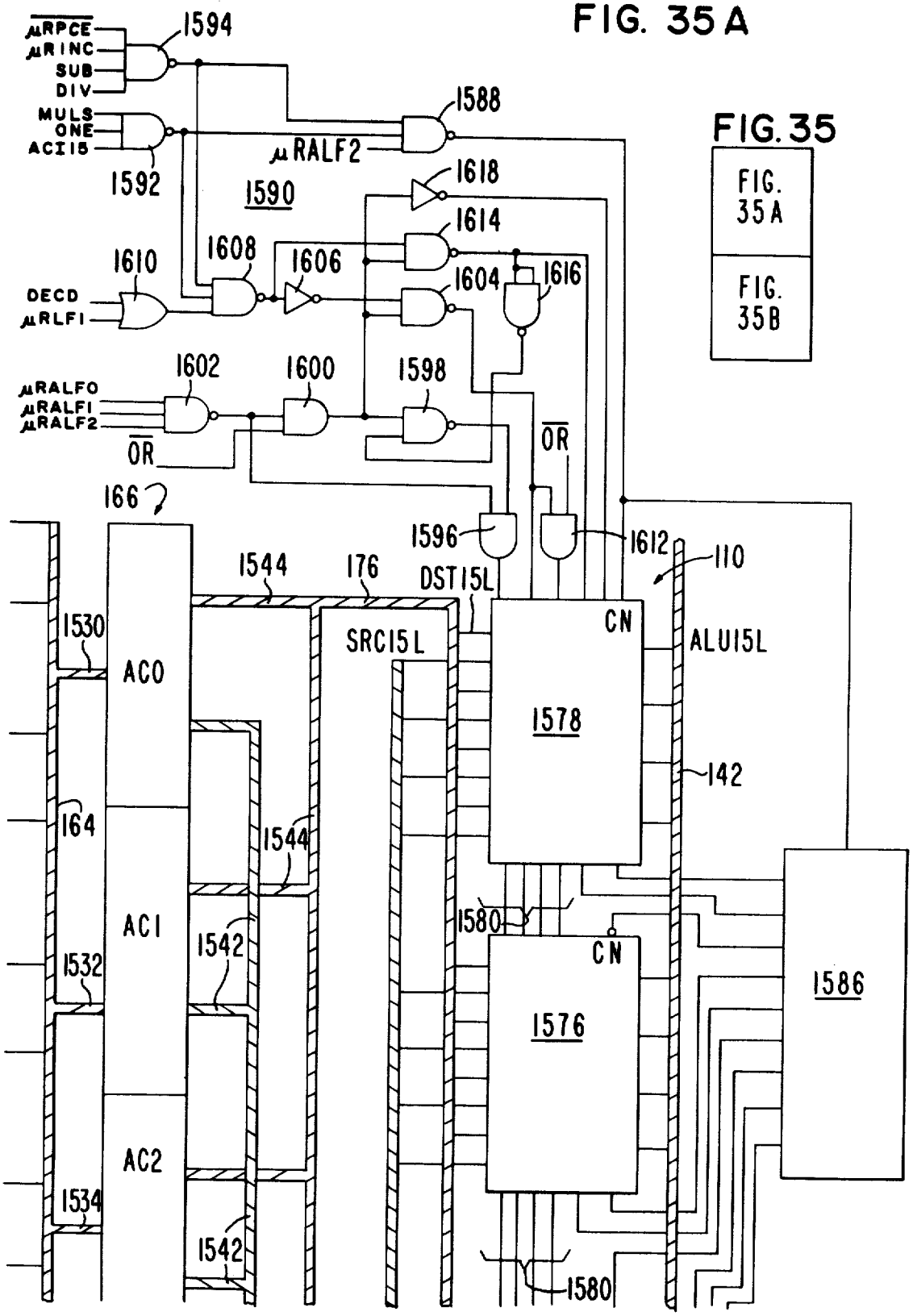

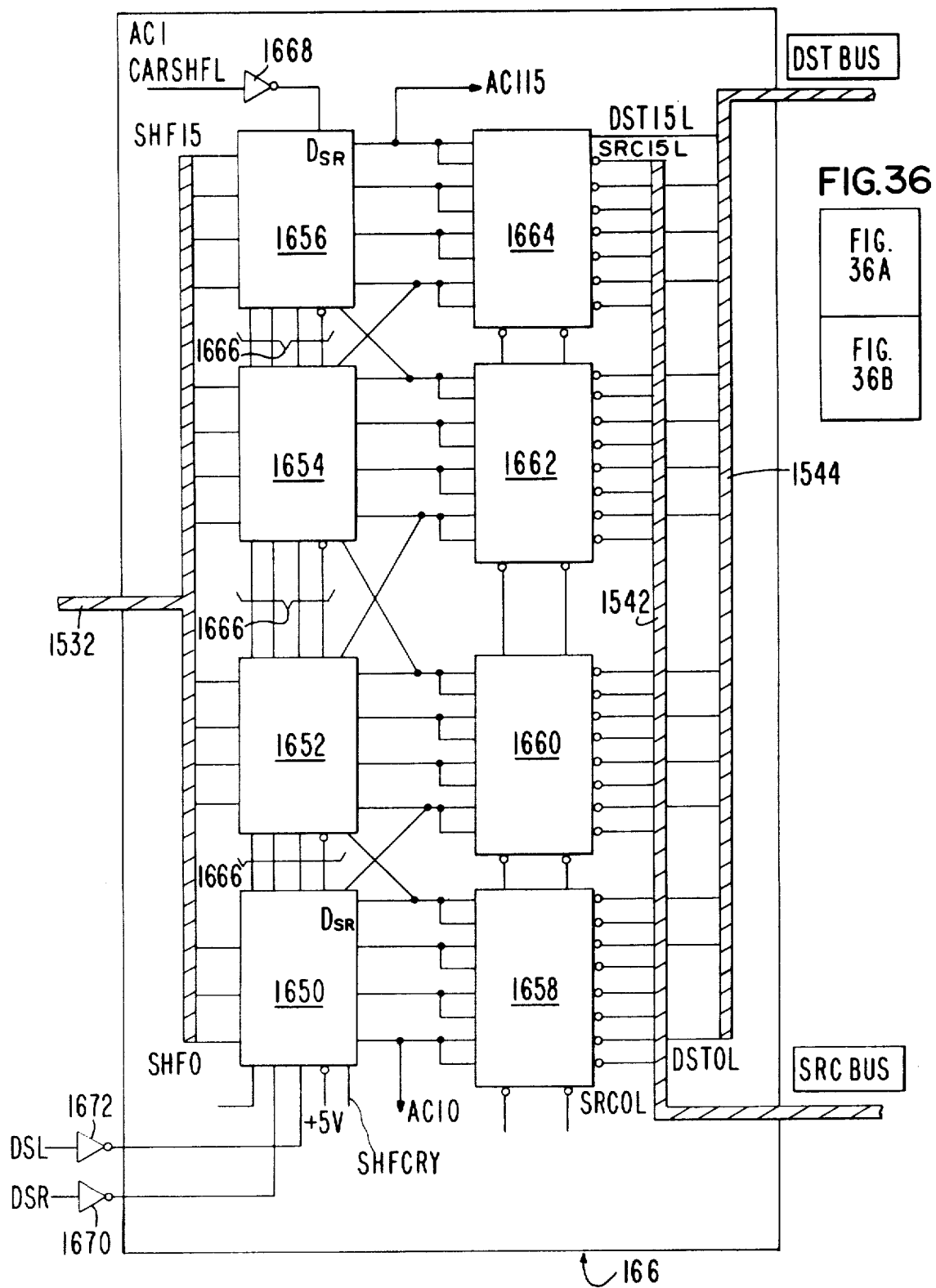

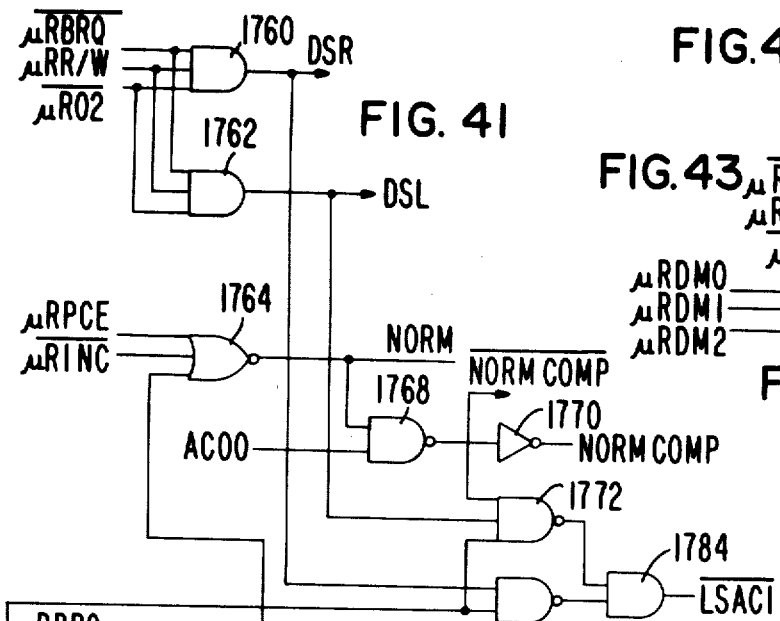
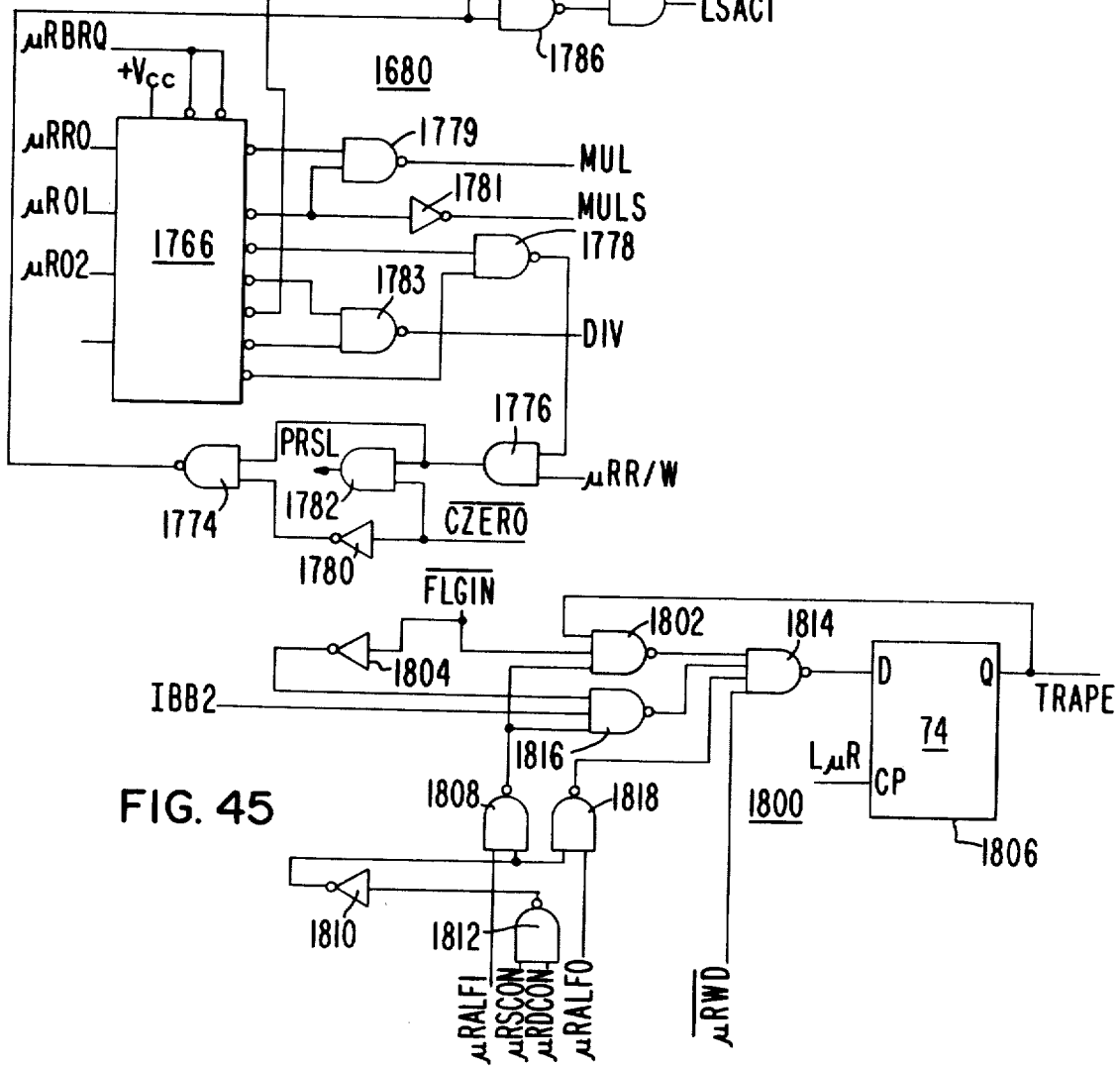
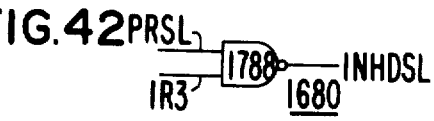
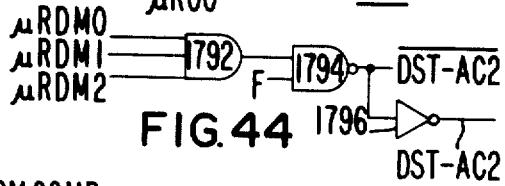
FIG. 41
FIG. 42
FIG. 43
FIG. 44
FIG. 45

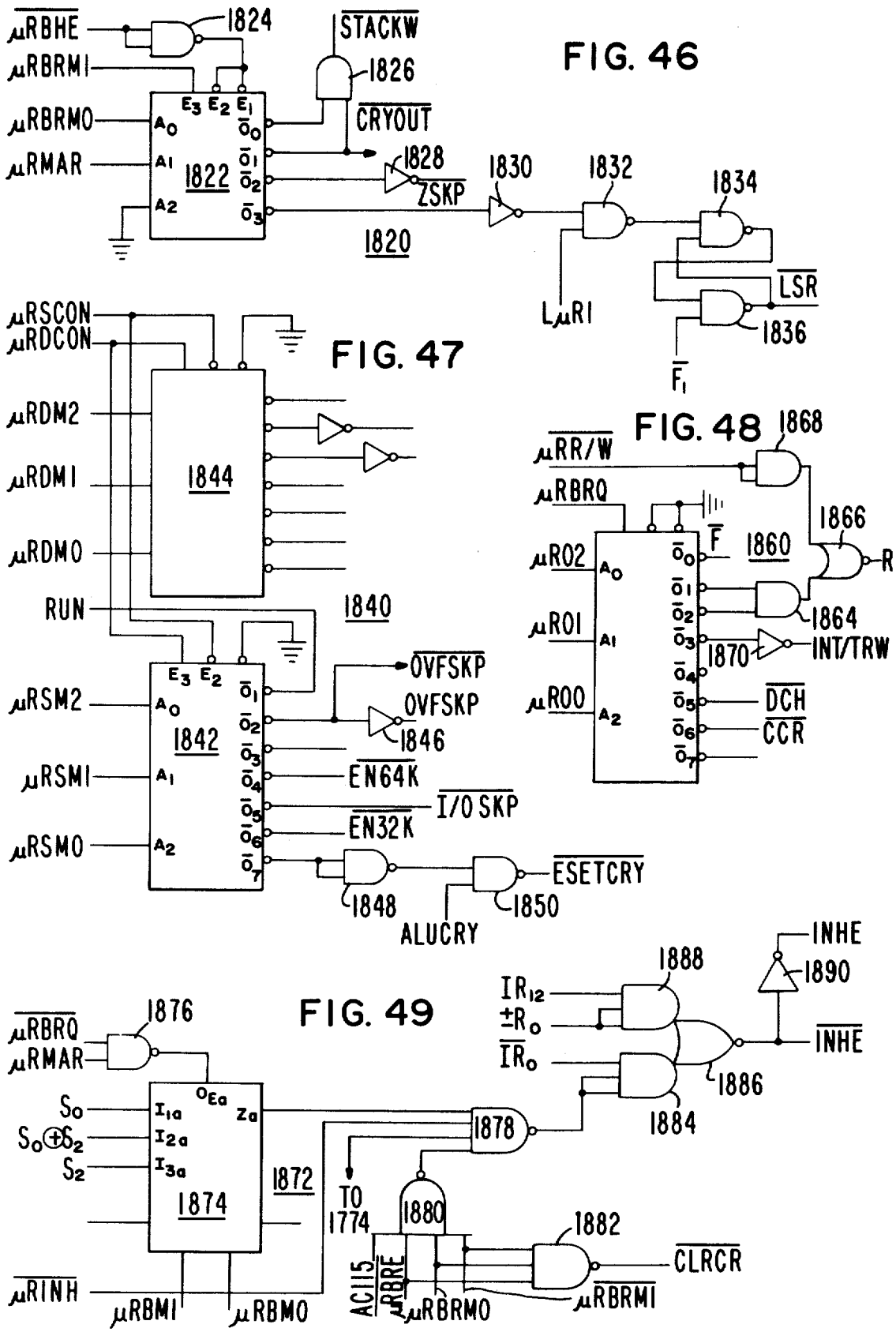

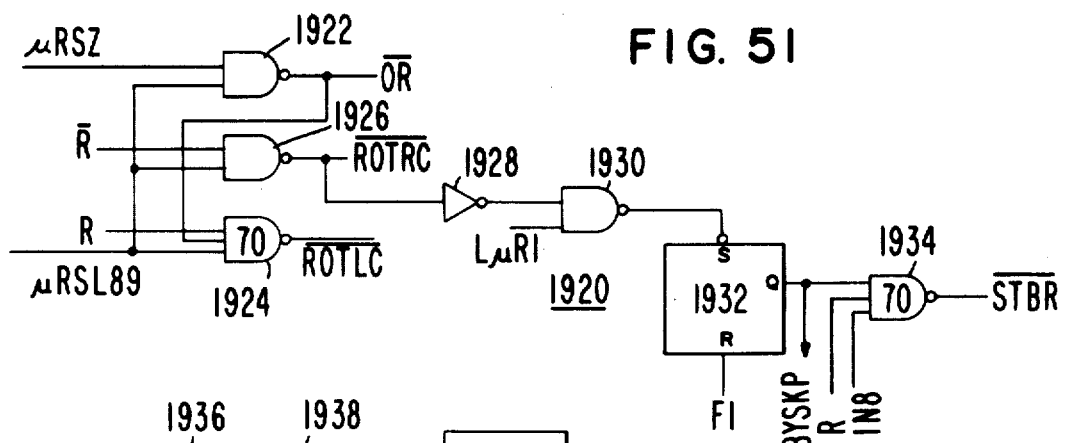
FIG. 51
FIG. 52
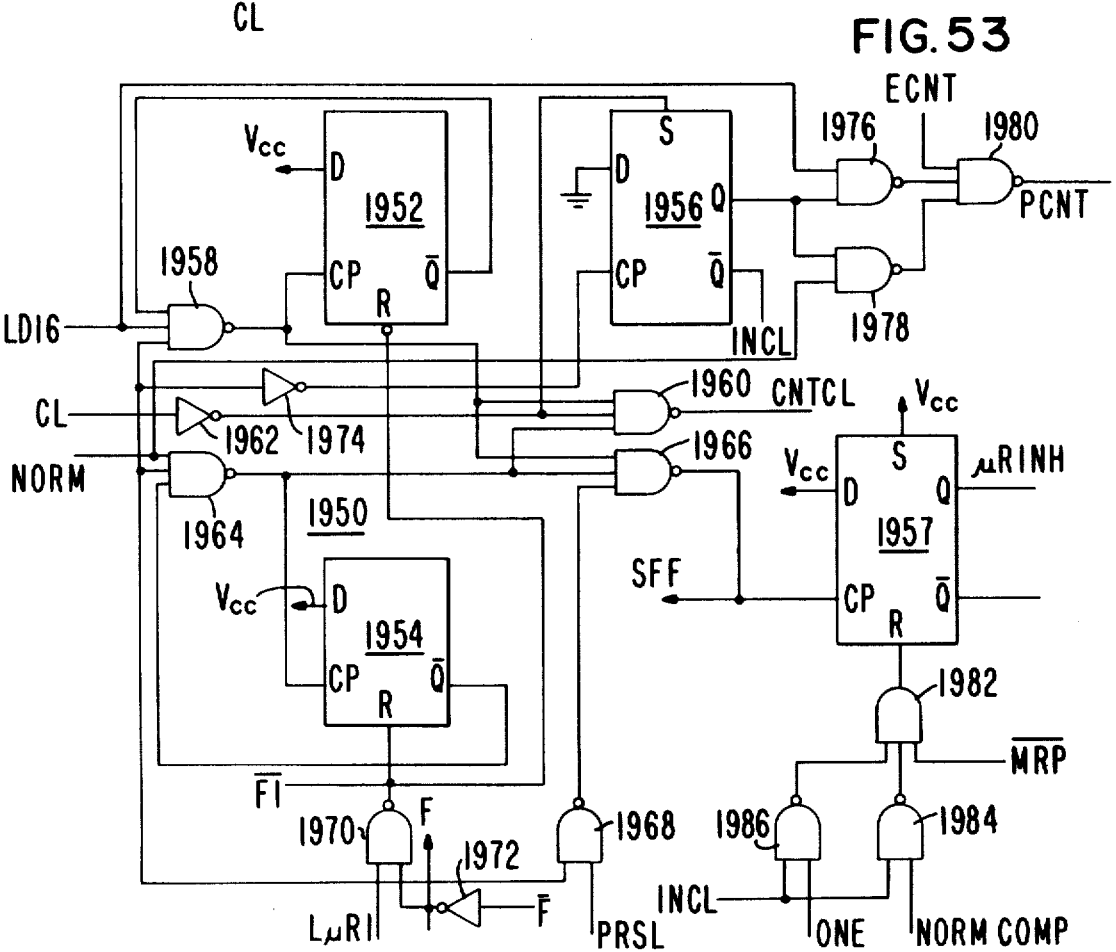
FIG. 53

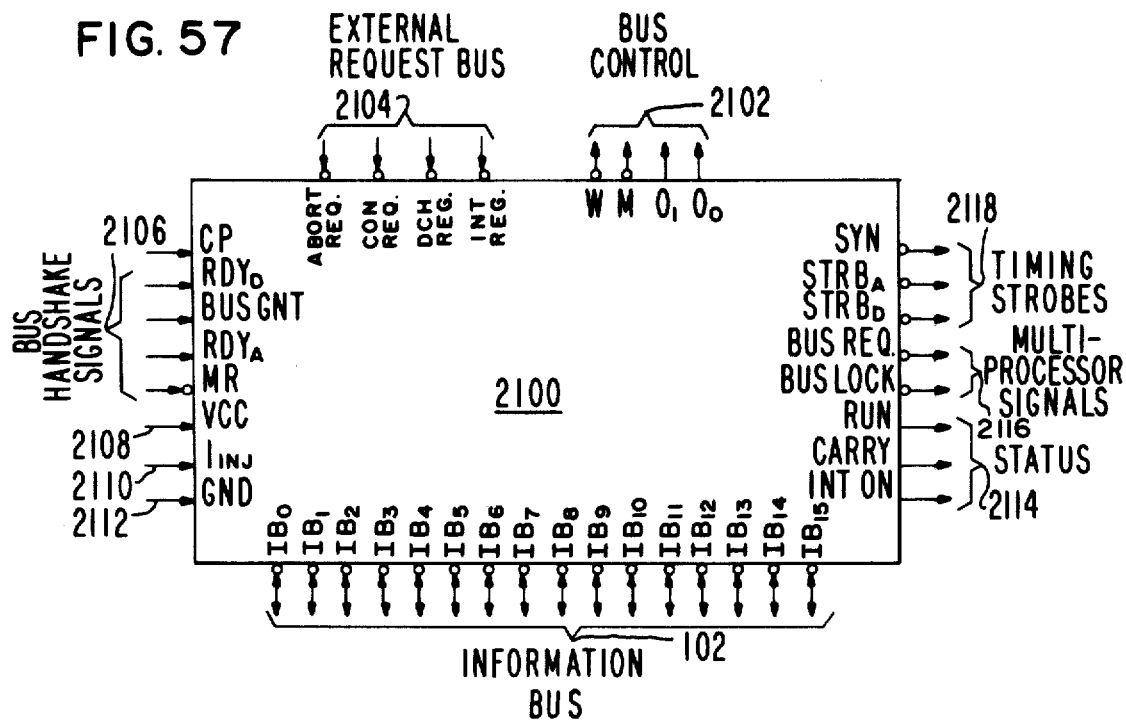
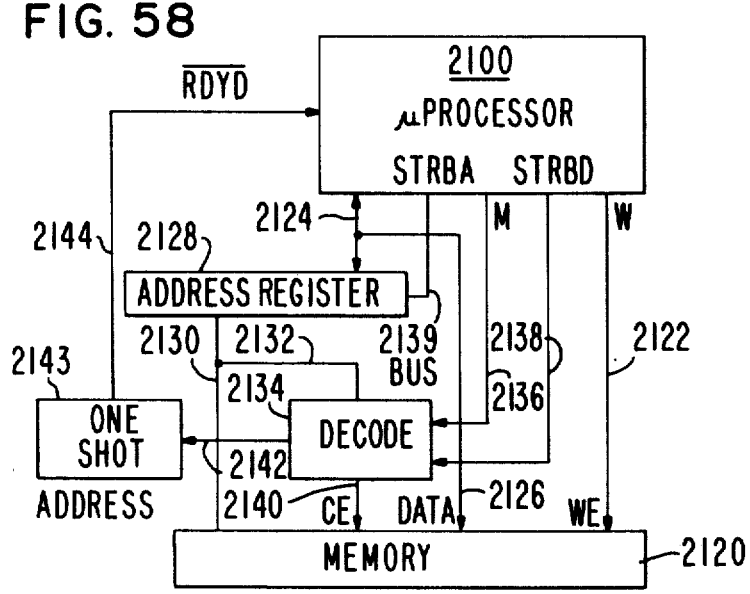

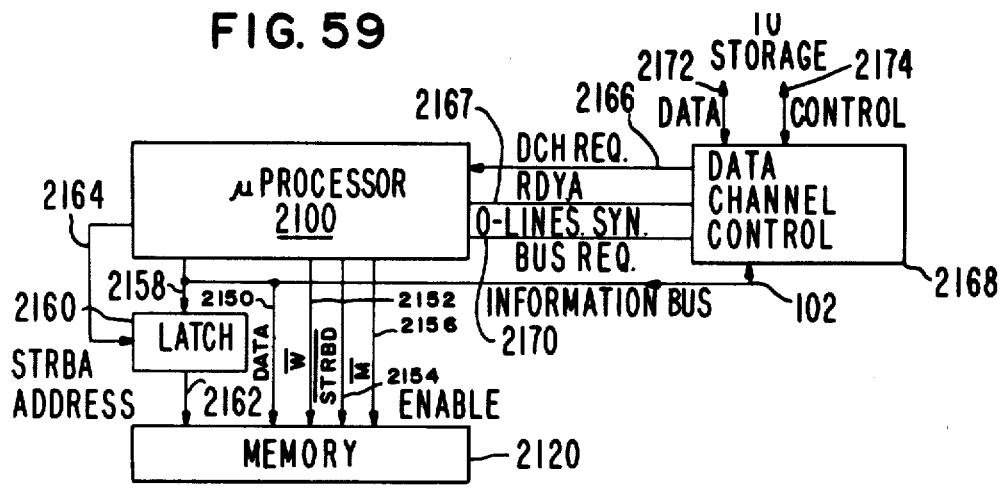
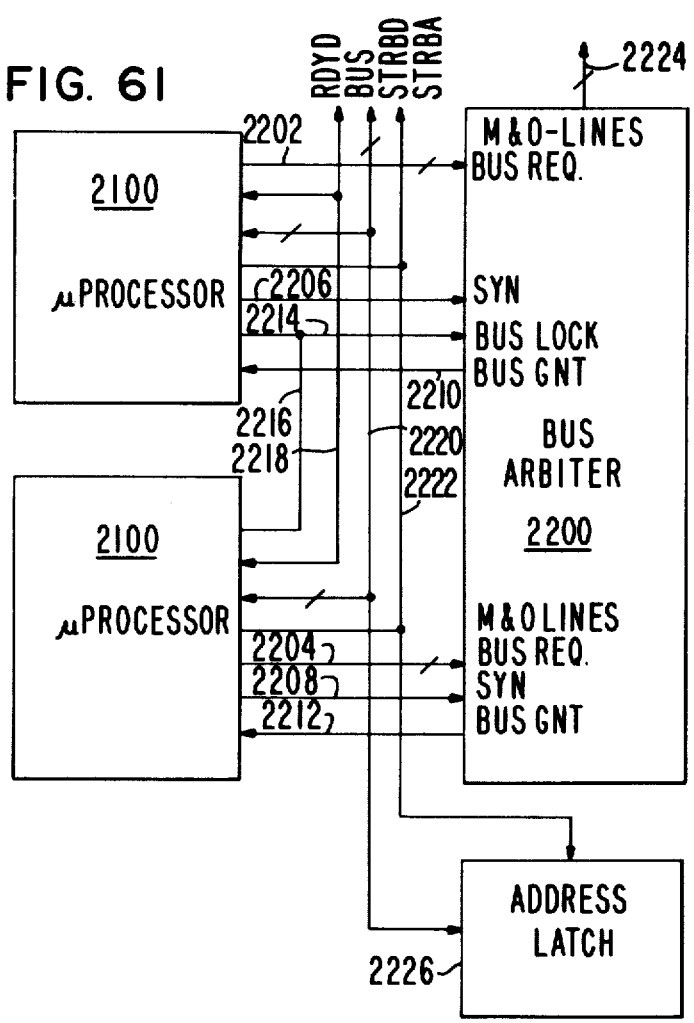

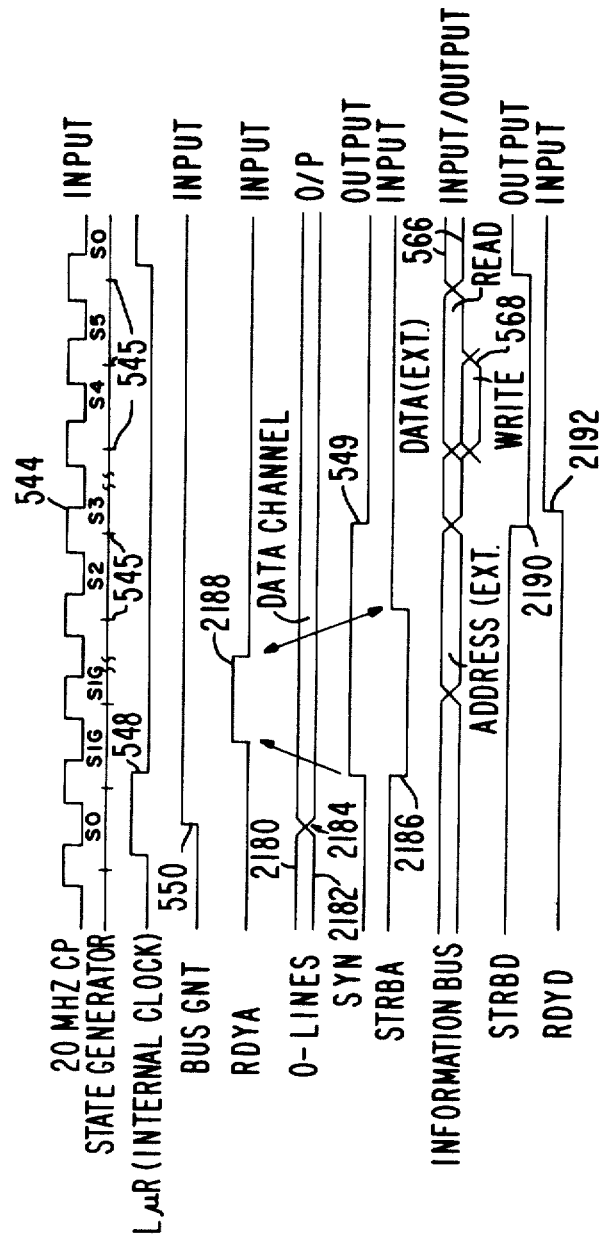

MICROPROCESSOR WITH IMPROVED ARITHMETIC LOGIC UNIT DATA PATH

The following applications containing a common disclosure and concurrently filed with the present application contain claims to related inventions:

An application by Yeshayahu Mor entitled, "MICROPROCESSOR WITH IMPROVED REGISTERS AND ARITHMETIC LOGIC UNIT DATA PATH" having U.S. Ser. No. 155,831, filed May 30, 1980.

An application by Yeshayahu Mor and Dan Wilnai entitled, "HIGH PERFORMANCE MICROPROCESSOR SYSTEM" having U.S. Ser. No. 155,832, filed May 30, 1980.

An application by Allan M. Schiffman, Yeshayahu Mor and Gary R. Burke entitled, "MICROPROCESSOR WITH DATA AND PROGRAM PROTECTION" having U.S. Ser. No. 155,141, filed May 30, 1980.

An application by Gary R. Burke entitled, "MICROPROCESSOR WITH IMPROVED INFORMATION BUS UTILIZATION" having U.S. Ser. No. 155,152, filed May 30, 1980.

FIELD OF THE INVENTION

This invention relates to a microprocessor with an improved system design. More particularly, it relates to such a microprocessor system capable of high speed execution of various microinstructions commonly employed in microprocessor data processing applications. Most especially, it relates to such a system which can be implemented in an integrated circuit chip incorporating both transistor-transistor logic (T²L) and integrated injection logic (I²L) and which is especially adapted for multiprocessing use.

DESCRIPTION OF THE PRIOR ART

Microprocessor systems and integrated circuits incorporating them are now well known in the art. Early microprocessor designs, such as the Intel designed 8080 type and Motorola designed 6800 type microprocessor integrated circuits, have had a substantial impact on electronics technology by extending low cost data processing capability into a wide variety of applications where it was formerly not economically feasible. Due to the large number of circuit functions required in a microprocessor integrated circuit, the first microprocessors were embodied in metal-oxide-semiconductor (MOS) technology integrated circuit form. While MOS integrated circuits allow high device density to be achieved, they have significant speed limitations.

More recently, improvements in bipolar integrated circuit technology, such as the isoplanar integrated injection logic (I³L)* process described in commonly assigned Peltzer U.S. Pat. No. 3,648,125, has allowed the provision of higher density high speed bipolar integrated circuits incorporating an increased number of circuit functions in a single integrated circuit. For example, commonly assigned Erickson et al, U.S. Pat. No. 4,106,090 discloses a microprocessor system designed to be implemented in I³L bipolar integrated circuit form. Commonly assigned Erickson et al, U.S. Pat. No. 3,984,670 describes a data processing technique employed in the microprocessor described in the first Erickson et al Patent.

*Registered Trademark, Fairchild Camera and Instrument Corporation.

Thus, while the microprocessor system art is now a well developed one, a need remains for further improvements, both in speed and sophistication of data processing operations that can be carried out in a microprocessor system.

SUMMARY OF THE INVENTION

Accordingly, it is an object of the invention to provide a microprocessor system with an increased speed of execution for certain repetitive instructions.

It is another object of the invention to provide a microprocessor system with an improved register file and associated elements for increased data processing flexibility and performance.

It is yet another object of the invention to provide a microprocessor system having the ability to execute byte (multiple bit, typically 4 or 8-bit) instructions at a substantially greater speed than prior art microprocessor systems.

It is still another object of the invention to provide a microprocessor system capable of carrying out division operations significantly faster than prior art microprocessor systems.

The above and related objects may be attained through use of the microprocessor system herein disclosed. In one aspect, the microprocessor system of this invention has a central processing unit with an independent address data path and an independent arithmetic logic unit (ALU) data path. Each data path is capable of simultaneous operation during a clock cycle. The data paths have a shared input multiplexer connected to receive information from an information bus. A shared bus register is connected to receive the information from the input multiplexer. A shared output multiplexer is connected to receive information from the bus register, as well as from other elements in the two independent data paths. The output multiplexer supplies information to the information bus. An incrementer is desirably connected to an output of the shared output multiplexer, and a program counter is desirably connected to the output of the incrementer. The output of the program counter is preferably connected both to the input of the output bus multiplexer and to an input of a source multiplexer connected to the ALU of the ALU data path.

The ALU data path includes a register file having a plurality of registers each capable of storing a predetermined number of bits, for example, 16 bits. One of the registers in the register file is preferably implemented as a bi-directionally shifting shift register. It is operatively coupled to at least one other of the registers in the register file. Through use of these two registers, the ALU data path is able to handle operations in a single operation cycle having numbers with more bits than the number of bits in each of the registers of the register file. This feature gives very fast execution times for repetitive instructions involving shifts of, for example, 32 bits, such as multiply, divide, normalize and parametric double shift operations.

The bus register of this microprocessor system is capable of storing a pre-determined number of bits of information which is a multiple of bytes, for example, 16 bits. In a 16 bit form, the bus register is subdivided into, for example, two registers, each capable of storing 8-bits of information. A separate control means is provided for each of these two registers. Means is coupled to the separate control means for each of the two registers for initiating a swap operation between the two registers. As a result, byte instructions are executed in a very rapid manner in this microprocessor system.

The microprocessor system of this invention also desirably has a source multiplexer and a destination multiplexer each connected to supply information inputs to the ALU. The register file is connected to supply information inputs to the source and destination multiplexers. A multiple-bit (e.g., 5-bit) counter stores the number of times a repetitive instruction is to be repeated. It is connected to supply its contents to the source and destination multiplexers and the register file is connected to supply input information to and receive information from the counter. A shifter is also desirably connected to receive information outputs from the ALU. The shifter is connected to supply its contents as inputs to the register file and to the counter.

In another aspect of the invention, the counter is connected to at least one of the plurality of registers in the register file to subtract the contents of the counter from the contents of the selected register. This aspect of the invention provides a more efficient normalize instruction than obtainable in the prior art microprocessor systems. If both the shifter and the counter are connected to supply their contents to the register file, the normalize instruction, together with the parametric double-shift instruction, provide more efficient floating-point arithmetic operations.

BRIEF DESCRIPTION OF THE DRAWINGS

The attainment of the foregoing and related objects, advantages and features of the invention should be more readily apparent after review of the following more detailed description of the invention, taken together with the drawings, in which:

FIGS. 7 through 11 are circuit diagrams of the timing unit shown in FIG. 4.

FIGS. 12 through 26D are circuit diagrams of the control unit shown in FIG. 1.

FIGS. 27A through 30C are circuit diagrams of the address data path unit shown in FIG. 1.

FIGS. 31 through 56 are circuit diagrams of the ALU data path unit shown in FIG. 1.

FIG. 57 is a block diagram of an integrated circuit incorporating the microprocessor system of this invention, showing the layout of the external connector pins therefor.

FIG. 58 is a block diagram showing use of a microprocessor system of this invention with an external memory.

FIG. 59 is a block diagram showing use of the microprocessor system of this invention with a data channel.

FIG. 60 is a set of waveform diagrams useful for understanding operation of the system in FIG. 59; and FIG. 61 is a block diagram showing use of the microprocessor system of this invention in a multiprocessor environment.

DETAILED DESCRIPTION OF THE INVENTION

Figure 1:
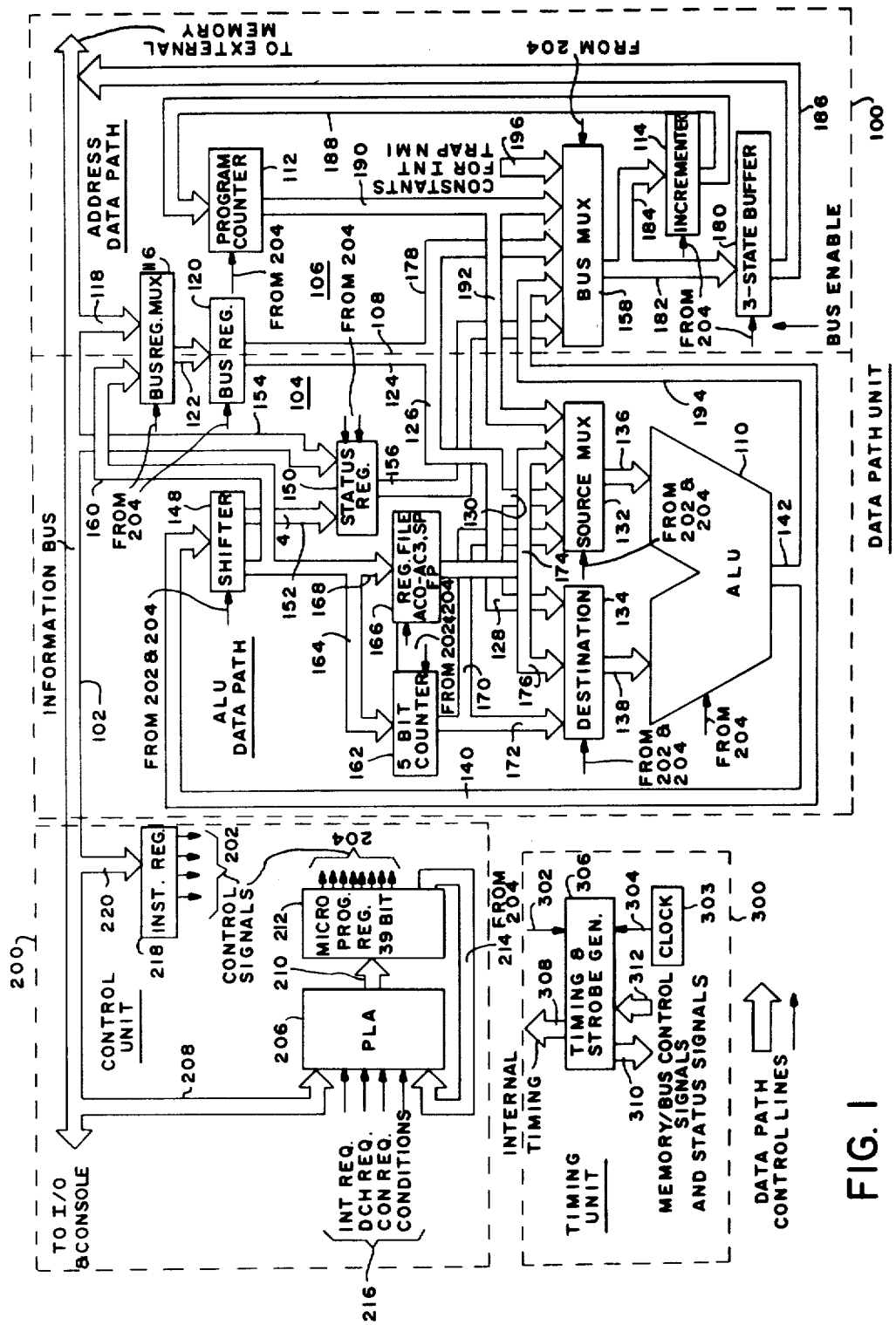
FIG. 1 is a block diagram of a microprocessor system in accordance with the invention.

Turning now to the drawings, more particularly to FIG. 1, there is shown a microprocessor in accordance with the invention in block diagram form. The microprocessor includes a data path unit 100, a control unit 200 and a timing unit 300. Information bus 102 connects the data path unit 100 and the control unit 200. Control line 302 connects the timing unit 300 to the control unit 200. Control lines 202 and 204 are also connected between the control unit 200 and the data path unit 100, as indicated in FIG. 1 and as will be explained in more detail below.

The data path unit 100 includes two separate data paths 104 and 106. The data path 104, to the left of line 108, includes an ALU 110. It therefore performs arithmetic and related operations on information circulating in that data path. For convenience, data path 104 will be referred to as the ALU data path. Data path 106, to the right of line 108, includes a program counter 112 and an incrementer 114. The data path 106 is primarily for the purpose of selecting the address for the next instruction during a given machine cycle while an operation is being performed by the ALU data path 104. The data path 106 will therefore be referred to as the address data path for convenience. The provision of the separate ALU data path 104 and the address data path 106 allows overlapping of fetch and ALU operations in the same machine cycle, thus speeding up the execution of operations in the microprocessor.

Turning now to the ALU data path 104, information bus 102 is connected to bus register multiplexer 116 by bus 118. Bus register multiplexer 116 is in turn connected to bus register 120 by bus 122. Bus register 120 and bus register multiplexer 116 are shared by the ALU data path 104 and the address data path 106, and the function of bus register multiplexer 116 is to direct the appropriate information signals on bus 102 to each data path 104 and 106. Buses 124, 126, 128 and 130 connect the bus register 120 to source and destination multiplexers 132 and 134. The source and destination multiplexers 132 and 134 in turn supply operands from their various inputs on buses 136 and 138, respectively, to the ALU 110. Bus 140 connects output 142 of ALU 110 to shifter 148. One output of the shifter 148 is connected to status register 150 by bus 152. Another input to the status register 150 is from information bus 102 via bus 154. Bus 156 connects an output of the status register 150 to bus multiplexer 158 in address data path 106. Another output of the shifter 148 is connected to bus register multiplexer 116 by bus 160, to five-bit counter 162 by bus 164 and to register file 166 by bus 168. An output of the five-bit counter 162 is connected to source multiplexer 132 and destination multiplexer 134 by buses 170 and 172, respectively. An output of the register file 166 is connected to source multiplexer 132 and destination multiplexer 134 by buses 174 and 176, respectively.

Bus register 120 is connected to bus multiplexer 158 in address data path 106 by bus 178. Bus multiplexer 158 is connected to three-state buffer 180 by bus 182 and to incrementer 114 by bus 184. An output of the three-state buffer 180 is connected to information bus 102 by bus 186. An output of the incrementer 114 is connected to program counter 112 by bus 188. An output of the program counter 112 is connected to the bus multiplexer 158 by bus 190, and to the source multiplexer 132 in ALU data path 104 by bus 192. Output 142 of the ALU 110 is connected to the bus multiplexer 158 by bus 194. Constants to be employed for certain operations to be explained below are supplied as an input to the bus multiplexer 158 on bus 196 from special logic circuits provided for that purpose, to be described below.

The control unit 200 includes a programmable logic array (PLA) 206, which contains a suitable control program for operation of the microprocessor. A listing of the interconnections in PLA 206 comprising this program is included as an appendix to this application which is not printed herein and may be found in the patented file. PLA 206 is connected to information bus 102 by bus 208 and by bus 210 to a 39-bit microprogram register 212. Control lines 204 from the microprogram register are connected to the various functional elements of the data path unit 100 as shown, to provide the appropriate control signals in response to control program commands supplied to the register 212 on bus 210. Bus 214 connects another output of the register 212 to form another input to the PLA 206. Request lines 216 form additional inputs to the PLA 206. An instruction register 218 is also connected to the information bus 102 by bus 220. Control signal lines 202 forming outputs from the instruction register 218 are connected to the appropriate functional elements of the data path unit 100 as shown. The instruction register 218 initiates control signals on the lines 202 in response to instructions from a user program, entered in the register 218 via information bus 102, resulting in the performance of operations on data entered in the ALU data path 104 via information bus 102, bus register multiplexer 116 and bus register 120.

Timing unit 300 generates required timing signals to allow the various functional elements of the data path unit 100 and the control unit 200 to function together, in response to control and status signals received from those units. The timing unit 300 includes a timing and strobe generator 306. A fundamental frequency is supplied as clock pulses on line 304 from a quartz crystal oscillator or other suitable source of clock pulses shown as clock 303. The timing and strobe signals are generated by appropriate frequency division of the fundamental clock frequency in the generator 306. The internal timing signals are supplied by the generator 306 on bus 308. Memory and bus control signals are supplied by the generator 306 on bus 310. Status signals from the functional elements of the control unit 200 and the data path unit 100 are supplied to the generator 306 on bus 312.

Certain features of the system as shown in FIG. 1 provide special advantages for the microprocessor of this invention. As a result of the connection from shifter 148 via bus 160, the bus register multiplexer 116 and bus register 120 may act as a source of addresses for jump operations. The bus register multiplexer 116 is required because bus register 120 is a part of both ALU data path 104 and address data path 106. As is indicated in FIG. 1, register file 166 consists of four general purpose registers or accumulators AC0 through AC3, as well as two special purposes/registers, the stack pointer (SP) and the frame pointer (FP). Floating point operations require the handling of 32 bit numbers. For this purpose, the AC0 and AC1 registers are treated as one. In order to carry out floating point operations in one machine cycle, the AC1 register has a different form of construction than typical registers. It is a universal shift left or right register which operates in a manner similar to a conventional shift register. Certain logic is also required between the AC0 and AC1 registers, which will be explained in more detail below. This relationship between the AC0 and AC1 registers enables very fast execution times for repetitive instructions involving shifts of 32 bits, such as multiply (MUL), divide (DIV), normalize (NORM) and parametric double shifts. In addition to their use as general purpose registers, the AC2 and AC3 registers are used as index registers and the AC3 register also serves as a subroutine linkage register. Multiple cycle parametric instructions, such as MUL, DIV, double shifts and NORM instructions are also facilitated by the fact that counter 162 is part of the data path. Including the counter 162 in the data path means that it can be used for more efficient multiplication and division, rather than writing such repetitive operations 16 times in the PLA 206. Having the counter 162 in the data path means that the result from a previous cycle as well as the result of a present cycle are available for manipulation in the more efficient multiplication and division, as explained more fully below. The 16 bit bus register 120 is split into 2 eight-bit (1 byte) registers with separate control. As a result, a swap operation can be used for very fast execution of byte instructions. The system is also configured so that the information bus 102 and the PLA 206 can be used to implement console operations, through further use of the request line 216 labeled CON REQ. Previous microprocessors required use of additional lines for providing control signals from the console connected to the PLA or the use of I/O or memory instructions. Part of the console operation includes a small program residing in PLA 206, which employs 7 internal terminals of the PLA 206 to test approximately 90% of the data paths in the system. This test feature is useful both for testing by the user of the system and for testing during the manufacture of microprocessor integrated circuits including the system of FIG. 1.

The source multiplexer 132 selects, under microprogram control of microprogram register 212, a source register, which supplies a 16 bit operand to the ALU 110 on bus 136. The source register can be any of the registers or accumulators in register file 166, the bus register 120, the program counter 112, the five bit counter 162, or 16 zeroes. The destination multiplexer 134 selects, also under microprogram control by microprogram register 212, a destination register, which supplies another 16 bit operand to the ALU 110 and also constitutes the destination for the result of the ALU operation. The destination register can also be any of the registers or accumulators in register file 166, the bus register 120, or the 5 bit counter 162. In unary operations, the destination operand is zero.

The arithmetic logic unit 110 can perform nine different operations on two 16-bit operands, generating a 16 bit result and four status flags: carry, zero, overflow, and sign. The carry, zero and sign status flags are modified by the shifter 148. The nine operations are move, complement (one's complement), add, subtract, increment, add one's complement, negate (two's complement), and, or (MOV, COMP, ADD, SUB, INC, ADC, NEG, AND, OR). The 17-bit output of the ALU 110 (16 bits and carry) is transferred to the shifter 148 on bus 140. The 16 bit output of the ALU 110 also goes to the bus multiplexer 158 as the operand in write cycles.

The shifter 148 is a 17 bit four input to one output multiplexer, which is capable of performing one of the following operations on the 17 bit output of the ALU 110: passing the 17 bits unshifted, rotating the 17 bits through carry to the left, rotating the 17 bits through carry to the right, and swapping the two bytes of the 16 bit word and passing the carry unaffected. Unless inhibited, at the end of a cycle, the output of the shifter 148 is loaded into the destination register in register file 166 and into the carry flag of status register 150.

The status register 150 comprises four separate one bit registers, i.e., carry, overflow, a 32K or 64K memory size indicating register and a trap enable/disable register. Disabling the trap functions in the microprocessor allows programs written for systems without a trap function to be run on this system. Each of these flags in the status register 150 is affected differently as specified in the relevant instructions. They are treated as one register only on push flags (PSHF) and pop flags (POPF) instructions. The default state of the status register 150, entered by master reset, is 32K/64K = 32K and enable trap (ETRP) = 1.

The five bit counter 162 is used for multiple cycle instructions where many identical microinstructions have to be repeated, such as multiple/divide, normalize and double shift instructions. The counter 162 is loaded at the beginning of each of these instructions with the appropriate number of counts, and causes the same microinstruction to repeat itself that number of times. The number of counts may be either fixed by the instruction itself, such as 16 or 32 in the case of multiply, divide, and normalize instructions, or the number of counts may be programmed or controlled, such as in parametric shift instructions. The linkage register in register file 166 to counter 162 is always the AC2 register. On parametric shifts, the five bit counter 162 receives its input from AC2, and in normalize instructions, counter 162 supplies its contents to register AC2.

The bus register multiplexer 116 selects the data to be stored in bus register 120. The two sources of data for the bus register 120 are the information bus 102 and the shifter 148. The information bus 102 is selected when the source of data is external of the microprocessor, such as in a read, fetch, or I/O device input cycle. The shifter 148 is selected when the source of data is one of the registers in the ALU data path 104.

At the end of any relevant cycle, under microprogram, control, the bus register 120 latches the data supplied by the bus register multiplexer 116. The bus register 120 is the only register in the ALU data path 104 capable of storing data directly from the information bus 102.

The bus multiplexer 158 selects, under microprogram control, data to be supplied to the information bus 102 on bus 186. The possible sources of data to be supplied to the information bus 102 are the program counter 112, which supplies the address in most fetch cycles, the bus register 120, which supplies the address in memory cycles, the ALU 110, which supplies the operands in memory and I/O cycles, and the status register 150, which supplies the data in push flags type instructions. The three-state buffer 180 is enabled when the bus multiplexer 158 is supplying data or addresses to the information bus 102. Otherwise, buffer 180 is disabled.

The program counter 112 is a 16 bit register that contains the address of the next instruction. Counter 112 gets the address from the incrementer 114 via bus 188. On a typical fetch cycle, the bus multiplexer 158 selects the program counter 112 for its input, the contents of the program counter 112 propagate through the bus multiplexer 158 and the three state buffer 180, and are interpreted as the memory address. In parallel, that same address is incremented by one through incrementer 114, and at the end of the cycle, the output of the incrementer (PC + 1) is latched into the program counter 112. At this point, the program counter once again contains the address of the next instruction.

The operation of the components of the data path unit 100 are governed by the control unit 200. The PLA 206 contains the microprogram, the pipeline or microprogram register 212 latches the microinstructions executed in the current cycle, and the instruction register 218 supplies additional control bits during some instructions.

Figure 2:
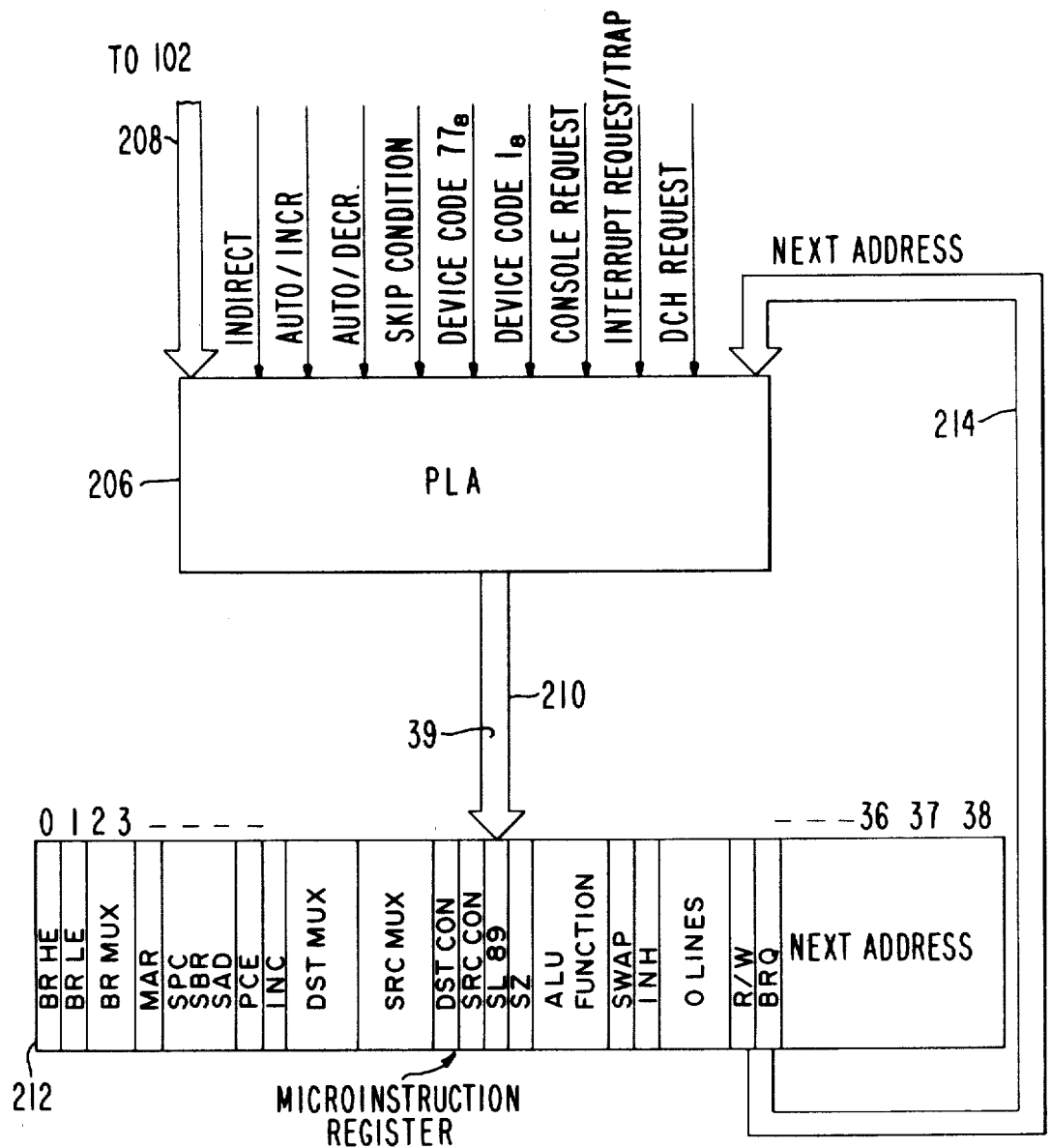
FIG. 2 is a more detailed block diagram of the PLA and microinstructions register shown in FIG. 1.

The microprogram, contained in PLA 206 of the control unit 200, is the collection of microroutines into which every machine instruction is translated. Further details of the PLA 206 and the microprogram register 212 helpful for understanding the following discussion of the microprogram are shown in FIG. 2. The PLA 206 has 28 inputs, ten of which are connected to the information bus 102 via the bus 208, and nine of which are connected by the bus 214 to the microinstruction register 212. The other nine inputs to PLA 206 are identified in FIG. 2. The 39 outputs of PLA 206 correspond to the microinstruction width and are represented by bus 210. The starting address is supplied by the machine code, and the microinstructions are accessed by means of the conditional next address field. The different fields of the 39 bit microinstructions are shown in the block 212. These fields have the following significance: The numbers in parentheses after each field identification are its width.

| | |
|---|---|
| BRHE (1): | Enables loading high order half of the bus register (BR) 120 |
| BRLE (1): | Enables loading the lower order half of the BR 120 |
| BR MUX (2): | Selects the source of the data to be loaded in the BR 120 from: |
| Bus: | Operands (memory or I/O cycles), |
| EXT Bus: | Address field of memory instructions, sign extended (or 0 extended if page zero) for effective address calculations (fetch cycles), or Shifter 148 |
| MAR (1): | Enables loading of memory address register |
| SPC (1): | Selects PC 112 as the source of address |
| SBR (1): | Selects BR 120 as the source of address |
| SAD (1): | Selects constant address for INT, Stack INT, TRAP, and NMI |
| PCE (1): | Enables loading of the PC 112 |
| INC (1): | Enables incrementing of the data loaded to PC 112 |
| DST MUX (3): | Specifies the destination register in register file 166 |
| SRC MUX (3): | Specifies the source register in register file 166 |
| DST CON (1): | Selects the code for the destination multiplexer (DST MUX) 134 from either the microprogram register 212 or the instruction register 218 (bits 3 and 4) |
| SL89 (1): | Selects the code for the DST MUX 134 from the instruction register 218, bits 8–9 (STB, LDB, OR instructions) |
| SRC CON (1): | Selects the code for the source multiplexer SRC MUX 132 from either the microprogram register 212 or the instruction register 218 |

-continued

| | |
|---|---|
| SZ (1): | Selects zero as the source operand |
| ALU Function (3): | Specifies the operation to be performed by the ALU 110, namely: |
| COM<br>INC<br>NEG | } Unary Operations |
| NOTE: | In all of the unary operations the destination operand is zero. |
| ADD<br>SUB<br>ADC<br>MOV<br>AND | } Binary Operations |
| SWAP (1): | Causes the shifter 148 to swap the two bytes of the ALU output |
| INH (1): | Inhibits loading of the result and the carry |
| O-Lines (3): | Eight combinations, designating machine or data in data transfer cycles to or from the processor |
| R/W (1): | Indicating direction of data flow on all bus cycles (memory, I/O) |
| BRQ (1): | Active in all bus cycles (memory, I/O) |
| NEXT ADDRESS (9): | Specifies the next microinstruction address, together with other inputs to the PLA such as: Skip Condition, DCHR, INTR, etc. |

NOTE: Some bits in the microinstruction word have different meanings in special microinstructions, for example: Since BRQ-0 in all non-bus (pure ALU) cycles, and R/W and the O-lines are irrelevant (and actually three-stated), they are used as follows for repetitive type instructions:

| | O0 | O1 | O2 | R/W | BRQ |
|---|---|---|---|---|---|
| MUL | 0 | 0 | 0 | * | 0 |
| MULS | 0 | 1 | 0 | * | 0 |
| DIV | 0 | 0 | 1 | * | 0 |
| DIVS | 0 | 1 | 1 | * | 0 |
| NORM | 1 | 0 | 1 | * | 0 |
| SLID/SALD | 1 | 1 | 1 | * | 0 |
| SLRD/SARD | 1 | 1 | 0 | * | 0 |

O2 = 1 means left shift
O2 = 0 means right shift
*R/W - 1 on those cycles in the sequence where AC0 and AC1 are shifted as one word.
NOTE: Additional control fields are supplied from the instruction register 218. For example, this register 218, which is strobed only in fetch cycles, stores the shift (2) and skip (3) fields.

In operation, the microprogram register 212 latches a current microinstruction received from the PLA 206 on bus 210, while in parallel supplying the address for the next microinstruction to the PLA on bus 214. At the end of a cycle, the result of operation of the ALU data path 104 is latched in the register in register file 166 selected as the destination register (depending on the microinstruction), and a new microinstruction from PLA 206 is latched in the microprogram register 212.

As an example of this process, a representative ALU instruction cycle will be described with the aid of the timing diagram shown in FIG. 3. This ALU machine instruction with unfulfilled skip condition translates into one microinstruction and consequently to one cycle. Three parallel processes occur in this type of cycle:

1. The specified ALU operation is executed in ALU data path 104 and the result is latched to the selected destination register in register file 166.

2. The next machine instruction is fetched. Part of the machine instruction is latched in the bus register 120 for possible effective address calculation, and part of it goes to PLA 206, constituting the starting microprogram address.

3. The next microinstruction is fetched from the PLA 206 and latched in the microprogram register 212.

These three processes include the following parallel operations:

| | |
|---|---|
| 1. SRC (F) DST ---> | (F) specifies ALU operation. |
| 2. PC ---> IB<br><br>PC + 1 ---> PC | Supply the address of the contents of the PC 112 as the next machine instruction and then increment the PC. |
| 3. IB (10-15) ---> BR<br><br>IB (0-9) ---> PLA | The contents of the memory (new machine instruction) are transferred to PLA 206 and BR 120. |
| 4. Next Microinstruction ---><br>Microprogram Register 212 | The next microinstruction is fetched from the PLA 206. |

Figure 3:
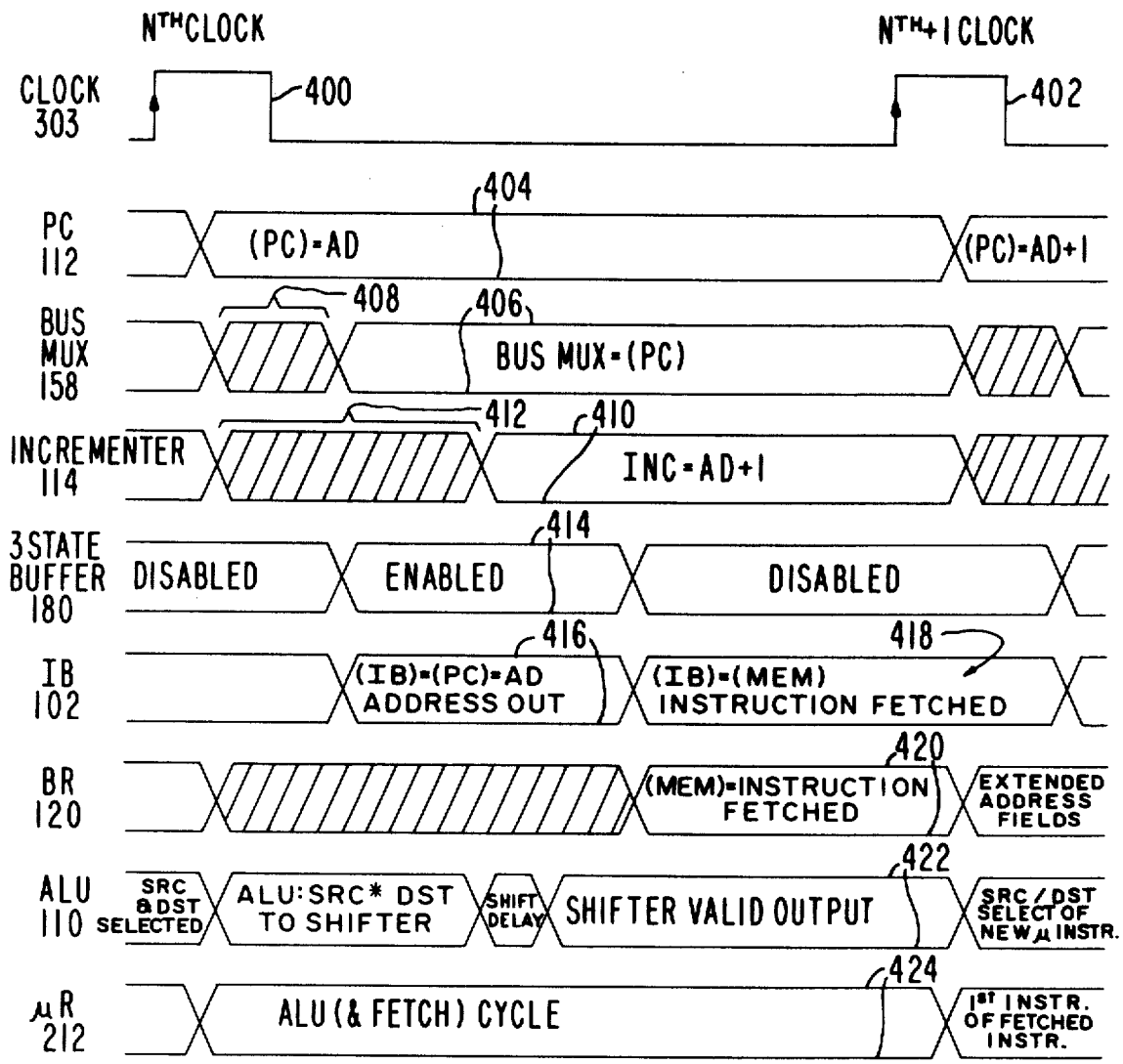
FIG. 3 is a set of waveform diagrams useful for understanding the operation of the microprocessor system shown in FIG. 1.

The parallel operations on the different components in the data path unit 100 are shown in FIG. 3.

The Nth clock pulse 400 loads the microinstruction from the PLA 206 into the microprogram register 212. This microinstruction has the following fields:

| | |
|---|---|
| BRHE | Enable |
| BRLE | Enable |
| BR MUX | EXT BUS (Fetch) |
| MAR | Enable |
| SPC | Enable |
| SBR | Disable |
| SAD | Disable |
| PCE | Enable |
| INC | Enable |
| DST MUX | Specified Destination |
| SRC MUX | Specified Source |
| SRC CON | Microinstruction Register |
| DST CON | Microinstruction Register |
| SL 89 | Disabled |
| SRCZ | Disabled |
| ALU Function | Specified Function |
| SWAP | Disabled |
| INH | Disabled |
| O-Lines | Fetch |
| R/W | Read |
| BRQ | Enable |
| NEXT ADDRESS | Specified Next Address |

On the Nth+1 clock pulse 402 the following components are affected:

Bus register (BR) 120 is loaded with the extended address field of the fetched instruction.

Program counter (PC) 112 is loaded with the output of the increment (PC)+1.

Destination register (DST) in register file 166 and carry are loaded with the output of the shifter 148.

Microprogram register (μR) 212 is loaded with the output of the PLA 206 (first microinstruction of the fetched machine instruction).

The typical clock cycles are 200 nanoseconds (ns) for pure ALU instructions and 300 ns for bus cycles (memory, I/O).

Waveform 404 shows that the Nth clock pulse 400 causes the address of an instruction to be fetched to be loaded into the program counter 112. This waveform 404 also shows that the address of a succeeding instruction is loaded into the program counter 112 by the Nth+1 clock pulse 402. The contents of the program counter 112 are then supplied to the bus multiplexer 158, as shown by waveform 406. A time interval 408 is allowed for this purpose. Once the contents of the program counter 112 have been supplied to the bus multiplexer 158, the incrementer 114 can generate the address of the next instruction, as shown by the waveform 410. A longer time interval 412 than time interval 408 is allowed for this purpose. Once the contents of the program counter 112 have been supplied to the bus multiplexer 158, three state buffer 180 is enabled, as shown by waveform 414, so that the address of the instruction to be fetched can be supplied to the information bus 102, as shown by waveform 416. Waveform 416 also shows the presence of the fetched instruction on information bus 102 at 418. The fetched instruction on information bus 102 is supplied to bus register 120, as shown by waveform 420. Waveform 422 shows that, at the same time as the fetch operation, an ALU operation is carried out on the contents of the source register in register file 166 and latched in the destination register in register file 166 through shifter 148. Waveform 424 shows the control signal from microprogram register 212 for the fetch and ALU cycles described by the other waveforms.

TIMING UNIT 300

Figure 4:
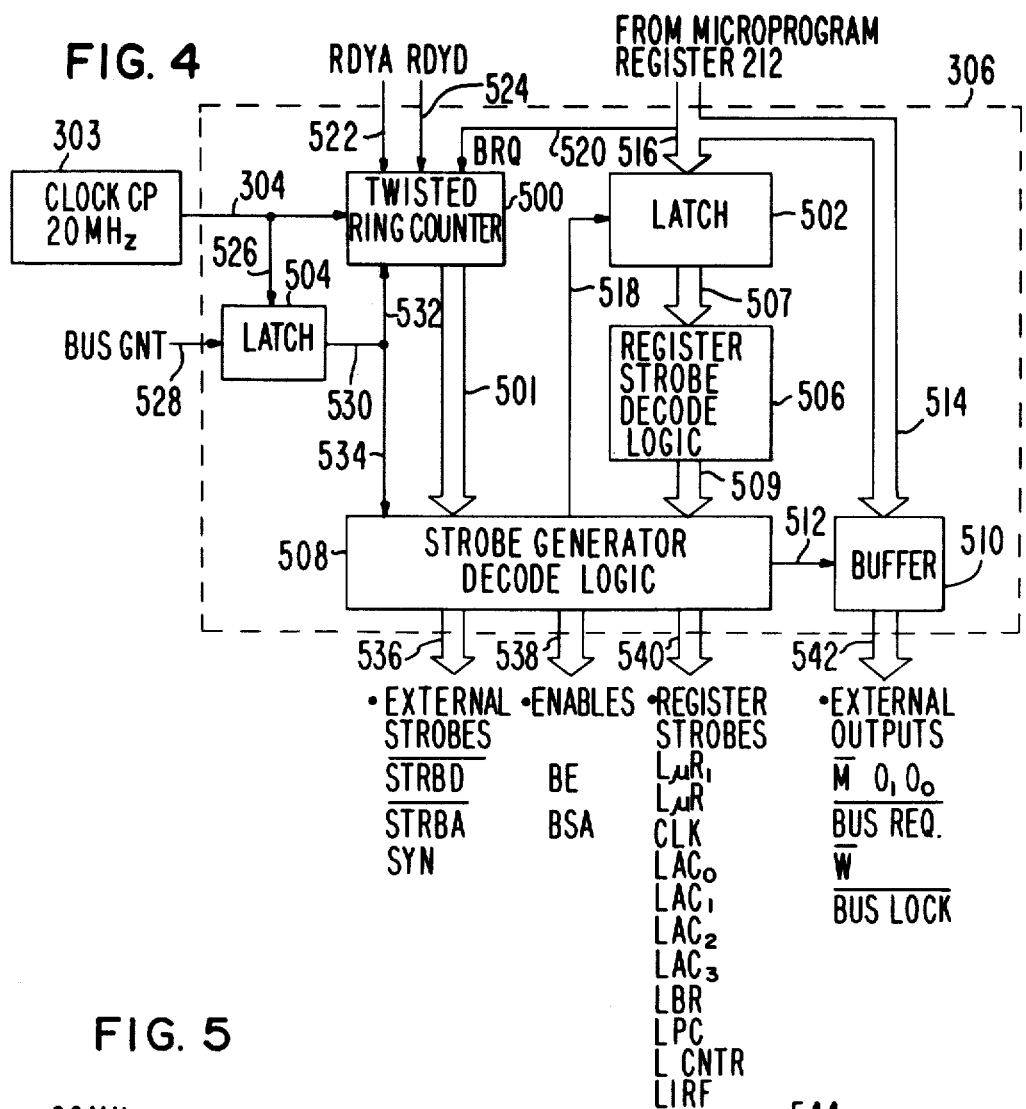
FIG. 4 is a more detailed block diagram of the timing and strobe generator circuit shown in FIG. 1.

FIG. 4 shows further details of the timing and strobe generator 306 shown in the system diagram of FIG. 1. The generator 306 includes a twisted ring counter 500, a microprogram latch 502, a bus grant latch 504 and register strobe decode logic 506. The twisted ring counter 500 is connected to strobe generator decode logic 508 by bus 501. Microprogram latch 502 is connected to register strobe decode logic 506 by bus 507. Register strobe decode logic 506 is in turn connected to strobe generator decode logic 508 by bus 509. A buffer 510 is connected to strobe generator decode logic 508 by line 512. The buffer 510 is also connected to microprogram register 212 by bus 514. Bus 516 also connects the microprogram register 212 to microprogram latch 502. Strobe generator decode logic 508 is also connected to microprogram latch 502 by line 518. Bus request line 520 forms one input to three bit twisted ring counter 500. Two other inputs to the twisted ring counter 500 are provided by the ready address and ready data lines 522 and 524, respectively. The 20 megahertz (mHz) clock 303 is connected to the twisted ring counter 500 by line 304. Line 526 also connects the clock 303 to bus grant latch 504. The other input to bus grant latch 504 is provided by bus grant line 528. Output 530 of the bus grant latch 504 is connected to the twisted ring counter 500 by line 532 and to the strobe generator decode logic 508 by line 534. External strobe generator decode bus 536 forms one output from strobe generator decode logic 508. Enable bus 538 forms a second output from the decode logic 508. Register strobe bus 540 forms a third output from the decode logic 508. An external output bus 542 provides outputs from the buffer 510.

Figure 5:
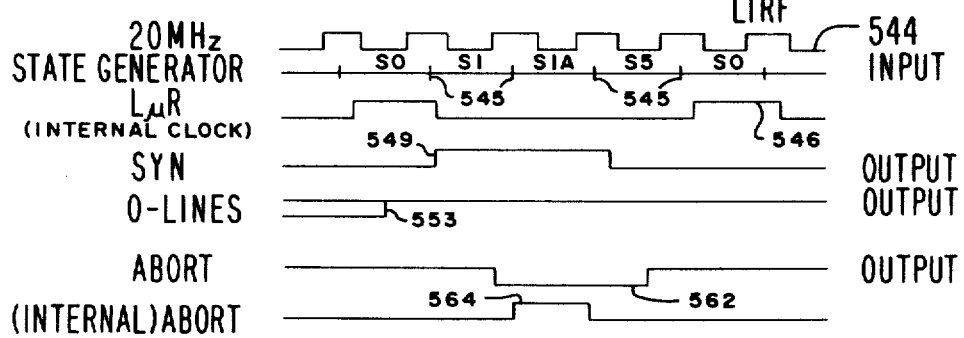
FIGS. 5 and 6 are timing diagrams showing waveforms useful for a further understanding of operation of the microprocessor system shown in FIGS. 1, 2 and 4.

The timing and strobe generator 306 produces the strobes for the various internal registers of the microprocessor and the interface strobes for communication with external memory, input/output/(I/O) devices and the console of a system incorporating the microprocessor. Further details of the operation of the timing and strobe generators 306 are provided by the timing waveform diagrams of FIGS. 5 and 6, which respectively represent the timing of an ALU or short cycle and a memory, I/O or long cycle. The 20 mHz clock signal 544, generated by clock 303, is divided by the three bit twisted ring counter 500. States 545 are determined by counter 500. The divide ratio is one by four or one by six to produce the internal clock signals 546 and 548 in FIGS. 5 and 6, respectively, depending on whether a short or long cycle is required. Synchronizing signal 549 is generated once for each microinstruction cycle. The long cycle (FIG. 6) can be extended indefinitely by the bus grant input signal 550, the ready address input signal 552 and the ready data input signal 554, which maintain the S1 and S3 states in the twisted ring counter 500 for this purpose. The signal 533 on O lines (described below) indicates a short cycle (as in FIG. 5) or indicates the type of information on the information bus 102 in a long cycle (as in FIG. 6). The bus enable signal 556 is an internal signal supplied to 3-state buffer 180 from microprogram register 212 to put data on the bus 186. The address strobe and data strobe signals 558 and 560, respectively, together with synchronizing signal 549, control the address and data time. The ABORT signal 562 indicates the time interval during which an internal ABORT signal 564 may be received by the PLA 206, which will cause it to execute an ABORT operation in the next micro-cycle. The information bus output and input signals 566 and 568 indicate time periods for different types of information on information bus 102. Interval 570 is for addresses or I/O instructions in memory cycles and I/O cycles, respectively. Interval 572 is for data input and output. Internal bus select signal 574 selects the input to bus multiplexer 158.

The microprogram register latch 502 is used to buffer certain outputs of the microprogram register 212 to prevent these outputs from changing when the microprogram register 212 is strobed by the internal clock signal 546 or 548. The bus grant latch 504 is latched by the bus grant input signal 550 permanently if the microprocessor is used alone to avoid an unnecessary time delay before outputting an address when parallel processors are not employed.

All of the required strobes in the system, as shown in FIG. 4, are generated from a combinatorial decode of the outputs of twisted ring counter 500 and certain bits of the microprogram register 212 or the microprogram register latch 502, as shown in the following table.

TABLE I

|  | STATE | COUNTER | | | LμR | SYN | BE | STRBD | BSA | STRBA | LμR1 | BUSLOCK |
|  |  | C0 | C1 | C2 |  |  |  |  |  |  |  |  |
| --- | --- | --- | --- | --- | --- | --- | --- | --- | --- | --- | --- | --- |
| LONG | S0 | 1 | 0 | 0 | A |  |  |  |  |  |  | X |
|  | S1 | 1 | 1 | 0 |  | A | G |  |  | G |  | X |
|  | S2 | 1 | 1 | 1 |  | A | A |  |  |  |  | Y |
|  | S3 | 0 | 1 | 1 |  |  | W | A | W |  | A | Y |
|  | S4 | 0 | 0 | 1 |  |  | W | A | W |  |  | Y |
|  | S5 | 0 | 0 | 0 |  |  | W | R | W |  |  | Y |
| SHORT | S0 | 1 | 0 | 0 | A |  |  |  |  |  |  |  |
|  | S1 | 1 | 1 | 0 |  | A |  |  |  |  |  |  |
|  | S1A | 0 | 1 | 0 |  | A |  |  |  |  | A | O |

TABLE I-continued

| STATE | COUNTER | | | LμR | SYN | BE | STRBD | BSA | STRBA | LμR1 | BUSLOCK |
|---|---|---|---|---|---|---|---|---|---|---|---|
| | C0 | C1 | C2 | | | | | | | | |
| S5 | 0 | 0 | 0 | | | | | | | | O |

KEY:
A—Active
G—Active only if BUS GNT is latched
W—Active only on write cycles
R—Active only on read cycles
X,Y—Logic change
O—Force reset
LμR—Microprogram register (μR) strobe and general clock for all registers
LμR1—Intermediate strobe for some bits of μR
BE—Bus enable—enables data onto bus
BSA—Bus select accumulator—changes bus from address to data for write operations
False state trap: O × 0 forced to 100 on next state (long cycle)

FIG. 7 shows circuit details of the twisted ring counter 500 of the timing generator 306. Flip-flops 600, 602 and 604 whose circuitry is each formed by a flip-flop in the integrated circuit designated 74LS74 and made by Fairchild Camera and Instrument Corporation, or is substantially identical to the 74LS74 flip-flops in the case of a single integrated circuit chip embodiment of this invention, make up the three bits of the counter 500. For these and other integrated circuits shown, the numerical designation in the circuit block or otherwise indicated refers to a commercially available integrated circuit type in the 74LS family. Further details on these commercially available integrated circuits are available from their respective data sheets, as contained in the publication "TTL Data Book", published in 1978 and available from Fairchild Camera and Instrument Corporation, the disclosure of which is incorporated by reference herein. The remaining logic gates in the circuit control the operation of the flip-flops 600–604. A bus request signal (μRBRQ) is supplied on line 520 (see also FIG. 4) from microprogram register 212 to inverter 606. This signal is also supplied to the strobe generator decode logic 508 (FIG. 4), to AND gate 608 and to NAND gate 610. The output of inverter 606 forms one input to AND gate 612. The outputs of AND gates 608 and 612 are provided as inputs to a NOR gate 614. The output of the NOR gate 614 constitutes the D input to flip-flop 600. A+Vcc voltage source and clock 303 provide the two inputs the AND gate 616, the output of which is connected to the clocking pulse input terminal CP of each flip-flop 600–604. The $\overline{Q}$ output of flip-flop 600 provides a Col signal as an input to NAND gate 618. The other input to NAND gate 618 is the output of NAND gate 610. In addition to the μRBRQ signal discussed above, the other inputs to NAND gate 610 are the C1 signal from the Q terminal of flip-flop 602, and the inverted RDY signal supplied by inverter 620. The Q terminal of flip-flop 600 provides an output signal C0 as an input to decode logic 508 (FIG. 4). The output of NAND gate 618 is connected to the D terminal of flip-flop 602. Output signal C1 is provided at the Q terminal of flip-flop 602, and output signal C11 is provided on its $\overline{Q}$ terminal. The C11 signal is provided as an input to the decode logic 508 (FIG. 4), as an input to AND gate 612, and as an input to AND gate 622. AND gates 622, 624, 626 and 628 all provide inputs to NOR gate 630, the output of which is connected to the D terminal of flip-flop 604. The other input to AND gate 622 is connected to the +Vcc source. The C01 signal at the Q terminal of flip-flop 600 is supplied as one input to AND gate 624. The other input to AND gate 624 is the C21 signal at the $\overline{Q}$ terminal of flip-flop 604. That signal is also supplied as an input to AND gate 608. The output of inverter 606 provides one input to AND gate 626. Its other two inputs are provided by the +Vcc source. The C21 signal at the $\overline{Q}$ terminal of flip-flop 604 is further provided as one input to flip-flop 628. The other two inputs are the +Vcc source and an output signal from latch 502, supplied on line 532 (see also FIG. 4). The C2 output signal at the Q terminal of flip-flop 604 is provided as an input to decode logic 508.

FIGS. 7A, 7B and 7C show logic circuits 632, 634 and 636, respectively, for generating certain control signals primarily from the outputs of the twisted ring counter 500. AND gates 638 and 631 provide two inputs to NOR gate 633. The C01 signal is one input to AND gate 638. The other two inputs are the μRBRQ signal and a μRR/W signal. The output of NOR gate 633 is a $\overline{BSA}$ signal. The inputs to AND gate 631 are grounded. The C01 and C21 signals provide the inputs to NAND gate 635, the output of which is connected to one input of NAND gate 637. The other input to NAND gate 637 is the C11 signal. The output of NAND gate 637 is a PLAP1 signal. The C0, C2 and $\overline{C2}$ signals provide three inputs to NAND gate 639. The other input is an F signal. The output of NAND gate 639 is a $\overline{F2}$ signal.

The microprogram register latch 502 in the timing generator 306 may be implemented in this embodiment by use of a 74LS373 type octal transparent latch having three state outputs. The bus grant latch 504 may be implemented with a 74LS78 type dual JK flip-flop.

The register strobe decode logic 506 of the timing generator 306 may be implemented as shown in FIG. 8. The integrated circuit 640 shown is a 74LS138 type of 1-of-8 decoder/demultiplexer. Inputs to the decoder/demultiplexer 640 are obtained from the microprogram register latch 502. Five of the outputs are inverted by inverters 642, 644, 646, 648 and 650, then supplied to strobe generator decode logic 508. One of the outputs is supplied an an input to NAND gate 652 along with an input from microprogram register latch 502. The output of NAND gate 652 is also supplied to decode logic 508. The remaining output from decoder/demultiplexer integrated circuit 640 is supplied to NAND gate 654 along with an input from decode logic 508, with the output of NAND gate 654 also being supplied to the decode logic 508.

Figure 9A:
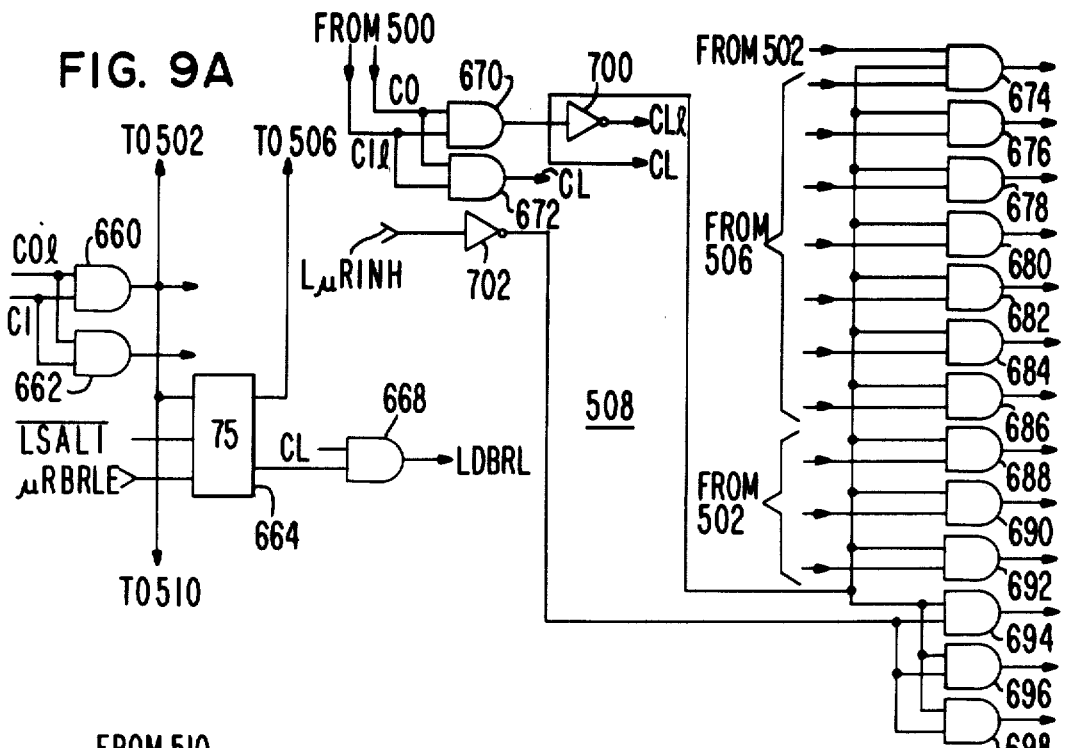
Figure 9B:
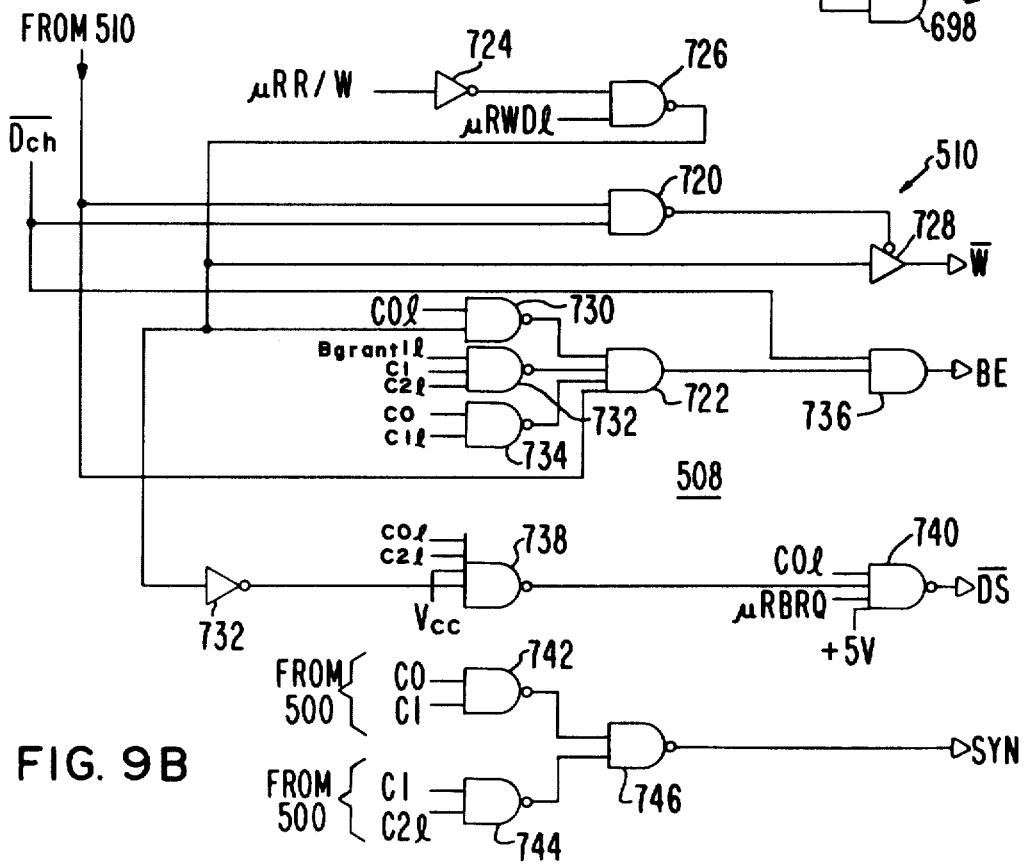

Details of the strobe generator decode logic 508 are shown in FIGS. 9A and 9B. Turning first to FIG. 9A, the C01 and C1 signals are provided as inputs to AND gate 660, the output of which provides the LμR1 signal, which is also supplied to the microprogram register latch 502. The same inputs are supplied to a second AND gate 622, which generates another LμR1 signal.

The first LµR1 signal is supplied to the microprogram register latch 502 and as an input to 74LS75 type four bit bistable latch integrated circuit 664. The other two inputs to the latch 664 are $\overline{\text{LSAC1}}$ and µRBLE and an output of the latch integrated circuit 664 is connected by line 666 to decode logic 506. Another output of the latch integrated circuits 664 forms one input of AND gate 668, the other input of which is a clock signal CL. The output of AND gate 668 is a LDBRL signal.

The C0 and C11 signals from twisted ring counter 500 are supplied as inputs to AND gates 670 and 672, which produce CL signals as their outputs. The CL signal is supplied as one input to each of AND gates 674–698. The CL signal is also inverted by inverter 700 to produce a CL1 signal. The other inputs to AND gates 674–686 are from register strobe decode logic 506 (FIG. 8). The other inputs to AND gates 688–692 are from microprogram register latch 502. A LµRINH signal is inverted by inverter 702 and supplied as the other input to each of the AND gates 694–698.

FIG. 9B shows a further portion of the strobe generator decode logic 508. The µRBRQ signal from buffer 510 is supplied as an input to NAND gate 720 and AND gate 722. A µRR/W input signal is inverted by inverter 724 and supplied as one input to NAND gate 726. Its other input is a µRWD1 signal. The output of NAND gate 726 forms one input to quad bus buffer gate 728, forming part of buffer 510. The output of NAND gate 726 also provides one input to NAND gate 730 and to inverter 732. A $\overline{\text{Dch}}$ signal provides a second input to NAND gate 720, the output of which is connected as the other input of buffer gate 728. The output of buffer gate 728 constitutes a W signal. The C01 signal from twisted ring counter 500 (FIG. 7) provides a second input to NAND gate 730, the output of which forms one of the inputs to AND gate 722. The Bgrant11, C1 and C21 signals from twisted ring counter 500 form inputs to NAND gate 732, the output of which is another input to AND gate 722. The C0 and C1L signals, also from twisted ring counter 500, are the inputs to NAND gate 734, the output of which is the remaining input to AND gate 722. The output of AND gate 722 is one input to AND gate 736, the other input to which is the $\overline{\text{Dch}}$ signal. The output of AND gate 736 is a bus enable (BE) signal.

The C01 and C21 signals from twisted ring counter 500 form two inputs to NAND gate 738. The +Vcc potential and the output of inverter 732 form the remaining inputs to the NAND gate 738. The C01 signal and the output of NAND gate 738 form two inputs to NAND gate 740. The other inputs to NAND gate 740 are the µRBRQ signal from buffer 510 and a +5-volt potential. The output of NAND gate 740 is a $\overline{\text{DS}}$ signal. The C0 and C1 signals from twisted ring counter 500 form inputs to NAND gate 742. Similarly, the C1 and C21 signals form inputs to NAND gate 744. The outputs of NAND gates 742 and 744 are supplied as inputs to NAND gate 746, the output of which is a synchronizing signal, SYN.

Figure 10A:
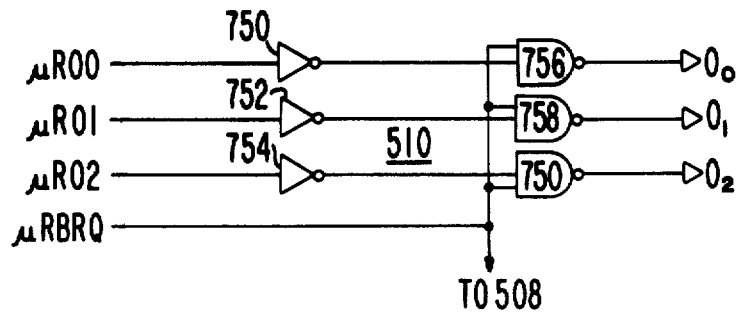

FIG. 10A shows a portion of the buffer 510. Three output signals from the microprogram register 212 (µR00, µR01, µR02) are respectively supplied as inputs to inverters 750, 752 and 754. The outputs of these inverters are each respectively supplied as inputs to NAND gates 756, 758 and 760. The other input to the NAND gates 756–760 is the microprogram register bus request (µRBRQ) signal. The three outputs of the NAND gates 756–760 are, respectively, the $O_0$, $O_1$ and $O_2$ output signals, supplied to bus 542 (FIG. 4).

Figure 10B:
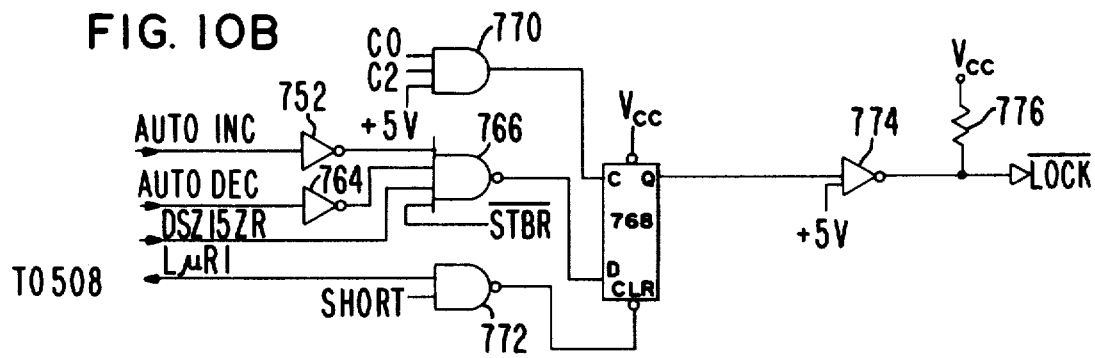

Details of another portion of the buffer 510 are shown in FIG. 10B. The auto increment and auto decrement signals are respectively supplied as inputs to inverters 762 and 764. The outputs of the inverter 762 and 764 form the inputs to NAND gate 766. A $\overline{\text{DSZ1SZR}}$ signal provides a third input to NAND gate 766. A $\overline{\text{STBR}}$ signal provides the remaining input to NAND gate 766. The output of NAND gate 766 forms D input to D type flip-flop 768. The C0 and C2 signals from twisted ring counter 500 form two inputs to AND gate 770. The +5-volt source provides two additional inputs (shown as only a single input in FIG. 10B) to AND gate 770. The output of AND gate 770 forms the C input to flip-flop 768. The LµR1 signal and the SHORT (equivalent to $\overline{\text{BREQ}}$) cycle signals form inputs to NAND gate 772. The output of NAND gate 772 forms the clear input to flip-flop 768. The Q output of flip-flop 768 forms an input to inverter 774. The output of inverting buffer amplifier 774 is the LOCK signal. The +Vcc voltage source is also connected through resistor 776 to the output of inverting buffer amplifier 774.

Figure 10C:
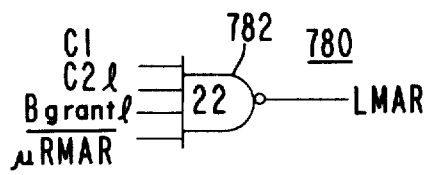

FIG. 10C shows a logic circuit 780 for producing a LMAR signal. The C1 and C21 signals are provided as inputs to NAND gate 782. Additional inputs are provided by the Bgrant1 and µRMAR signals. The output of NAND gate 782 is the LMAR signal.

Figure 11:
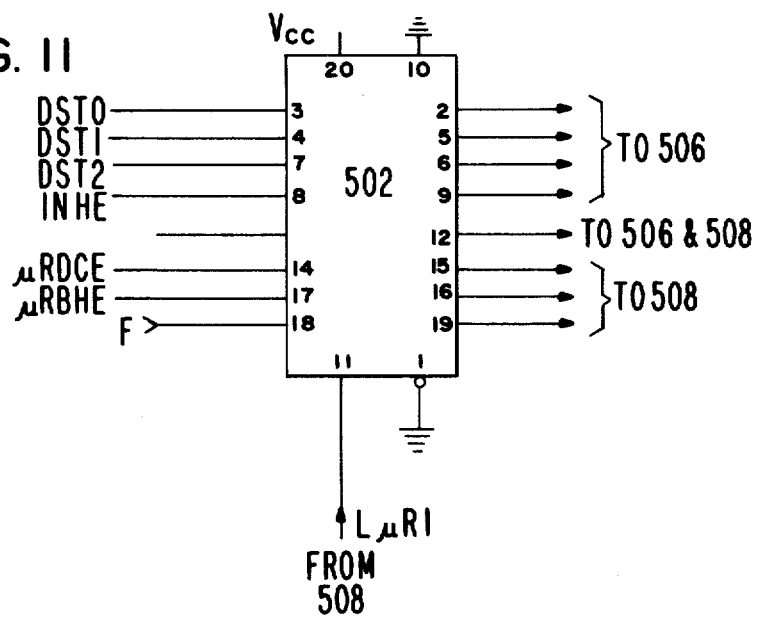

FIG. 11 shows the inputs and outputs from the various pin positions of the commercially available 74LS373 octal transparent latch integrated circuit forming the microprogram register latch 502. Destination register signals DST0, DST1, DST2 are respectively supplied to pins 3, 4 and 7 and an inhibit enable INHE signal is supplied to pin 8. Two signals from the microprogram register 212, µRPCE and µRBRHE, are supplied to pins 14 and 17 and the F signal is supplied to pin 18. The LµR1 signal is supplied to terminal 11 from strobe generator decode logic 508. Terminals 1 and 10 are grounded, and terminal 20 is connected to the +Vcc voltage source. Terminals 2, 5, 6 and 9 are connected to integrated circuit 138 of the microprogram register strobe decode logic 506. Terminal 12 is connected to the register strobe decode logic 506 and the strobe generator decode logic 508. Terminals 15, 16 and 19 are connected to the strobe generator decode logic 508.

CONTROL UNIT 200

The following discussion of FIGS. 12 through 26B, inclusive, describes the PLA 206 (FIG. 1), microprogram registers 212, instruction register 218, and associated logic circuits, which together constitute the control unit 200 shown in FIG. 1.

FIG. 12 shows details of indirect, auto increment and auto decrement logic 800. An IBB1 and IBB2 input signal are provided to NAND gate 802. The output of NAND gate 802 is provided as one input to NAND gate 804. An IBB0 signal is provided as a second input to NAND gate 804. The remaining input to NAND gate 804 is provided by the TRAP logic 838 discussed below in connection with FIG. 13A. The output of NAND gate 804 forms one input to NOR gate 806. The IBB6 and IBB7 input signals provide two more inputs to NOR gate 806. The remaining input to NOR gate 806 is grounded. The output of NOR gate 806 is connected to inverter 808, the output of which provides a ZEXTL signal.

The output of NAND gate 804 provides an $\overline{M}$ signal as an output from the indirect and auto increment and decrement logic 800. The output of NAND gate 804 is further connected to an inverter 810, which provides an M output signal from the logic 800. The output of inverter 810 forms one input of NAND gate 812. The other input of NAND gate 812 is provided by an IBB5 signal. The output of NAND gate 812 is provided as one input to NAND gate 814. A second input to NAND gate 814 is provided by the output of NAND gate 816. One of the inputs to NAND gate 816 is the Q output of 74LS74 type D positive edge triggered flip-flop integrated circuit 818. A second input to the NAND gate 816 is provided by the trap logic circuit 838 discussed below in connection with FIG. 13A. The remaining input to NAND gate 816 is provided by a reset (R) signal, inverted by inverter 820. The third input to NAND gate 814 is provided by the output of NAND gate 822. The R signal is provided as one input to NAND gate 822. Another input to NAND gate 822 comes from the output of AND gate 824. One input to AND gate 824 is the IBB0 signal. Two other inputs are supplied by the Q terminal of flip-flop integrated circuit 818. The third input to NAND gate 822 is provided by a 32 signal. The output of NAND gate 814 provides the D input to flip-flop integrated circuit 818. The clock pulse (CP) input to the flip-flop integrated circuit 818 is provided by the LμR output signal from the strobe generator decode logic 508 (FIGS. 4 and 9A). The output of NAND gate 826 provides the set (S) input to the flip-flop integrated circuit 818. One input to the NAND gate 826 is provided by an INT/TRW signal. The other input to NAND gate 826 is provided by the LμR1 output signal from strobe degenerator decode logic 508. The +Vcc voltage forms another input to the flip-flop integrated circuit 818.

The Q output of flip-flop 818 forms one input to NAND gate 828. The other input to NAND gate 828 is provided by the $\overline{R}$ output of inverter 820. The output of NAND gate 828 forms one input of NAND gate 830. The other input to NAND gate 830 is provided by the output of NAND gate 822. The output of NAND gate 830 provides the indirect (IND) signal to input IN9 of PLA 206.

The Q output of flip-flop 818 is also provided as an input to both AND gates 832 and 834. The R reset signal is provided as a second input to each AND gate 832 and 834. A begin auto increment (BAUTINC) signal is provided as a third input to AND gate 832. A begin auto decrement (BAUTDE) signal is provided as a third input to AND gate 834. The output of AND gate 832 provides an auto increment (AUTINC) signal to input IN10 of PLA 206. The output of AND gate 834 provides an auto decrement (AUTDEC) signal to input IN14 of PLA 206.

FIG. 13A shows details of ABORT and TRAP logic 838 for the PLA 206. The basic ABORT and TRAP functions are provided by flip-flop integrated circuit 840 and flip-flop integrated circuit 842, respectively, each of the 74LS74 type. The D input to flip-flop 840 is provided by the output of NAND gate 843. One input to NAND gate 843 is supplied by an $\overline{F}$ signal, which is also supplied to indirect and auto increment and decrement logic 800. The $\overline{F}$ signal is also inverted by inverter 844 and supplied to the indirect and auto increment and decrement logic 800. The other input to NAND gate 843 is a microprogram register program counter enable (μRPCE) signal. The clock pulse input CP for the flip-flop 840 is supplied by an $\overline{ABORTP}$ signal from timing generator 306. The reset (R) input to the flip-flop 840 is provided by the output of AND gate 846. The two inputs to AND gate 846 are provided by an MRP signal and an $\overline{F_2}$ signal. The Q output of flip-flop 840 provides an ABORT enable (ABORTE) signal, which is provided as one input to NAND gate 848. The other input to NAND gate 848 is from the indirect and auto increment and decrement logic 800. The output of NAND gate 848 provides the input to NOR gate 850, the output of which is connected to a select line SEL44. The $\overline{Q}$ output of flip-flop 840 provides the $\overline{ABORTE}$ signal. It is connected as one input to NOR gate 852. The other input to NOR gate 852 is provided by the $\overline{INT/TRR}$ signal. The output of NOR gate 852 provides the input to NAND gate 854, the output of which is connected to a select line SEL45.

The D input of TRAP flip-flop integrated circuit 842 is provided by the output of NAND gate 856. Two inputs to NAND gate 856 are provided by the output of NAND gate 858. One input to NAND gate 858 is provide by the INT/TRR signal. The Q output of flip-flop 842 provides a second input to NAND gate 858. The remaining input to NAND gate 858 is supplied by the output of NAND gate 860, which also supplied the remaining input to NAND gate 856. A TRAP enable (TRAPE) signal is provided as an input to NAND gate 860. A total of five additional inputs to the NAND gate 860 are provided by the IBB0, IBB12, $\overline{IBB13}$, IBB14 and $\overline{IBB15}$ signals. Another input to the NAND gate 860 is provided by the output of AND gate 862. An X signal provides a second input to AND gate 862, and the $\overline{ABORTE}$ signal provides a third input. The clock pulse input CP for flip-flop 842 is provided by the LμR signal supplied by strobe generator decode logic 508 (FIGS. 4 and 9A). The select input S to integrated circuit 842 is supplied by the +Vcc voltage. An additional input to flip-flop 842 is supplied by an $\overline{RP}$ signal. The Q output of flip-flop 842 provides a TRAP (TRP) signal. The TRP signal is supplied to the interrupt logic 920 to be discussed below in connection with FIG. 14 and interrupt address select logic to be discussed below in connection with FIG. 15. The $\overline{Q}$ output of flip-flop of 842 provides a $\overline{TRP}$ signal, which is also supplied to the interrupt logic 920 of FIG. 14 and the interrupt address select logic 949 of FIG. 15.

Figure 13B:
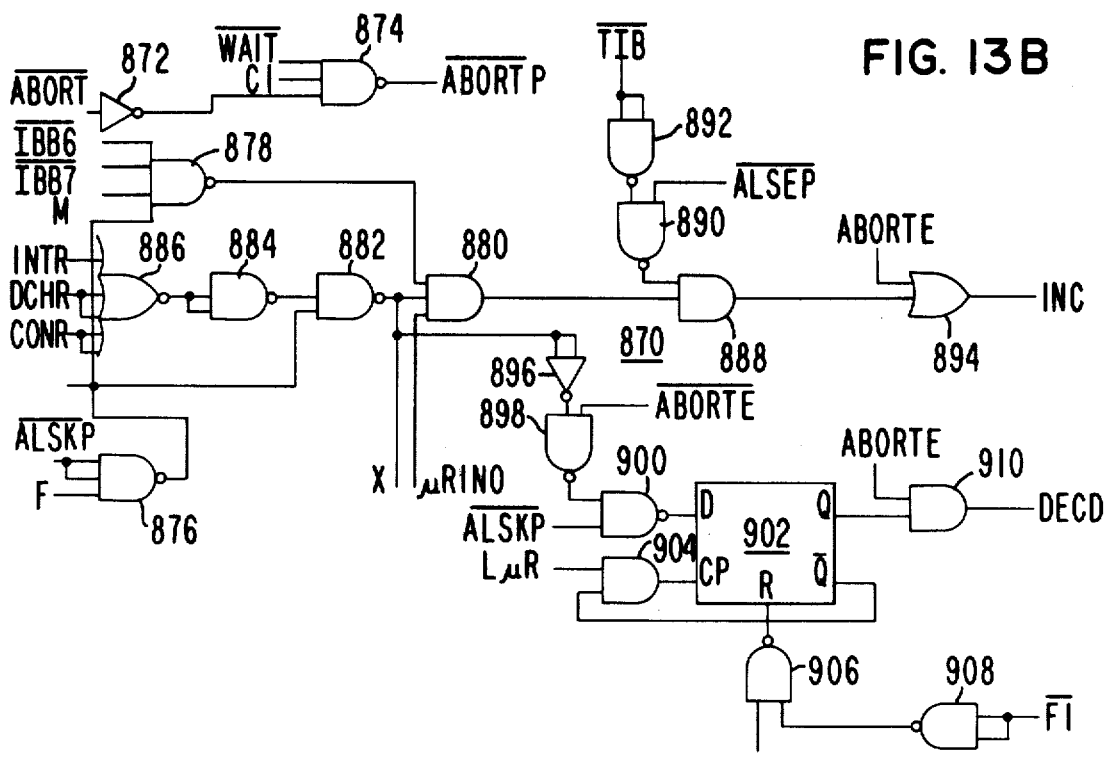

FIG. 13B shows additional logic circuitry 870 for implementing the ABORT function. An $\overline{ABORT}$ signal is supplied as an input to inverter 872. The output of inverter 872 forms one input to NAND gate 874. A WAIT signal forms another input to NAND gate 874. The remaining input to NAND gate 874 is the C1 signal. The output of NAND gate 874 is the $\overline{ABORTP}$ signal, which is used as a clock pulse for flip-flop 840 of ABORT logic 838 in FIG. 13A.

An $\overline{ALSKP}$ signal is supplied as two inputs to NAND gate 876. The F signal is supplied as another input to NAND gate 876. The output of NAND gate 876 is supplied as one input to NAND gate 878. The other inputs to NAND gates 878 are the $\overline{IBB6}$ signal, the $\overline{IBB7}$ signal and the M signal. The output of NAND gate 878 is one input to AND gate 880. A second input to AND gate 880 is supplied by the output of NAND gate 882, which constitutes the X signal. One input to NAND gate 882 is from the output of NAND gate 876. The other input to NAND gate 882 is from the output of NAND gate 884. NAND gate 884 in turn has its two inputs supplied by the output of NOR gate 886. An INTR signal is supplied as one input to NOR gate 886. An DCHR signal is supplied as two inputs to NOR gate 886. A CONR signal is also supplied as two inputs to NOR gate 886. A µRINC signal is supplied as a third input to AND gate 880. The output of AND gate 880 forms one input to AND gate 888. The output of NAND gate 890 forms a second input to AND gate 888. The ALSKP signal is one input to NAND gate 890. The output of NAND gate 892 forms the other input to NAND gate 890. A TIB signal provides two inputs to NAND gate 892. The output of AND gate 888 forms one input to OR gate 894. The other input to OR gate 894 is supplied by the ABORTE output signal from flip-flop 840 of ABORT logic 838 in FIG. 13A. The output of OR gate 894 is an increment (INC) signal.

The X output signal from NAND gate 882 is also supplied as two inputs to inverter 896. The output of inverter 896 forms one input to NAND gate 898. The ABORTE signal from the Q output of flip-flop 840 in FIG. 13A provides two additional inputs to NAND gate 898. The output of NAND gate 898 forms one input to NAND gate 900. The ALSKP signal provides a second input to NAND gate 900. The output of NAND gate 900 is connected to the D input of 74L574 type flip-flop 902. The output of AND gate 904 forms the clock pulse input CP to flip-flop 902. The LµR output of strobe generator decode logic 508 (FIGS. 4 and 9A) forms one input to AND gate 904. The other input to AND gate 904 is provided by the Q̄ output of flip-flop 902. The reset (R) input to flip-flop 902 is provided by the output of NAND gate 906. The ABORTE signal from flip-flop 840 in FIG. 13A forms one input to NAND gate 906. The other input to NAND gate 906 is supplied by the output of NAND gate 908, which has the F1 signal as its two inputs. The Q output of flip-flop 902 forms one input of AND gate 910. The ABORTE signal from flip-flop 840 in FIG. 13A forms the other input to AND gate 910. The output of AND gate 910 is a decrement (DECD) signal.

Figure 14:
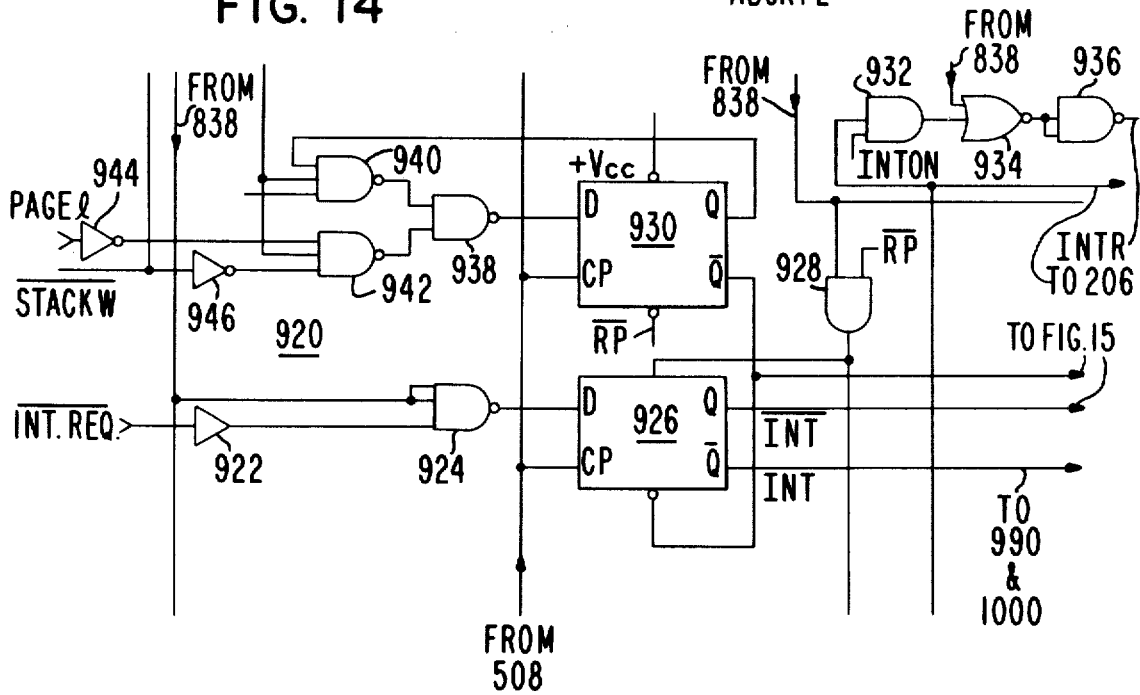

FIG. 14 shows details of interrupt logic 920 for the PLA 206. An INT REQ signal is supplied as the input to inverter 922, the output of which forms one input of NAND gate 924. The INT/TR R signal supplied as an input to the TRAP logic portion of circuit 838 in FIG. 13A is supplied as two additional inputs to NAND gate 924. The output of NAND gate 924 forms the D input of 74LS74 type flip-flop 926. The clock pulse (CP) input to flip-flop 926 is provided by the LµR clock signal from strobe generator decode logic 508. Another input to flip-flop 926 is supplied by the output of AND gate 928. The TRP signal supplied at the Q output of flip-flop 842 in logic circuit 838 of FIG. 13A is provided as one input to AND gate 928. The other input to AND gate 928 is supplied by a RP signal. A final input to the flip-flop 926 is provided by the Q output of flip-flop 930. The Q output of flip-flop 926 provides a not interrupt (INT) signal, which is supplied to the interrupt address select logic 949 of FIG. 15 discussed below. The Q output of flip-flop 926 provides an interrupt (INT) signal, which is supplied as an input to AND gate 932. The other input to AND gate 932 is provided by an INTON signal. The output of AND gate 932 forms an input to NOR gate 934. The other input to NOR gate 934 is the TRP signal from the TRAP logic portion of circuit 838 in FIG. 13A. The output of NOR gate 934 provides two inputs to NAND gate 936. The output of NAND gate 936 is an interrupt (INTR) signal, supplied to input IN27 of PLA 206 (see FIG. 26A). The D input of flip-flop 930 is supplied by NAND gate 938. The output of NAND gate 940 forms one input to NAND gate 938. The Q output of flip-flop 930 forms one input to NAND gate 940. A second input to NAND gate 940 is supplied by the INT/TR R signal. A third input to NAND gate 940 is provided by the STACK W signal. The other input to NAND gate 938 is supplied by the output of NAND gate 942. The INT/TR R signal also forms one input to NAND gate 942. A second input to NAND gate 942 is supplied by the output of inverter 944, which receives the PAGE 1 signal as its input. The third input to NAND gate 942 is supplied by the output of inverter 946, which has the STACK W signal as its input. As in the case of flip-flop 926, the LµR clock signal from strobe generator decode logic 508 in FIG. 4 provides the clock pulse (CP) input to flip-flop 930. The remaining inputs to flip-flop 930 are provided by the +Vcc supply and the RP signal.

Figure 15:
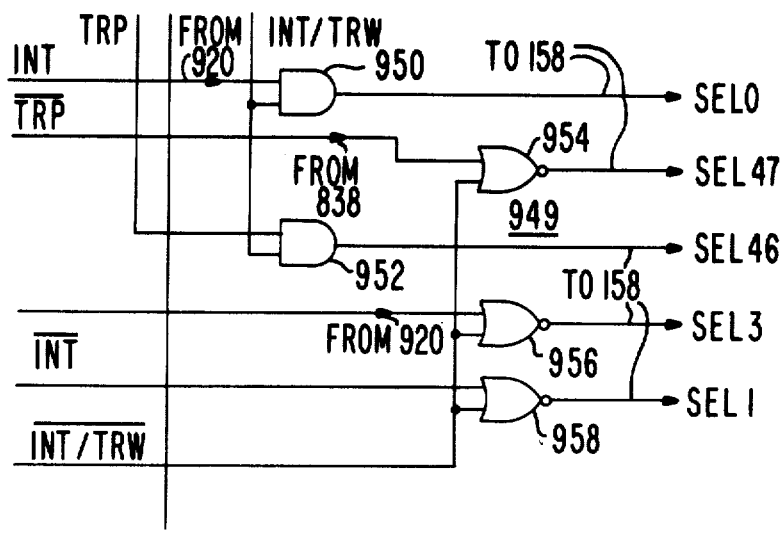

FIG. 15 shows details of the interrupt address select logic, which supplies inputs on bus 196 to bus multiplexer 158 (FIG. 1). The INT signal from interrupt logic 920 is supplied as an input to AND gate 950. The other input to AND gate 950 is supplied by the INT/TR W signal. The output of AND gate 950 is supplied to the SEL0 input of bus multiplexer 158. The INT/TR W signal is also supplied as an input to AND gate 952. The other input to AND gate 952 is supplied by the TRP signal from TRAP logic portion of circuit 838 (FIG. 13A). The output of AND gate 952 is connected to the SEL46 input of bus multiplexer 158. The TRP output of TRAP logic portion of circuit 838 forms one input of NOR gate 954. The other input to NOR gate 954 is supplied by the INT/TR R signal. The output of NOR gate 954 is supplied to the SEL47 input of BUS multiplexer 158. The INT/TR R signal also forms one input to each of NOR gates 956 and 958. The other input to NOR gate 956 is supplied by the Q̄ output of flip-flop 930 in interrupt logic 920 (FIG. 14). The output of NOR gate 956 is connected to input SEL3 of bus multiplexer 158. The other input to NOR gate 958 is supplied by the INT signal from interrupt logic 920. The output of NOR gate 958 is connected to input SEL1 of bus multiplexer 158.

Figure 16:
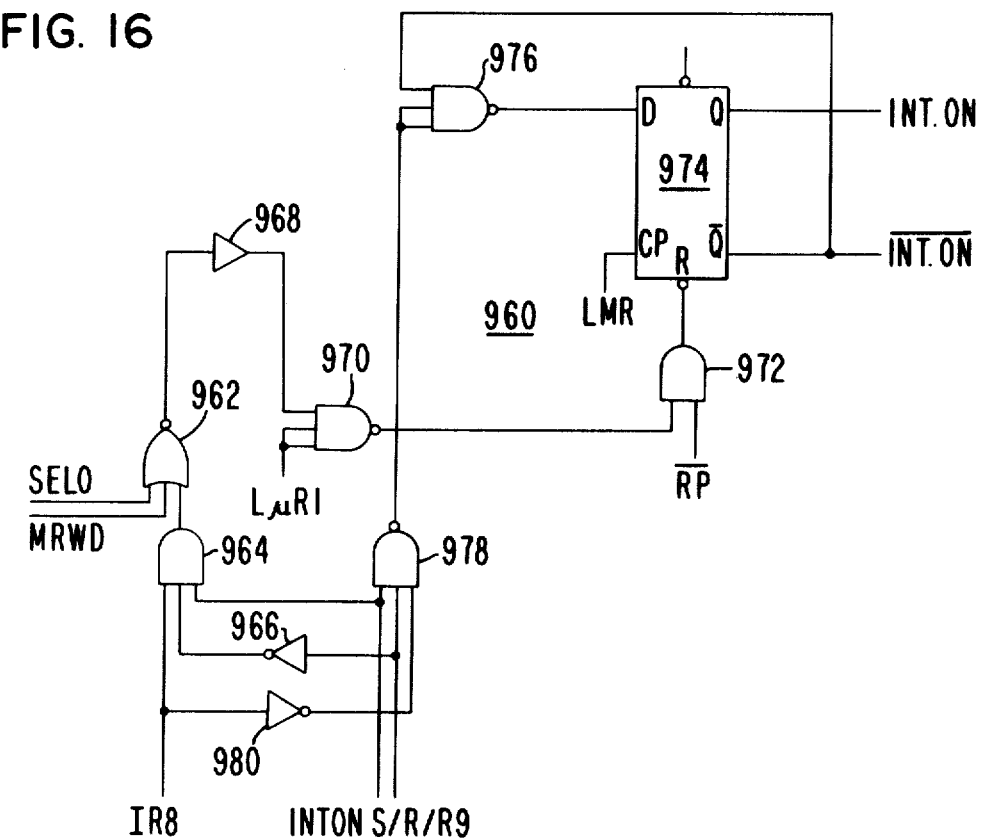

FIG. 16 shows details of the interrupt on logic 960. The signal supplied by interrupt address select logic 949 to the SEL0 input of bus multiplexer 158 is supplied as an input to NOR gate 962. The MRWD signal forms a second input to NOR gate 962. The third input to NOR gate 962 is supplied by the output of AND gate 964. The IR8 output of instruction register 218 (FIGS. 1 and 21) is a first input to AND gate 964. A second input to AND gate 964 is supplied by the output of inverter 966. The IR9 output of instruction register 218 provides the input to inverter 966. An INTON S/R signal is provided as a third input to AND gate 964. The output of NOR gate 962 is inverted by inverter 968 and supplied as an input to NAND gate 970. Two additional inputs to NAND gate 970 are provided by the LµR1 output of strobe generator decode logic 508 (FIG. 4 and FIG. 9A). The output of NAND gate 970 forms one input to AND gate 972. The other input to AND gate 972 is the RP signal. The output of AND gate 972 is connected to the reset input R of flip-flop 974. The LµR output of strobe generator decode logic 508 provides the clock (CP) input to flip-flop 974. The D input to flip-flop 974 is provided by the output of NAND gate 976. The Q̄ output of flip-flop of 974 is one input to NAND gate 976. The output of NAND gate 978 provides two additional inputs to NAND gate 976. The IR9 input to PLA 206 is also provided as an input to NAND gate 978. The INTON S/R signal provides a second input to NAND gate 978. The third input to NAND gate 978 is provided by inverter 980, which receives the IR8 input to PLA 206 as its input. The S input of flip-flop 974 is connected to +Vcc. The Q output of flip-flop 974 is the INT ON signal, and the $\overline{Q}$ output of flip-flop 974 is the $\overline{\text{INT ON}}$ signal.

Figure 17:
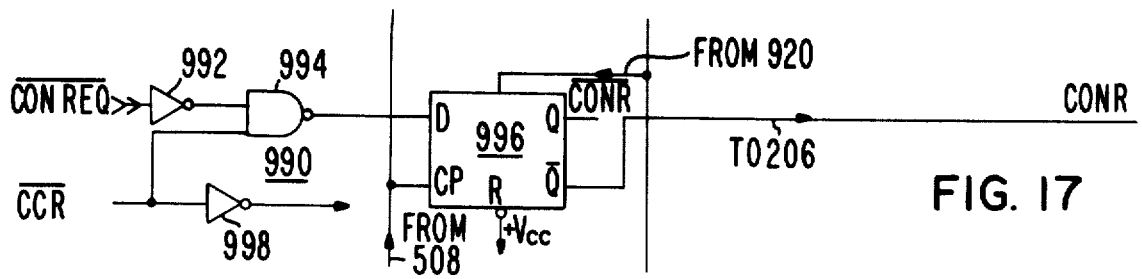

Turning now to FIG. 17, the details of console request logic 990 are shown. A $\overline{\text{CON REQ}}$ signal is provided as an input to inverter 992. The output of inverter 992 forms one input to NAND gate 994. The output input to NAND gate 994 is provided by a $\overline{\text{CCR}}$ signal. The output of NAND gate 994 is supplied to the D input of 74LS74 type flip-flop 996. The $\overline{\text{CCR}}$ signal is also inverted by inverter 998 to produce a CCR output signal. The L$\mu$R output signal from strobe generator decode logic 508 provides the clock (CP) signal for flip-flop 996. The reset (R) terminal of flip-flop 996 is connected to the +Vcc potential. An additional input to flip-flop 996 is provided from interrupt logic 920. The $\overline{Q}$ output of flip-flop 996 provides a $\overline{\text{CONR}}$ signal. The Q output of flip-flop 996 provides a CONR signal, which is supplied to input IN26 of PLA 206 (see FIG. 26A).

Figure 18:
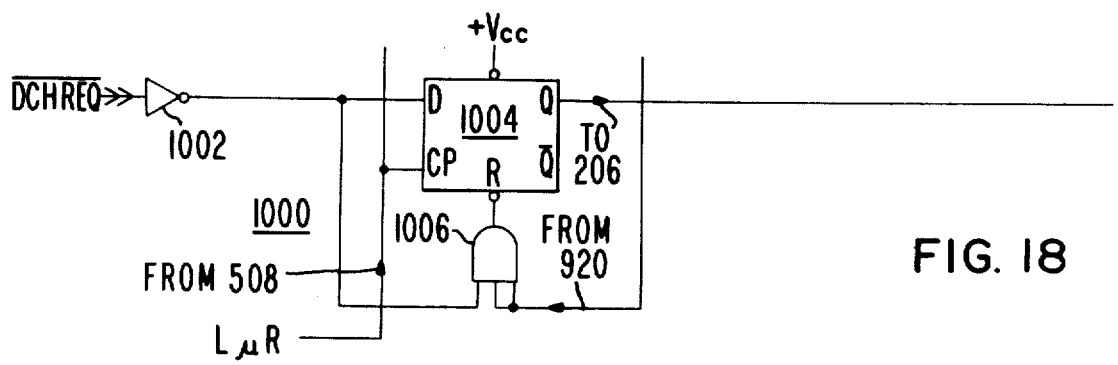

FIG. 18 shows the data channel logic 1000. A $\overline{\text{DCH}}$ $\overline{\text{REQ}}$ signal is provided as an input to inverter 1002. The output of inverter 1002 provides the D input to 74LS74 flip-flop 1004, as well as an input to AND gate 1006. Two additional inputs to AND gate 1006 are provided from interrupt logic 920. The output of AND gate 1006 is connected to the reset (R) terminal of flip-flop 1004. The L$\mu$R output of strobe generator decode logic 508 provides the clock (CP) input to flip-flop 1004. The +Vcc potential provides an additional input to flip-flop 1004. The Q output of flip-flop 1004 provides a data channel request (DCHR) signal to input terminal IN28 of PLA 206 (see FIG. 26A).

Figure 19:
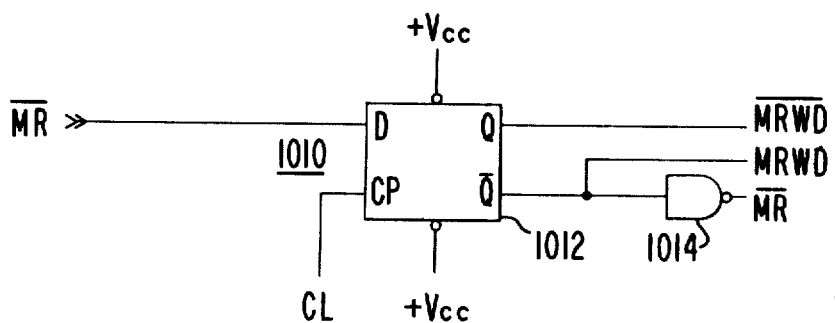

FIG. 19 shows the master reset logic 1010. A $\overline{\text{MR}}$ signal is provided to the D input of 74LS74 type flip-flop 1012. The CL clock signal supplied by strobe generator decode logic 508 provides the clock (CP) input to flip-flop 1012. The +Vcc potential provides two additional inputs to the flip-flop 1012. The Q output of flip-flop 1012 provides a MRWD signal. The $\overline{Q}$ output provides a $\overline{\text{MRWD}}$ output signal. The MRWD signal is also supplied as one input to NAND gate 1014. The other input to NAND gate 1014 is supplied by the L$\mu$R1 clock from strobe generator decode logic 508. The output of NAND gate 1014 provides a $\overline{\text{MRP}}$ signal.

Figure 20:
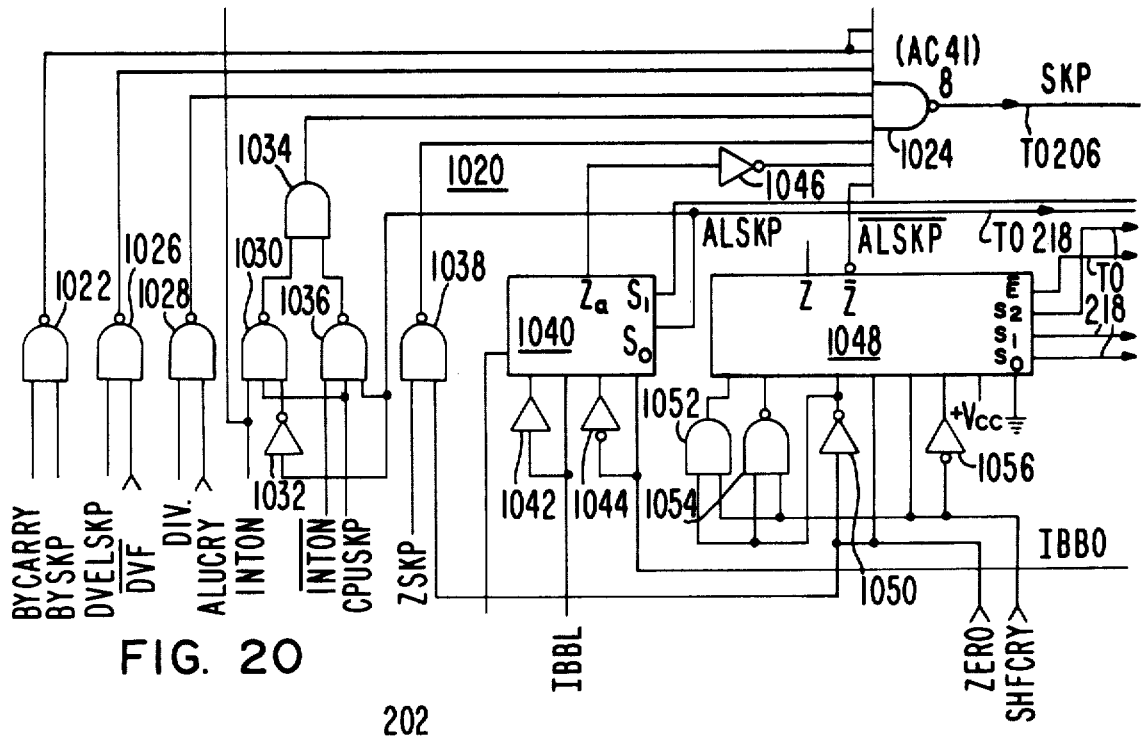

FIG. 20 shows a skip logic circuit 1020. A BYCARRY and a BYSKP signal is provided as two inputs to NAND gate 1022. The output of NAND gate 1022 forms two inputs to NAND gate 1024. A OVFLSKP signal and a $\overline{\text{DVF}}$ signal form two inputs to NAND gate 1026. The output of NAND gate 1026 forms another input to NAND gate 1024. A divide (DIV) signal and a carry (ALUCRY) signal form two inputs to NAND gate 1028. The output of NAND gate 1028 forms another input to NAND gate 1024. The $\overline{\text{INTON}}$ signal and a skip (CPUSKP) signal form two inputs to NAND gate 1030. A third input to NAND gate 1030 is provided by the output of inverter 1032. The input of inverter 1032 is connected to terminal IR9 of instruction register 218. The output of NAND gate 1030 is one input to AND gate 1034. The other input to AND gate 1034 is provided by the output of NAND gate 1036.

Figure 21:
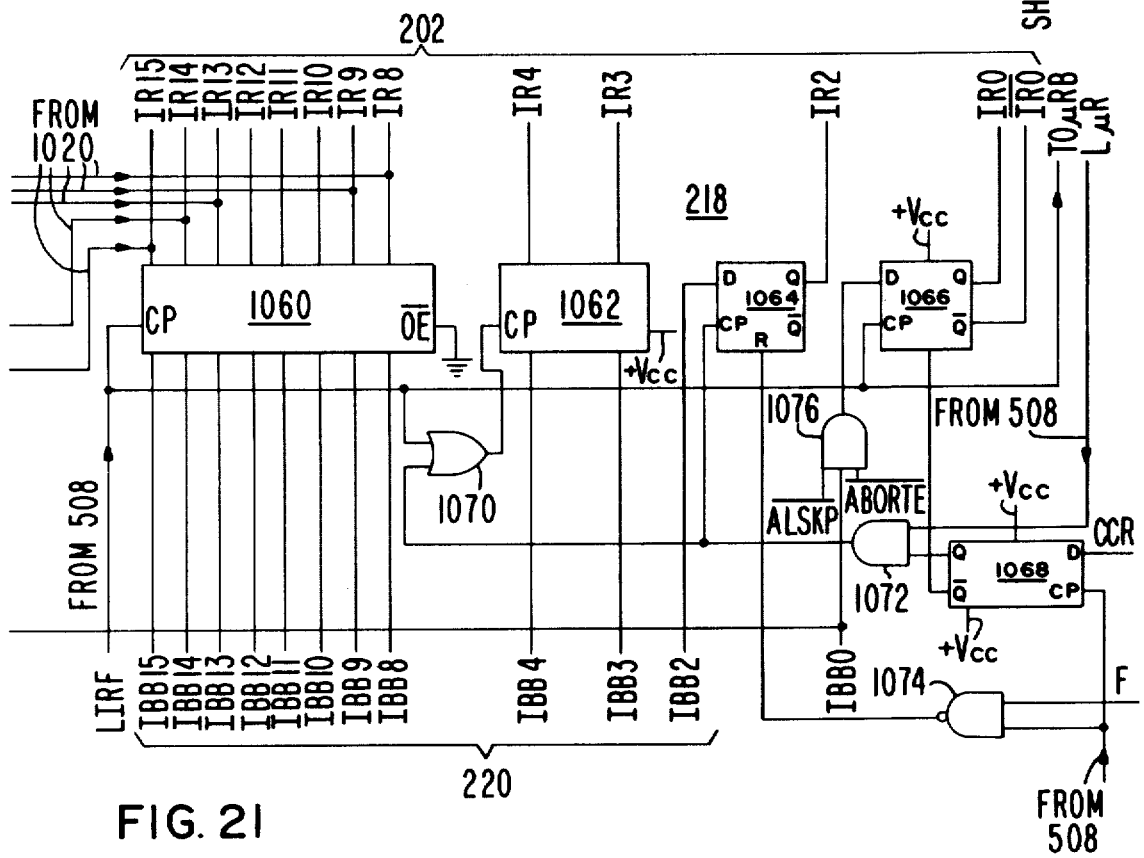

The INTON signal forms one input to NAND gate 1036. The CPUSKP signal forms a second input to NAND gate 1036. The IR0 terminal of instruction register 218 provides a third input to NAND gate 1036. The output of AND gate 1034 provides another input to NAND gate 1024. A ZSKP signal provides one input to NAND gate 1038. A ZERO signal provides the other input to NAND gate 1038. The output of NAND gate 1038 provides another input to NAND gate 1024. A I/OSKP signal provides one input to 74LS153 type dual 4 input multiplexer integrated circuit 1040. Inverter 1042 provides another input to multiplexer circuit 1040. The input of inverter 1042 receives the IBBI signal, which is also supplied as a third input to multiplexer 1040. The output of inverter 1044 provides another input to multiplexer 1040. The IBB0 signal provides the input to inverter 1044, and is also supplied as another input to multiplexer 1040. The Za output of multiplexer 1040 is provided as an input to inverter 1046. The output of inverter 1046 is another input to NAND gate 1024. The S0 and S1 outputs of multiplexer 1040 are connected to the IR9 and IR8 terminals of instruction register 218, respectively. The ZERO signal is provided as an input to 74LS151 type 8-input multiplexer integrated circuit 1048. The ZERO signal is also provided as an input to inverter 1050, the output of which forms another input to the multiplexer 1048. The output of inverter 1050 is also provided as an input to each of NAND gates 1052 and 1054. A SHFCRY signal is provided as a second input to NAND gates 1052 and 1054, and also as an input to multiplexer 1048. The outputs of NAND gates 1052 and 1054 provide two additional inputs to multiplexer 1048. The SHFCRY signal is also provided as an input to inverter 1056, the output of which forms another input to multiplexer 1048. The remaining two inputs to multiplexer 1048 are connected to the +Vcc potential and to ground, respectively. The Z and $\overline{Z}$ outputs of multiplexer 1048 represent the ALSKP and $\overline{\text{ALSKP}}$ signals, respectively. The $\overline{\text{ALSKP}}$ signal is supplied as the last input to NAND gate 1024. The output of NAND gate 1024 is the SKP signal, and is supplied to input terminal IN12 of PLA 206 (see FIG. 26A). The S0, S1 and S2 outputs of multiplexer 1048 are respectively connected to terminals IR15, IR14 and IR13 of instruction register 218 (FIG. 21). The $\overline{\text{E}}$ input of multiplexer 1048 is connected to terminal $\overline{\text{IR0}}$ of instruction register 218.

FIG. 21 shows details of the instruction register 218. The IBB0, IBB2-IBB4 and IBB8-IBB15 terminals of instruction register 218 constitute the bus 220 shown in FIG. 1. The $\overline{\text{IR0}}$, IR0, IR2-IR4 and IR8-IR15 terminals constitute the control signal lines 202 shown in FIG. 1. The instruction register 218 is primarily implemented with a 74LS374 type octal D type flip-flop integrated circuit 1060, a 74LS175 type quad D flip-flop integrated circuit 1062 and 37LS74 type flip-flops 1064, 1066 and 1068. The LIRF output signal from strobe generator decode logic 508 provides the clock signal CP to octal flip-flop 1060. The $\overline{\text{OE}}$ terminal of the circuit 1060 is grounded. Terminals IBB8 through IBB15 form the inputs to octal flip-flop circuit 1060. Terminals IR8 through IR15 are connected to the outputs of the octal flip-flop circuit 1060. The LIRF signal is also supplied as an input to OR gate 1070. The other input to OR gate 1070 is from the output of AND gate 1072. One input to the AND gate 1072 is the L$\mu$R output of strobe generator decode logic 508. The other input to AND gate 1072 is from the Q output of flip-flop 1068. The D input of flip-flop 1068 is connected to receive the CCR signal. The LμR1 output signal of strobe generator decode logic 508 supplies the clock pulse CP to flip-flop 1068. The +Vcc potential forms two additional inputs to the flip-flop 1068. The output of OR gate 1070 provides the clock pulse CP input to flip-flop circuit 1062. The +Vcc and IBB3-IBB4 terminals provide additional inputs to the flip-flop circuit 1062. The IR3 and IR4 terminals are two outputs from the flip-flop circuit 1062. The output of AND gate 1072 also provides the clock pulse signal CP input to flip-flop circuit 1064. The output of NAND gate 1074 is connected to the reset terminal R of flip-flop circuit 1064. The F signal and the LμR1 output signal from strobe generator decode logic 508 are the two inputs to NAND gate 1074. Terminal IBB2 is connected to the D input of flip-flop circuit 1064. The Q output of flip-flop 1064 is connected to terminal IR2. The $\overline{\text{ALSKP}}$ signal is provided as one input to AND gate 1076. The IBB0 terminal provides a second input to AND gate 1076. The $\overline{\text{ABORTE}}$ signal provides a third input to AND gate 1076. The output of AND gate 1076 is supplied to the D input of flip-flop circuit 1066. The LIRF output from strobe generator decode logic 508 provides the clock pulse signal CP to flip-flop circuit 1066. The $\overline{Q}$ output of flip-flop 1068 and the +Vcc potential provide two additional inputs to flip-flop 1068. The Q output of flip-flop 1066 is connected to the IR0 terminal, and the $\overline{Q}$ output of flip-flop 1066 is connected to the $\overline{\text{IR0}}$ terminal.

Figure 22:
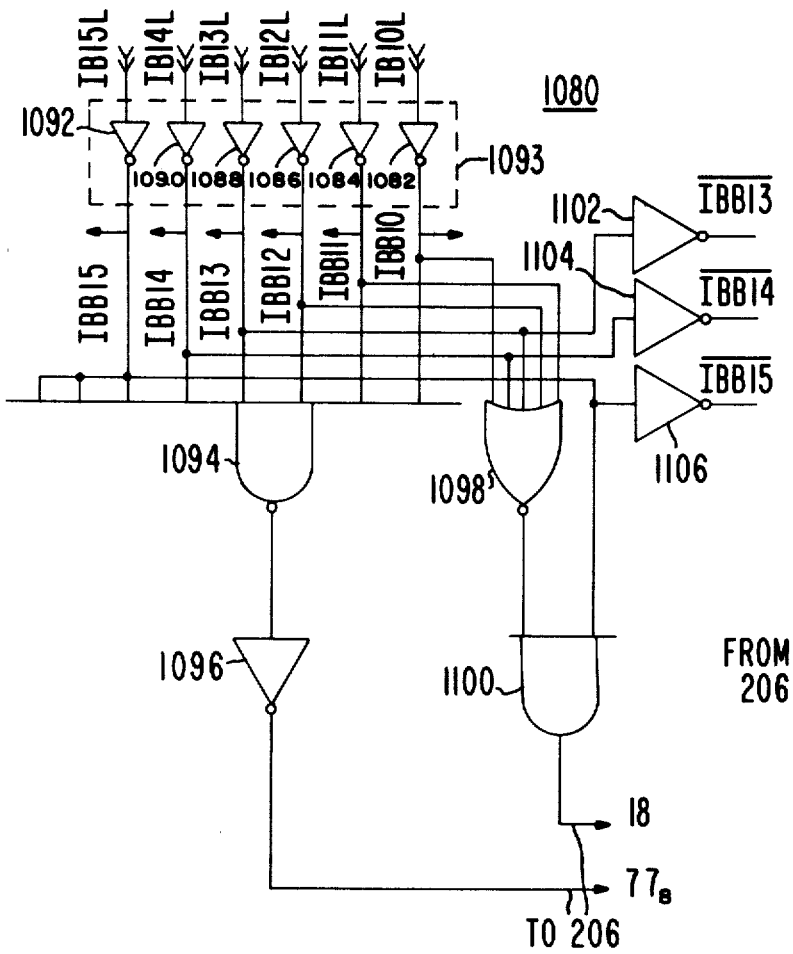
Figures 26, 26A:
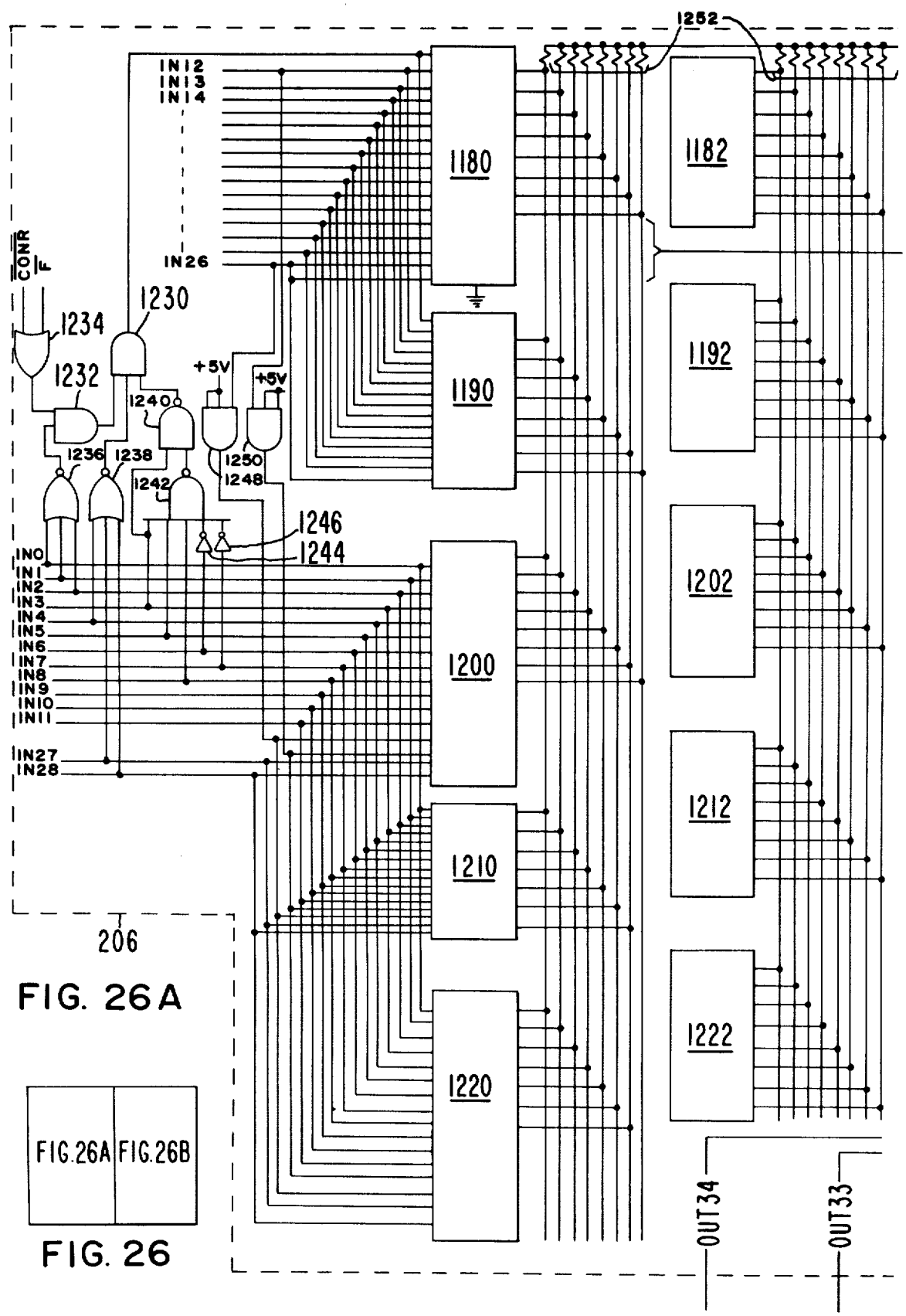
Figure 26:
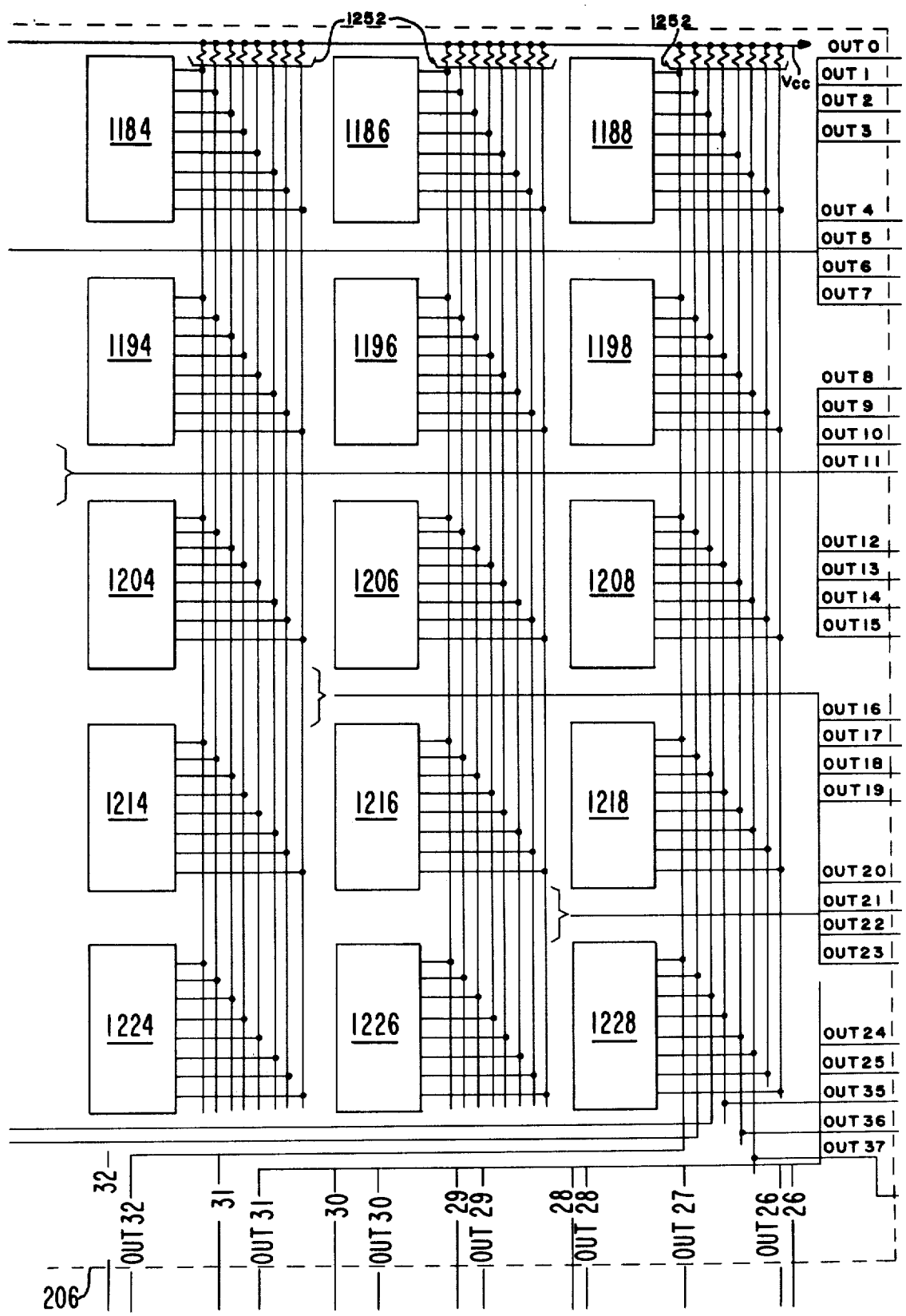

FIG. 22 shows the logic 1080 for supplying the $1_8$ and $77_8$ logic signals to PLA 206 (see FIG. 2). Lines IB10L through IB15L of information bus 102 are respectively connected to the inputs of inverters 1082 through 1092. The outputs of inverters 1082 through 1092 are respectively connected to inputs IBB10 through IBB15 of instruction register 218. They also form the inputs to NAND gate 1094. Inverters 1082-1092 are desirably implemented with a 74LS04 type integrated circuit 1093. The output of NAND gate 1094 provides the input to inverter 1096, the output of which is the $77_8$ signal, which is supplied to input terminal IN24 of PLA 206 (FIG. 26A). The outputs of inverters 1082 through 1090 are supplied as inputs to NOR gate 1098. The output of NOR gate 1098 forms one input to NAND gate 1100. The other input to AND gate 1100 is supplied by the output of inverter 1092. The output of AND gate 1100 constitutes the $1_8$ signal and is supplied to input terminal IN 25 of PLA 206 (FIG. 26A). The outputs of inverters 1088 through 1092 are respectively supplied as inputs to inverters 1102, 1104 and 1106. The outputs of these inverters represent, respectively, the $\overline{\text{IBB13}}$, $\overline{\text{IBB14}}$ and $\overline{\text{IBB15}}$ signals.

Figure 23:
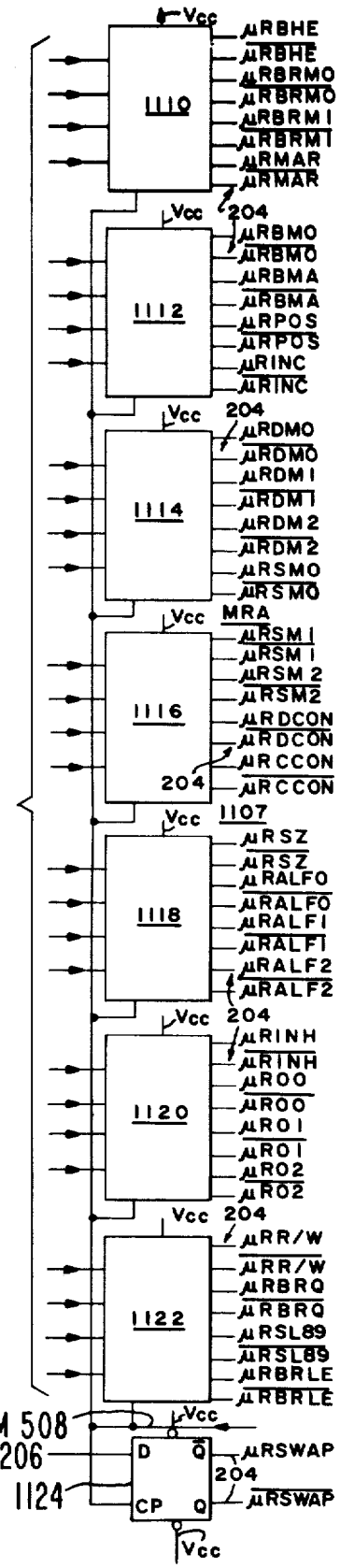

FIG. 23 shows details of a first portion 1107 of the microprogram register 212 (FIG. 1), denominated μRA. The μRA portion 1107 of microprogram register 212 is implemented with seven 74LS125 type quad bus buffer gate integrated circuits 1110 through 1122 and a 74LS74 type flip-flop 1124. Output terminals OUT0 through OUT3 of PLA 206 (FIG. 26B) are connected as inputs to bus buffer gate integrated circuit 1110. Output terminals OUT4 through OUT7 of PLA 206 form four inputs to bus buffer gate circuit 1112. Output terminals OUT8 through OUT11 of PLA 206 form four inputs to bus buffer gate circuit 1114. Output terminals OUT12 through OUT15 form four inputs to bus buffer gate circuit 1116. Output terminals OUT16 through OUT19 of PLA 206 form four inputs to bus buffer gate circuit 1118. Output terminals OUT20 through OUT23 of PLA 206 form four inputs to bus buffer gate circuit 1120. Output terminals OUT24-OUT25 and OUT35-36 form four inputs to bus buffer gate circuit 1122. The LμR output from strobe generator decode logic 508 provides a D input to each of the bus buffer gate circuits 1110 through 1122. Each of the bus buffer gate circuits 1110 through 1122 is also connected to the +Vcc potential. Each of the output control signal lines 204 from the bus buffer gates 1110 through 1122 provides the respective control signals indicated in FIG. 23. Output terminal OUT37 from PLA 206 (FIG. 26B) provides the D input to flip-flop integrated circuit 1124. The LμR output from strobe generator decode logic 508 provides the clock pulse signal CP for flip-flop 1124. The +Vcc potential provides two additional inputs to the flip-flop 1124. The $\overline{Q}$ and Q outputs of flip-flop 1124 provide the μRSWAP and $\overline{\mu\text{RSWAP}}$ control signals on control signal lines 204.

Figure 24:
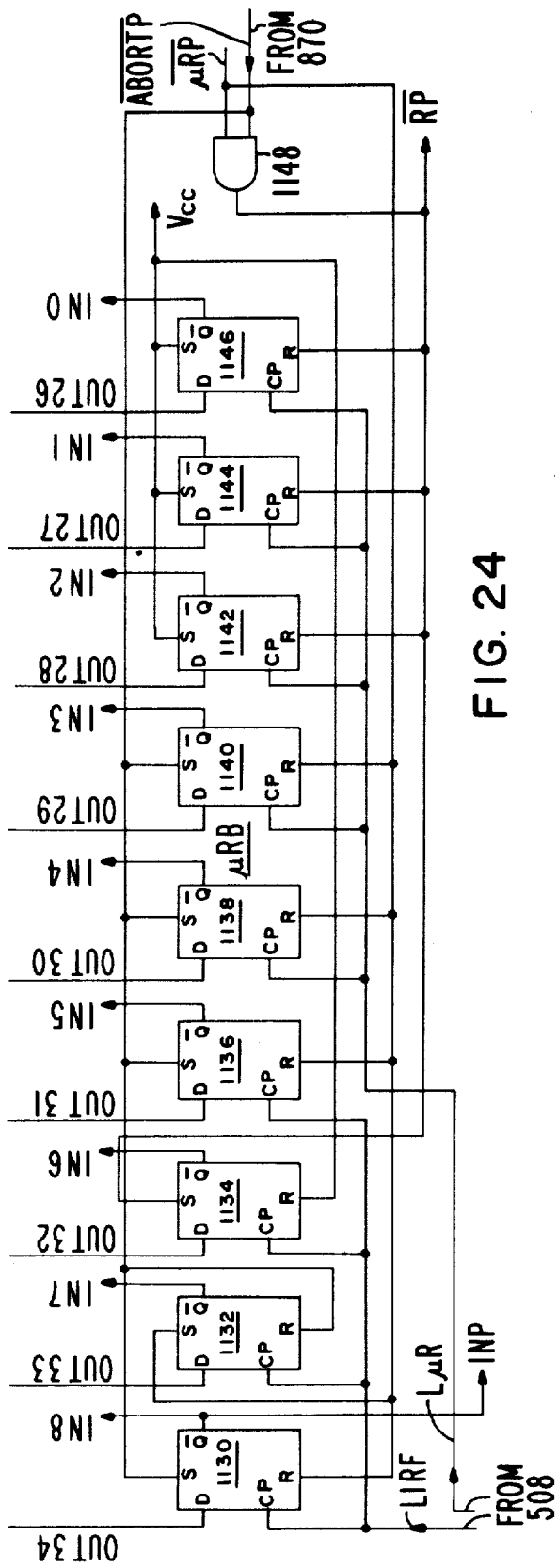

The μRB portion of microprogram register 212 is shown in FIG. 24. It is implemented primarily by 74LS74 type flip-flop circuits 1130 through 1146. The LIRF output from strobe generator decode logic 508 provides the clock pulse signal input CP for each of the flip-flop circuits 1130 through 1136. The LμR output from strobe generator decode logic 508 provides the clock pulse input CP for each of the flip-flops 1138 through 1146. Output terminals OUT26 through OUT34 are each connected to the D input of the flip-flop circuits 1130 through 1146. The reset inputs R of flip-flops 1130 and 1136 through 1140 are connected to receive the μRP signal. The set input S of flip-flop 1130, the reset input R of flip-flop 1132 and the set inputs S of flip-flops 1136 through 1140 are connected to receive the $\overline{\text{ABORTP}}$ signal from the ABORT logic circuit 870 of FIG. 13B. The Q output of each flip-flop circuit 1130 through 1146 is each connected to one of the input terminals IN0 through IN8 of PLA 206 as shown. The reset terminal R of flip-flop 1134 is connected to the +Vcc potential. The set input S of flip-flop 1134 is connected to the output of AND gate 1148, which supplies the $\overline{\text{RP}}$ signal. The $\overline{\mu\text{RP}}$ and $\overline{\text{ABORTP}}$ signals are supplied as inputs to AND gate 1148. The set inputs S of flip-flops 1142 through 1146 are connected to the +Vcc potential. The reset inputs R of flip-flops 1142 through 1146 are connected to the output of AND gate 1148. The $\overline{Q}$ output of flip-flop 1130 constitutes the INP signal.

Figure 25:
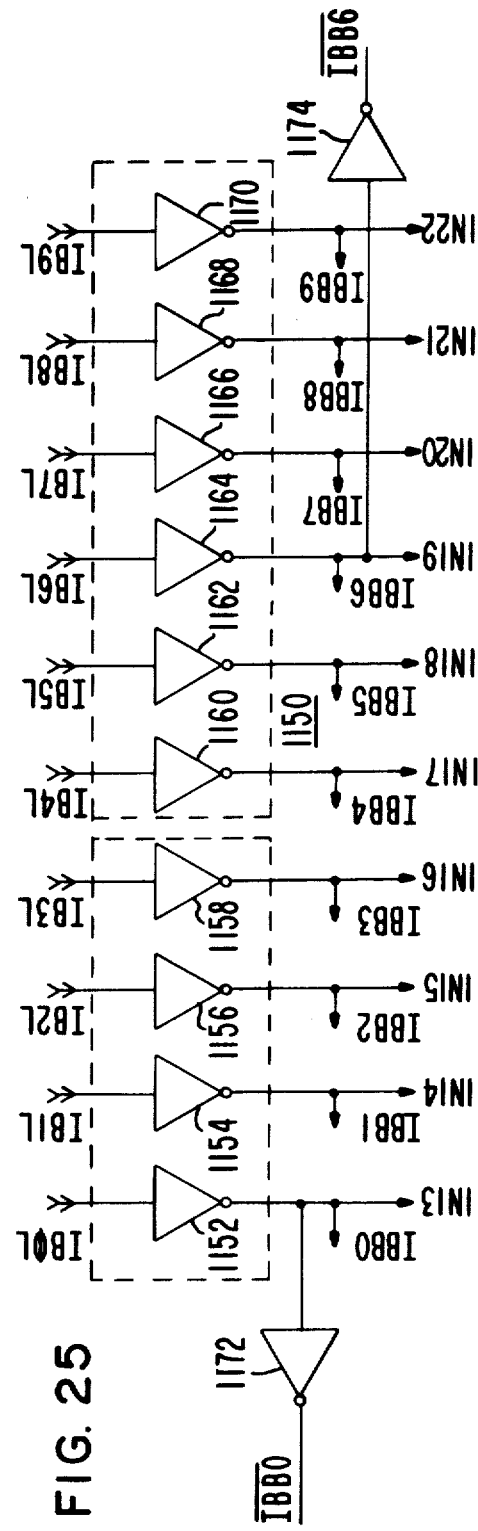

FIG. 25 shows input buffers 1150 for the PLA 206. Lines IB0L through IB9L of information bus 102 (FIG. 1) are respectively connected as inputs to inverters 1152 through 1170. The outputs of inverters 1152 through 1170 are respectively connected to input terminals IN13 through IN22 of PLA 206 (see FIG. 26A). These outputs respectively supply the IBB0 through IBB9 signals to their respective terminals. The output of inverter 1152 is provided as an input to inverter 1172, the output of which provides the $\overline{\text{IBB0}}$ signal. The output of inverter 1164 is supplied to the input of inverter 1174, the output of which is the $\overline{\text{IBB6}}$ signal.

FIGS. 26A and 26B show details of the PLA 206. The PLA 206 is implemented primarily with an array of 74LS458 type programmable read only memory (PROM) integrated circuits 1180 through 1228. As shown in FIG. 26A, input terminals IN12 through IN 26 of the PLA 206 are connected to the inputs of PROMS 1180 through 1198. An additional input of each PROM 1180 through 1198 is connected to the output of AND gate 1230 (FIG. 26A). The output of AND gate 1232 forms one input to AND gate 1230. One input of AND gate 1232 is in turn connected to the output of OR gate 1234. OR gate 1234 is connected to receive the $\overline{F}$ signal and the $\overline{CONR}$ signal as its two inputs. The output of NOR gate 1236 provides two additional inputs to AND gate 1232. The inputs of NOR gate 1236 are connected to input terminals IN0–IN2 of the PLA 206. A second input to AND gate 1230 is provided by the output of NOR gate 1238, the inputs of which are connected to input terminals IN4, IN27 and IN28. A third input to AND gate 1230 is the output of NAND gate 1240. One input to NAND gate 1240 is connected to input terminal IN3. The second input to NAND gate 1240 is connected to the output of NAND gate 1242. The inputs to NAND gate 1242 are connected to input terminals IN3, IN5, IN8, and via inverters 1244 and 1246, to input terminals IN6 and IN7. Input terminal IN26 is connected to one input of AND gate 1248. Two additional inputs to AND gate 1248 are provided by the +5 volt source. The output of AND gate 1248 forms an input to PROMS 1200 through 1228. Input terminal IN12 is connected to the input of AND gate 1250. Two additional inputs of AND gate 1250 are connected to the +5 volt source. The output of AND gate 1250 is also connected to the inputs of PROMS 1200 through 1228. It should be noted that all of the connections to the PROMS 1182–1188, 1192–1198, 1202–1208, 1212–1218, and 1222–1228 have not been shown for clarity in the drawing, but they correspond to the connections shown for PROMS 1180, 1190, 1200, 1210 and 1220.

The outputs of PROMS 1180, 1190, 1200, 1210 and 1220 are each respectively connected to one of the output terminals OUT0 through OUT7. The output terminals of PROMS 1182, 1192, 1202, 1212 and 1222 are each respectively connected to output terminals OUT8 through OUT15. The output terminals of PROMS 1184, 1194, 1204 1214 and 1224 are each respectively connected to the output terminals OUT16 through OUT23. The output terminals of PROMS 1186, 1196, 1216 and 1226 are each respectively connected to output terminals OUT24 through OUT31. The output terminals of PROMS 1188, 1198, 1208, 1218 and 1228 are each respectively connected to output terminals OUT32–OUT37. All of the output terminals of PROMS 1180 through 1228 are also each connected to +Vcc potential through resistors 1252. The PROMS 1180 through 1228 are programmed to provide the connections shown in the printout forming the appendix to this application.

ADDRESS DATA PATH 106

Details of the address data path 106 in FIG. 1 are shown in FIGS. 27A through 30C. While bus register multiplexer 116 and bus register 120 are shared by address data path 106 and ALU data path 104, which together form the data path unit 100, the multiplexer 116 and 120 will be explained in connection with the address data path 106 for ease of understanding.

Figure 27A:
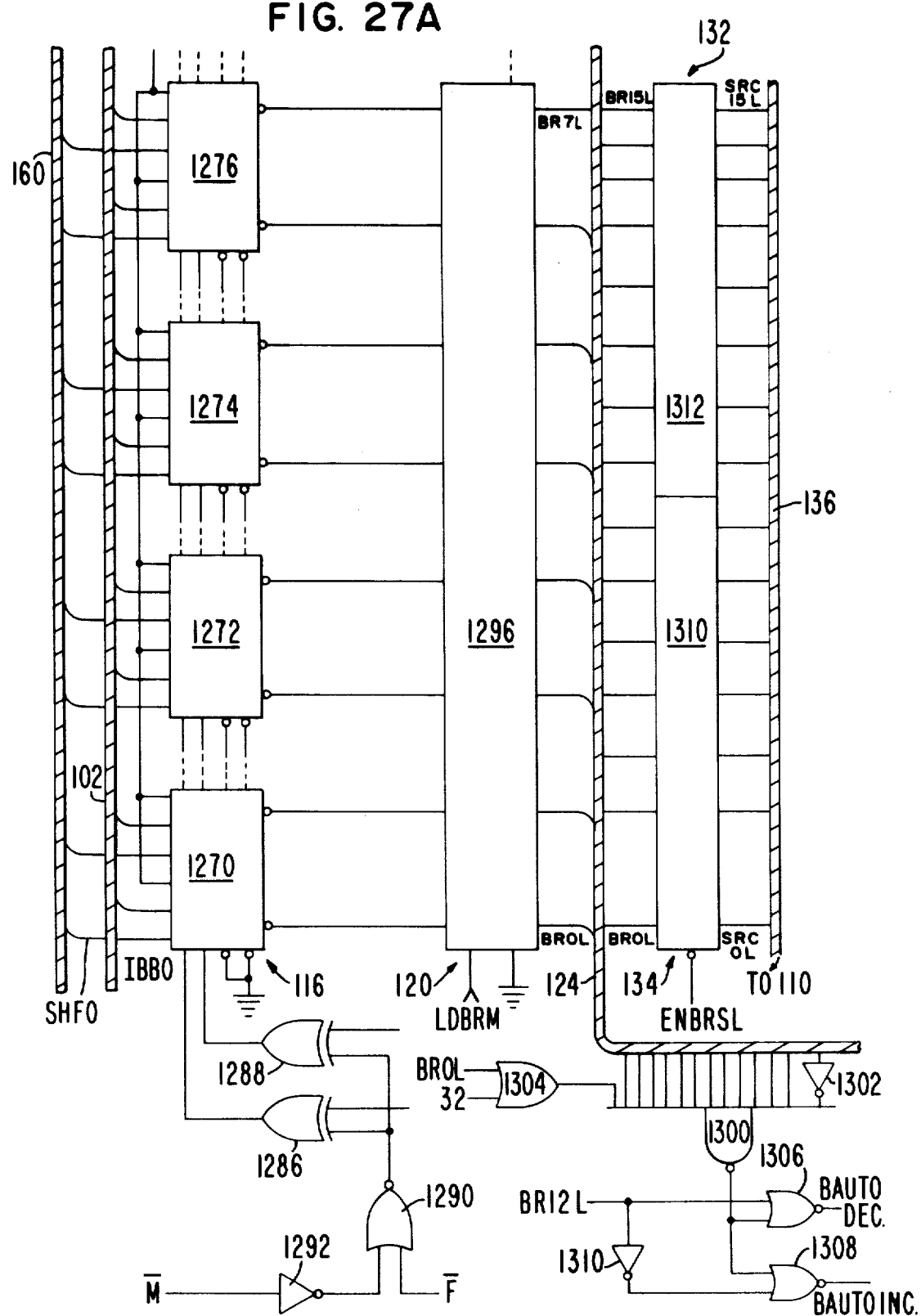

The bus register multiplexer 116 and bus register 120 are shown in FIGS. 27A and 27B. Lines SHF0 through SHF15 of bus 160 are connected with two of the lines as inputs to each of 74LS352 type dual four input multiplexer integrated circuits 1270 through 1284, which comprise the bus register multiplexer 116. Lines IBB0 through IBB15 comprising the bus 118 are each connected with two lines respectively to each of the multiplexer integrated circuits 1270 through 1284 from information bus 102. S0 and S1 inputs of the multiplexer circuits 1270 through 1284 are each connected to the outputs of exclusive OR gates 1286 and 1288. One input of exclusive OR gate 1286 is connected to receive the μRBRM1 signal, and the corresponding input of exclusive OR gate 1288 is connected to receive the μRBRM0 signal. The other input of both exclusive OR gates 1286 and 1288 is connected to the output of NOR gate 1290. The $\overline{F}$ signal provides two inputs to NOR gate 1290. The other input to NOR gate 1290 is provided by the output of inverter 1292, which receives the $\overline{M}$ signal as its input. The $E_a$ and $E_b$ terminals of the multiplexer circuits 1270–1284 are grounded. The I2A and I2B terminals of each multiplexer circuit 1270 through 1276 are interconnected and connected to the output AB of AND gate 1294. One input to AND gate 1294 is provided by the ZEXTL signal. The other input to AND gate 1294 is supplied by the IBB8 line. The $Z_a$ and $Z_b$ outputs of the multiplexer circuits 1270–1284 are connected to the $D_0$ through $D_7$ inputs of 74LS374 type octal D type flip-flop integrated circuits 1296 and 1298, which comprise the bus register 120. The LDBRM signal is connected to the clock pulse input CP of flip-flop circuit 1296. The LDBRL signal is supplied to the clock pulse input CP of flip-flop circuit 1298. The OE terminals of flip-flop circuits 1296 and 1298 are grounded. The $O_0$ through $O_7$ outputs of the flip-flop circuits 1296 and 1298 are connected to the BR0L through BR15L lines of bus 124. The BR1L through BR10L lines of bus 124 all form inputs to NAND gate 1300. The BR11L line is connected to the input of inverter 1302, the output of which forms another input to NAND gate 1300. The output of OR gate 1304 forms another input to NAND gate 1300. The BR0L line forms one input to OR gate 1304. The other input is provided by a 32 signal. The output of NAND gate 1300 forms one input to each of NOR gates 1306 and 1308. The BR12L line forms the other input to NOR gate 1306, and is also connected to the input of inverter 1310. The output of inverter 1310 forms the other input to NOR gate 1308. The output of NOR gate 1306 provides the BAUTO DEC signal, and the output of NOR gate 1308 provides the BAUTO INC signal. The BR0L through BR15L lines of bus 124 are also connected to 74LS244 type multiplexer integrated circuits 1310 through 1316. The multiplexer circuits 1310 and 1312 comprise the source multiplexer 132 in ALU data path 104, and the multiplexer circuits 1314 and 1316 comprise the destination multiplexer 134. The outputs of source multiplexer circuits 1310 and 1312 are connected to lines SRC0L through SCR15L of bus 136, which is in turn connected to ALU 110. The outputs of destination multiplexer circuits 1314 and 1316 are connected to lines DST0L through DST15L of bus 138 which is in turn connected to ALU 110. The source multiplexer circuits 1310 and 1312 are clocked by the ENBRSL signal. The destination multiplexer circuits 1314 and 1316 are clocked by the ENBRDL signal.

Figure 28A:
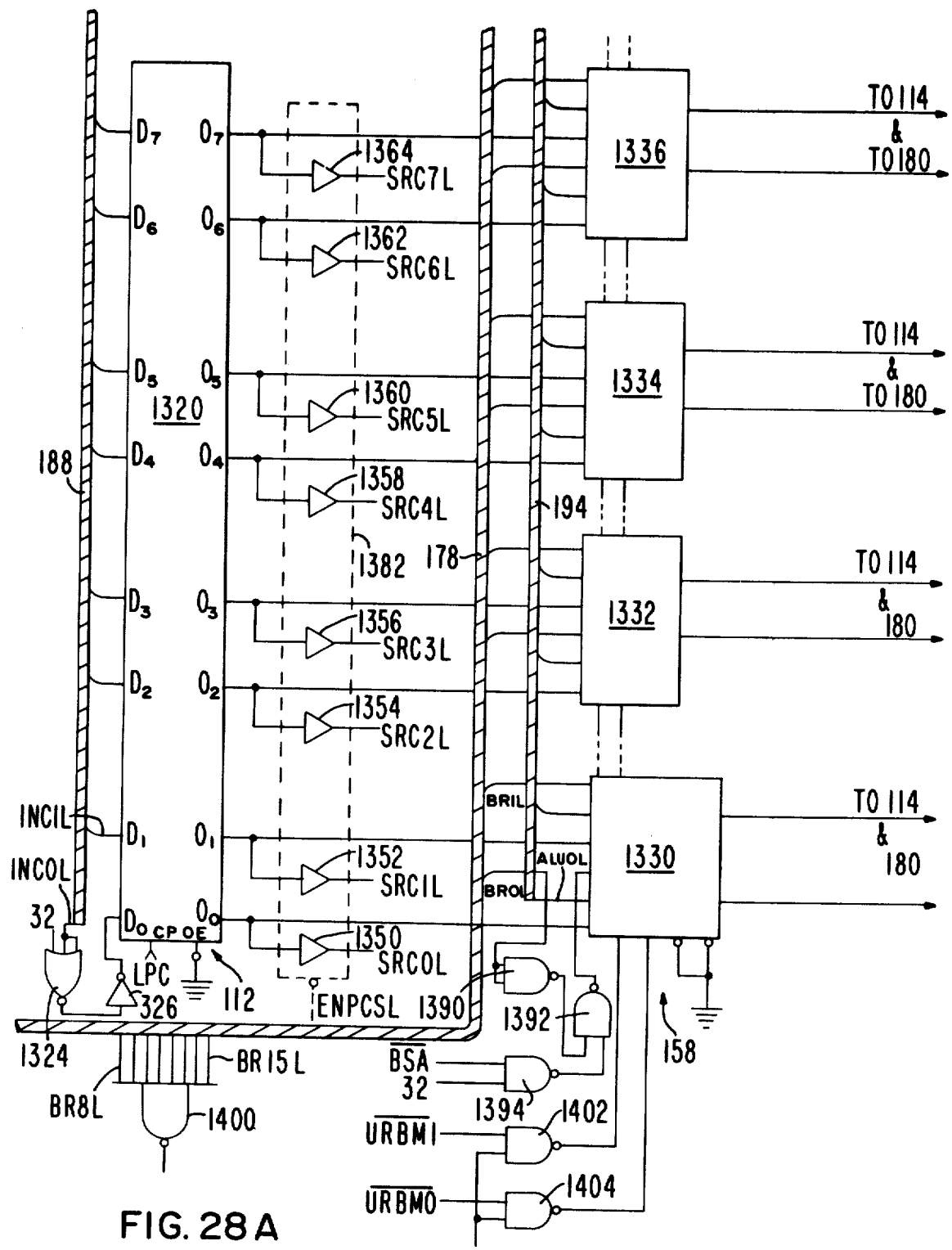
Figure 28B:
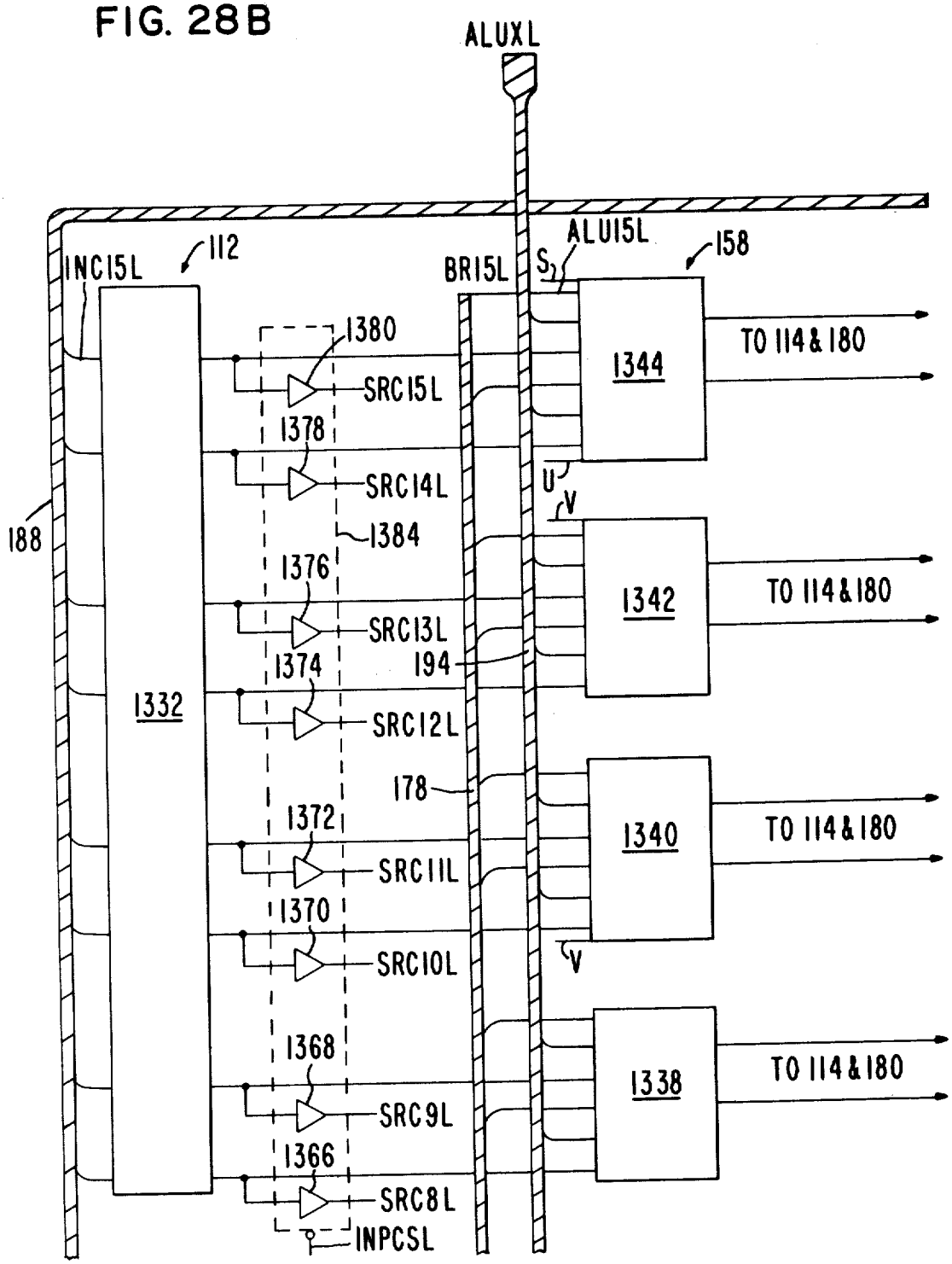

FIGS. 28A and 28B show details of the bus multiplexer 158, program counter 112 and their associated circuits. The program counter 112 is formed from 74LS374 type octal D type flip-flop integrated circuits 1320 and 1322. Lines INC1L to INC15L of bus 188 are connected to the D1 through D7 inputs of flip-flop circuit 1320 and to the D0 through D7 inputs of flip-flop circuit 1322. The INC0L line provides two inputs to NOR gate 1324. The other input to NOR gate 1324 is from the 32 line. The output of NOR gate 1324 is connected to the input of inverter 1326, the output of which is connected to the D0 input of flip-flop circuit 1320. The clock pulse input CP of flip-flop circuits 1320 and 1322 is connected to receive the LPC signal. The OE terminal of flip-flop of circuits 1320 and 1322 is grounded. The O0 through O7 outputs of flip-flop circuits 1320 and 1322 are connected, two outputs from each circuit, respectively, to the I1b and I1a inputs of 74LS153 type dual four input multiplexer integrated circuits 1330 through 1344, which form the bus multiplexer 158. These connections comprise the bus 190 shown in FIG. 1. Each of the O0 through O7 outputs of the flip-flops 1320 and 1322 are also connected to the inputs of inverters 1350 through 1380. These inverters are provided as two 74LS244 type octal buffer/line driver integrated circuits 1382 and 1384. Each of the driver integrated circuits 1382 and 1384 is clocked by the ENPCSL signal. The outputs of inverters 1350 through 1380 are connected to lines SRC0L through SRC15L of bus 192 shown in FIG. 1. Lines BR0L through BR15L of bus 124 (FIGS. 1 and 27A–27B) are connected to corresponding lines BR0L through BR15L of bus 178. The BR1L through BR15L lines of bus 178 are connected to inputs of the multiplexer integrated circuits 1330 through 1344. The BR0L line of bus 178 is connected to both inputs of NAND gate 1390. The output of NAND gate 1390 forms one input of NAND gate 1392. The other input to NAND gate 1392 is provided by the output of NAND gate 1394. One input to NAND gate 1394 is supplied by the BSA signal, and the other input is provided by the 32 signal. The output of NAND gate 1392 is connected to the 12b input of multiplexer integrated circuit 1330. Lines ALU0L through ALU15L of bus 194 are each connected, two to each circuit, to the I3b and I3a inputs of multiplexer circuits 1330 through 1344. The BR8L through BR15L lines of bus 178 are also connected to the inputs of NAND gate 1400. The output of NAND gate 1400 provides the PAGE 1 signal. The S0 and S1 inputs to multiplexer circuits 1330 through 1344 are each respectively connected to the outputs of NAND gates 1402 and 1404. One input of NAND gate 1402 is connected to receive the μRBM1 signal, and the corresponding input of NAND gate 1404 is connected to receive the μRBM0 signal. The other inputs of both NAND gates 1402 and 1404 are connected to receive the $\overline{BSA}$ signal. The Ea and Eb terminals of each multiplexer circuit 1330 through 1344 are grounded. The I0a and I0b inputs to multiplexer circuits 1330 through 1338 are connected to the +Vcc potential. The I0a input of circuit 1340 is connected to the +Vcc potential, and the I0b input of circuit 1342 is connected to the +Vcc potential. The I0b inputs to circuits 1340 and 1344 are respectively connected to receive a V signal and a U signal. The I0a input of circuit 1342 is also connected to receive the V signal, and the I0a input of circuit 1344 is connected to receive an S signal. The Za outputs of multiplexer circuits 1330 through 1344 comprise the bus 184 shown in FIG. 1. The Zb outputs of the circuits 1330 through 1344 comprise the bus 182 in FIG. 1.

Figure 29:
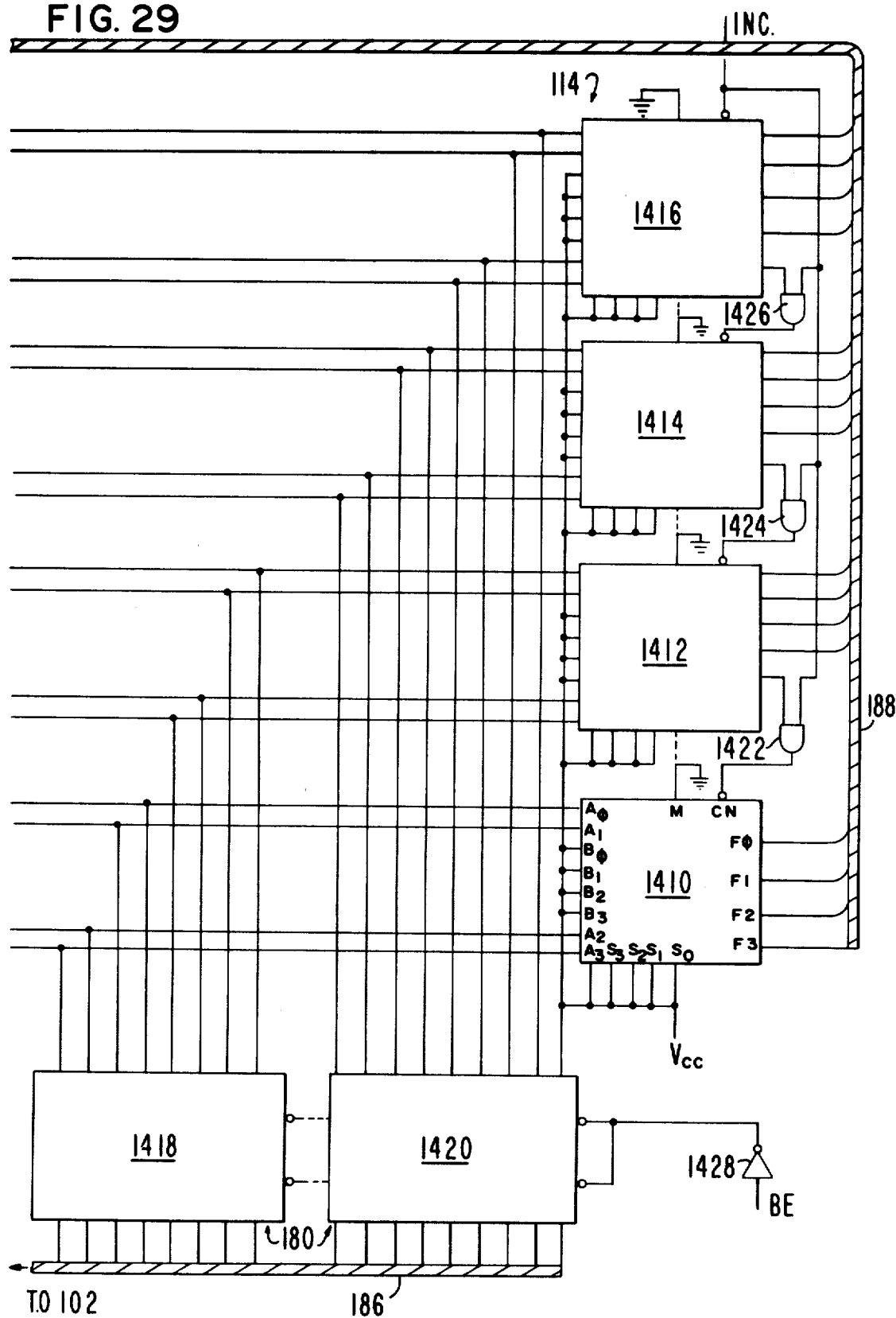

FIG. 29 shows details of the three state buffer 180 and the incrementer 114. The connections from the Za and Zb outputs of multiplexer circuits 1330 through 1344 to 74LS181 type arithmetic logic unit integrated circuits 1410 through 1416, which form the incrementer 114, correspond to bus 184 in FIG. 1. The connections from the Za and Zb outputs of multiplexer circuits 1330 through 1344 FIGS. 28A and 28B to 74LS244 type buffer integrated circuits 1418 and 1420, which comprise the three state buffer 180, correspond to bus 182 in FIG. 1. The S0 through S3 and B0 through B3 inputs to the ALU integrated circuits 1410 through 1416 are all connected to the +Vcc potential. The M terminals of the circuits 1410 through 1416 are grounded. The F0 through F3 outputs of the circuits 1410 through 1416 are connected to bus 188. The CN+4 output of circuit 1412 is connected to the input of AND gate 1422. The other input of AND gate 1422 is connected to receive the INC signal. The output of AND gate 1422 is connected to the CN terminal of circuit 1410. The CN+4 output of circuit 1414 is connected to the input of AND gate 1424. The other input to AND gate 1424 is from the INC signal. The output of AND gate 1424 is connected to the CN terminal of circuit 1412. The CN+4 output of circuit 1416 is connected to the input of AND gate 1426, and the other input is from the INC signal. The output of AND gate 1426 is connected to the CN terminal of circuit 1414. The CN terminal of circuit 1416 is connected to receive the INC signal. The outputs IB0L–IB15L of buffer integrated circuits 1418 and 1420 are connected to bus 186. The E1 and E2 inputs to the buffer circuits 1418 and 1420 are connected to the output of inverter 1428. The bus enable signal BE provides the input to inverter 1428.

FIGS. 30A through 30C show logic used to generate constants supplied on bus 196 in FIG. 1 to bus multiplexer 158. The SEL1, SEL3, SEL47 and SEL45 lines provide inputs to NOR gate 1430. The output of NOR gate 1430 is the S signal also shown in FIG. 28B. Lines SEL3, SEL47 and SEL46 provide inputs to NOR gate 1432. The output of NOR gate 1432 is the U signal also shown in FIG. 28B. The SEL46, SEL44, SEL45 and SEL47 lines provide inputs to NOR gate 1434, the output of which is the V signal also shown in FIG. 28B.

ALU DATA PATH 104

FIGS. 31 through 56 show details of the ALU data path. FIG. 31 shows details of status register 150 and a portion of its associated logic (not shown in FIG. 1). A 74LS74 type flip-flop integrated circuit 1440 comprises one fourth of the status register 150. Since the remainder of status register 150 comprises the same type of integrated circuits correspondingly connected, they are not shown. The output of NAND gate 1442 is connected to the D input of flip-flop circuit 1440. One input to the NAND gate 1442 is connected to the output of NAND gate 1444. The Q output of flip-flop 1440 is connected one input of NAND gate 1444. A second input to NAND gate 1444 is connected to receive the FLGIN signal. The remaining input of NAND gate 1444 is connected to receive the $\overline{EN64K}$ signal. A second input to NAND gate 1442 is supplied by the output of NAND gate 1446. One input to NAND gate 1446 is provided by the output of inverter 1448, which is connected to receive the $\overline{FLGIN}$ signal as its input. A second input of NAND gate 1446 is connected to receive the IBB1 signal. The remaining input of NAND gate 1446 is the $\overline{EN64K}$ signal. The remaining input to NAND gate 1442 is the $\overline{EN32K}$ signal. The clock pulse input CP of flip-flop 1440 is connected to receive the LμR1 signal from strobe generator decode logic 508. Another input of the flip-flop 1440 is connected to receive the $\overline{MRP}$ signal. The remaining input of flip-flop 1440 is connected to the +Vcc potential. The Q output of flip-flop 74 is the 32 signal, and the $\overline{Q}$ output of flip-flop 1440 is the 64 signal.

FIG. 32 shows details of status register logic 1450. The Z1, $\overline{OVF}$, Y1, 64, X1, U1 and $\overline{TRAPE}$ signals are provided as inputs to a 74LS157 type quad 2 input multiplexer integrated circuit 1452. The E input to multiplexer 1452 is grounded. The S input to multiplexer 1452 is connected to the output of NAND gate 1454. One input of NAND gate 1454 is connected to inverter 1456, the input of which is connected to receive the $\overline{FLGOUT}$ signal. The other input to NAND gate 1454 is connected to the output of inverter 1458. The input of inverter 1458 is connected to receive the $\overline{BSA}$ signal. The output of inverter 1458 also forms one input to NAND gate 1460. The other input to NAND gate 1460 is connected to the output of NAND gate 1462. One input of NAND gate 1462 is connected to receive the $\overline{FLGOUT}$ signal. The other input to NAND gate 1462 is from the output of NAND gate 1464. One input to NAND gate 1464 is from the output of inverter 1466, the input of which is connected to receive the $\overline{CRYOUT}$ signal. The other input to NAND gate 1464 is the 32 signal from status register 150. The output of NAND gate 1460 forms one input to AND gate 1468. The other input of AND gate 1468 is connected to receive the W1 signal. The output of AND gate 1468 forms one input to NOR gate 1470. The other input to NOR gate 1470 is from the output of AND gate 1472. One input to AND gate 1472 is the CARRY signal. The other input to AND gate 1472 is from the output of inverter 1474, the input of which is connected to the output of NAND gate 1460. The output of NOR gate 1470 is connected to the input of inverter 1476, the output of which provides the W2 signal.

FIGS. 33A and 33B show details of the shifter 148 and its associated shift logic 1480. The shifter 148 consists of 74LS$_{353}$ type dual four input multiplexer integrated circuits 1482 through 1498. Lines ALU8L, ALU0L, ALU9L and ALU1L of bus 140 are connected to multiplexer circuit 1484. Lines ALU10L, ALU2L, ALU11L, and ALU3L are connected to multiplexer circuit 1486. Lines ALU12L, ALU4L, ALU13L and ALU5L are connected to multiplexer circuit 1488. Lines ALU14L, ALU6L, ALU15L and ALU7L are connected to multiplexer circuit 1490. Lines ALU0L, ALU8L, ALU1L and ALU9L are connected to multiplexer circuit 1492. Lines ALU2L, ALU10L, ALU3L and ALU11L are connected to multiplexer circuit 1494. Lines ALU4L, ALU12L, ALU5L and ALU13L are connected to multiplexer circuit 1496. Lines ALU6L, ALU14L, ALU7L and ALU15L are connected to multiplexer circuit 1498. Additionally, line ALU15L and line ALU0L is connected to multiplexer 1482. Line ALU1L is also connected to multiplexer circuit 1486. Line ALU2L is also connected to multiplexer circuit 1484. Line ALU4L is also connected to multiplexer circuit 1486. Line ALU6L is also connected to multiplexer circuit 1488. Line ALU8L is also connected to multiplexer circuit 1490. Line ALU10L is also connected to multiplexer circuit 1492. Line ALU12L is also connected to multiplexer circuit 1494. Line ALU14L is also connected to multiplexer circuit 1496. Line ALU3L is also connected to multiplexer circuit 1488. Line ALU5L is also connected to multiplexer circuit 1490. Line ALU7L is also connected to multiplexer circuit 1492. Line ALU9L is also connected to multiplexer circuit 1494. Line ALU11L is also connected to multiplexer circuit 1496. Line ALU13L is also connected to multiplexer circuit 1498. The 10a input of multiplexer circuit 1482 is connected to receive the CARSHFL signal. This signal is also supplied to multiplexer circuit 1484 and to multiplexer circuit 1498. The OEa and OEb inputs of the multiplexer circuits 1484 through 1498 are grounded. The S0 terminal of multiplexer circuit 1482 is connected to the output of AND gates 1500. The two inputs to AND gate 1500 are the INHDSL signal and the output of NAND gate 1502. The $\overline{ROTLC}$ signal forms one input to NAND gate 1502. A second input to NAND gate 1502 is from the output of AND gate 1504. The $\overline{SWAP}$ signal provides one input to AND gate 1504, and the other input is provided by the output of NAND gate 1506. One input to NAND gate 1506 is from the output of inverter 1508 and the other input is from the output of inverter 1510. The input of inverter 1508 is connected to the output of NAND gate 1512. One input to NAND gate 1512 is connected to terminal IR8 of instruction register 218. The other input is connected to receive a FIR0 signal. The input of inverter 1510 is connected to the output of NAND gate 1514. The IR0 terminal of instruction register 218 is also connected to one input of NAND gate 1514. The other input is connected to terminal IR9 of instruction register 218. A third input to NAND gate 1502 is connected to the output of NAND gate 1514. The remaining input to NAND gate 1502 is connected to the output of NAND gate 1516, which generates a SLCACOL signal. One input of NAND gate 1516 is connected to receive the DSL signal, and the other input is connected to the output of NOR gate 1518. One input of NOR gate 1518 is connected to receive the NORCOMP signal, and the other input is connected to the output of AND gate 1520. The three inputs to AND gate 1520 are the DIV signal, the LD16 signal and the ONE signal. The S1 terminal of multiplexer circuit 1482 is connected to the output of NAND gate 1522. One input of NAND gate 1522 is connected to receive the $\overline{ROTRC}$ signal. A second input to NAND gate 1522 is connected to the output of AND gate 1504. A third input to NAND gate 1522 is connected to the output of NAND gate 1512. The fourth input to NAND gate 1522 is connected to the output of NAND gate 1524. One input of NAND gate 1524 is connected to receive the DSR signal, and the other input is connected to the output of NOR gate 1518.

FIG. 34 shows the logic used to generate the FIR0 signal. The F signal is supplied to the input of inverter 1526. The output of 1526 is connected to AND gate 1528. The other input to AND gate 1528 is connected to terminal IR0 of instruction register 218. The output of AND gate 1528 is the FIR0 signal.

Figure 35B:
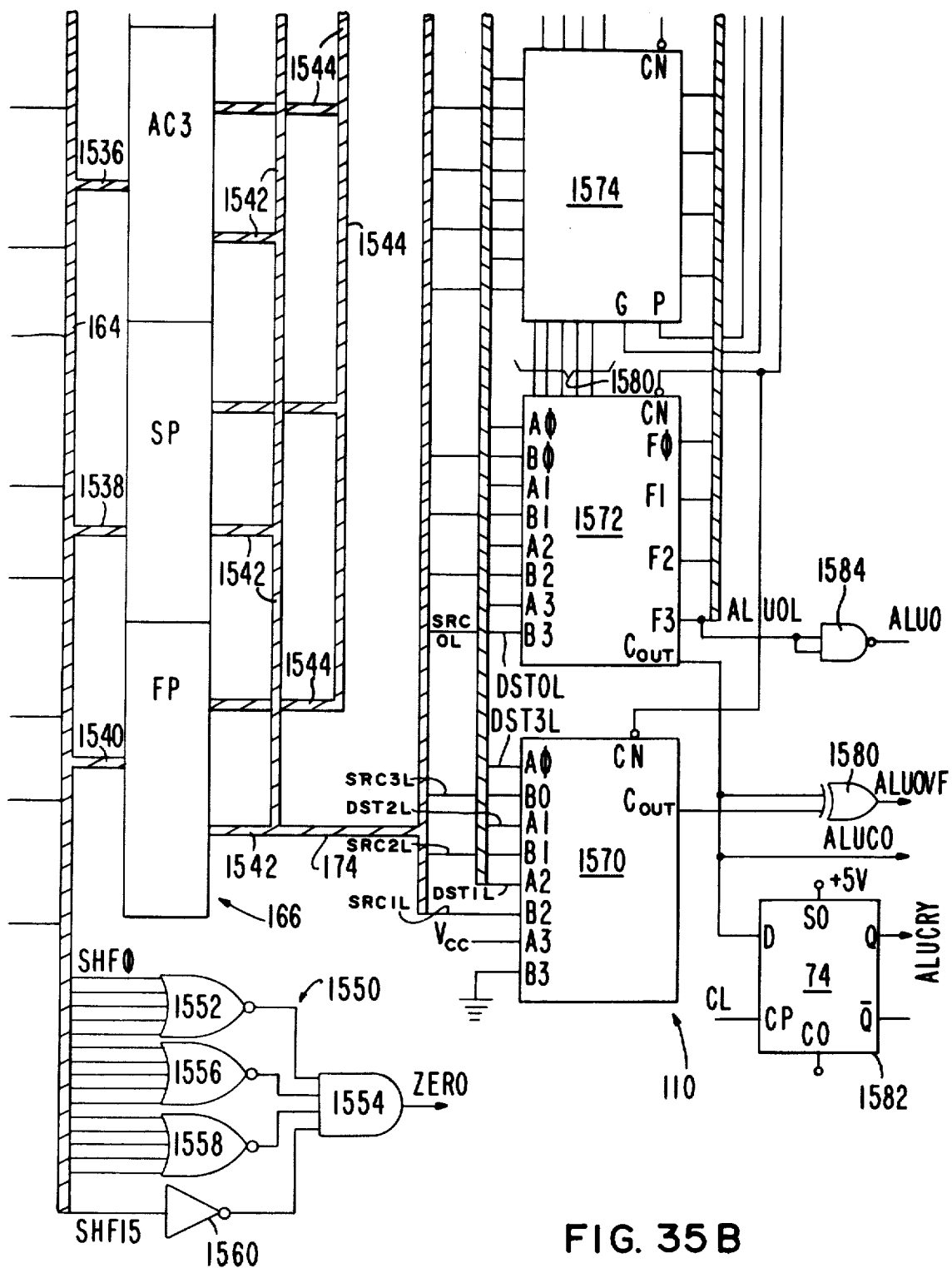

FIGS. 35A and 35B show details of the register file 166 and ALU 110, together with certain of their associated logic circuits. As shown, the register file 166 consists of four general purpose registers or accumulators AC0 through AC3. The AC0, AC2 and AC3 registers have like construction as explained below in discussion of FIGS. 36A and 36B. For handling floating point operations, which require the handling of 32 bit numbers, the AC0 and AC1 registers are capable of operating as a single register. For this reason, the AC1 register is constructed to allow its operation as a universal shift left or right register. The SHF0 through SHF15 outputs of shifter 148 (FIGS. 33A and 33B) comprise the bus 164; Buses 1530 through 1540 respectively connect the bus 164 to each of the AC0 through AC3 registers and the stack pointer SP and frame pointer FP. The buses 1530 through 1540 comprise the bus 168 shown in FIG. 1. Buses 1542 connect the AC0 through AC3 registers, the stack pointer SP and the frame pointer FP to source bus 174. Buses 1544 interconnect the outputs of registers AC0 through AC3, stack pointer SP and frame pointer FP to destination bus 176. Lines SHF0 through SHF15 of bus 164 are also connected to ZERO logic 1550. Lines SHF0 through SHF4 form the inputs to NOR gate 1552. The output of NOR gate 1552 forms one input to AND gate 1554. Line SHF5 through SHF9 are connected to the inputs of NOR gate 1556, the output of which forms another input to AND gate 1554. Lines SHF10 through SHF14 are connected to the inputs of NOR gate 1558, the output of which forms a third input to AND gate 1554. Line SHF15 is connected to the input of inverter 1560, the output of which forms the remaining input to AND gate 1554. The output of AND gate 1554 is the ZERO signal.

Arithmetic logic unit (ALU) 110 comprises 74LS181 type 4-bit arithmetic logic integrated circuits 1570 through 1578. Lines SRC0L through SRC15L of source bus 174 are respectively connected to ALU integrated circuits 1572 through 1578. In a similar manner, lines DST0L through DST15L of destination bus 176 are connected, four lines each, respectively to ALU integrated circuits 1572 through 1578. Lines SRC1L, SRC2L, SRC3L, DST1L, DST2L and DST3L are also additionally connected to ALU integrated circuit 1570. Lines 1580 connect the ALU integrated circuits 1572 through 1578 together. Lines ALU0L through ALU15L of ALU output bus 142 are connected, four lines to each circuit, to the outputs F0 through F3 of the ALU circuits 1572 through 1578. The Cout terminal of ALU circuit 1570 is connected to one input of the exclusive OR gate 1581. The Cout terminal of ALU circuit 1572 is connected to the other input of exclusive OR gate 1580. The output of exclusive OR gate 1581 is the ALUOVF signal. The Cout terminal of ALU circuit 1572 also provides the ALUCO signal, which is additionally supplied as the D input to flip-flop integrated circuit 1582. The CL signal is provided to clock pulse input CP of the flip-flop 1582. The C0 and S0 terminals of the flip-flop 1582 are connected to the +5 Volt potential. The Q output of flip-flop of 1582 provides the ALUCRY signal. The ALU0L line of bus 142 is connected to both inputs of NAND gate 1584, the output of which provides the ALU0 signal. The G, P, and CN terminals of ALU circuits 1574, 1576, and 1578 are each connected to a 74LS182 type carry look ahead integrated circuit 1586. The DC1 terminal of the circuit 1586 is connected to the output of NAND gate 1588 in ALU logic 1590. One input of the NAND gate 1588 is connected to receive the µRALF2 signal. A second input to NAND gate 1588 is connected to the output of NAND gate 1592. One input of NAND gate 1592 is connected to receive the MULS signal. A second input to NAND gate 1592 is connected to receive the ONE signal, and the third input to NAND gate 1592 is connected to receive the AC115 signal. A third input to NAND gate 1588 is connected to the output of NAND gate 1594. The four inputs to NAND gate 1594 are connected to receive the $\overline{DIV}$ signal, the SUB signal, the µRINC signal and the $\overline{\mu RPCE}$ signal. The S0 terminal of ALU circuit 1578 is connected to the output of AND gate 1596. One input of AND gate 1596 is connected to the output of NAND gate 1598. One input to NAND gate 1598 is connected to the output of AND gate 1600. One input to AND gate 1600 is the $\overline{OR}$ signal. The other input is the output of NAND gate 1602. The three inputs to NAND gate 1602 are connected to receive the µRALF0, µRALF1 and µRALF2 signals. The other input to AND gate 1596 is supplied by the output of NAND gate 1602. The S1 terminal of ALU circuit 1578 is connected to the output of NAND gate 1604. The output of AND gate 1600 provides one input to NAND gate 1604. The other input comes from the output of inverter 1606. The input of inverter 1606 is connected to the output of NAND gate 1608. The outputs of NAND gate 1592 and 1594 are connected to two of the inputs to NAND gate 1608. The other input is connected to the output of OR gate 1610. The two inputs to OR gate 1610 are connected to receive the DECD and µRALF1 signals. The S2 terminal of ALU circuit 1578 is connected to the output of AND gate 1612. One input to AND gate 1612 is connected to receive the $\overline{OR}$ signal, and the other input is connected to the output of NAND gate 1604. The S3 terminal of ALU circuit 1578 is connected to the output of NAND gate 1614. The output of NAND gate 1614 also provides two inputs to NAND gate 1616, the output of which provides the second input to NAND gate 1598. One input to NAND gate 1614 is connected to the output of NAND gate 1608. The other input to NAND gate 1614 is connected to the output of AND gate 1600. The M terminal of ALU circuit 1578 is connected to the output of inverter 1618. The input of inverter 1618 is connected to the output of AND gate 1600.

Figure 36A:
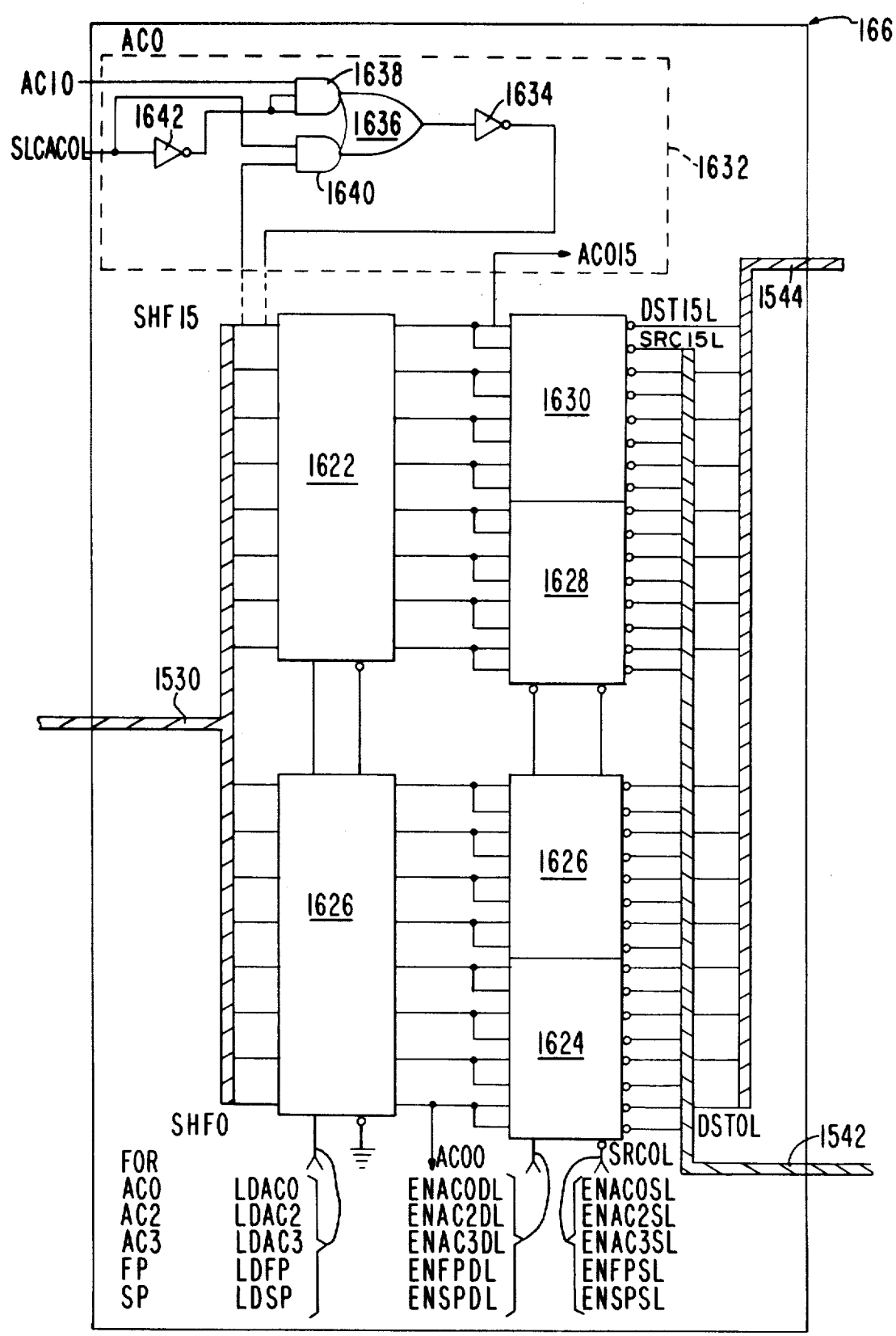

FIGS. 36A and 36B show further details of registers AC0 and AC1 of register file 166. It should be recognized that the AC2 and AC3 registers as well as the stack pointer SP and frame pointer FP have the same construction as the AC0 register. They therefore are not shown to this degree of detail. As shown, the AC0 register comprises two 74LS374 type octal D type flip-flop integrated circuits 1620 and 1622 and four 74LS240 type octal buffer/line driver integrated circuits 1624, 1626, 1628 and 1630. Lines SHF0 through SHF15 of bus 1530 are respectively connected, eight lines to each circuit 1620 and 1622, to the D0 through D7 inputs of the circuits 1620 and 1622. Outputs O0 through O3 of the flip-flop circuit 1620 are connected to the inputs of buffer/line driver circuit 1624. Outputs O4 through O7 of the flip-flop circuit 1620 are connected to the inputs of the buffer/line driver circuit 1626. Outputs O0 through O3 of the flip-flop circuit 1622 are connected to the inputs of buffer/line driver circuit 1628. Outputs O4 through O7 of the flip-flop circuit 1622 are connected to the inputs of buffer/line driver circuit 1630. Lines SRC0L through SRC3L of bus 1542 are connected to outputs of the buffer/line driver circuit 1624. Lines SRC4L through SRC7L of bus 1542 are connected to outputs of the buffer/line driver circuit 1626. Lines SRC8L through SRC11L of bus 1542 are connected to outputs of the buffer/line driver circuit 1628. Lines SRC12L through SRC15L are connected to outputs of the buffer/line driver circuit 1630. Lines DST0L through DST3L of bus 1544 are connected to outputs of the buffer/line driver circuit 1624. Lines DST4L through DST7L are connected to outputs of the buffer/line driver circuit 1626. Lines DST8L through DST11L of bus 1544 are connected to outputs of buffer/line driver circuit 1628. Lines DST12L through DST15L are connected to outputs of the buffer/line driver circuit 1630.

FIG. 36A shows signals that are supplied to the flip-flop circuit 1620 and the buffer/line driver circuit 1624 below those circuits. The corresponding signals which are supplied to the AC2, AC3, FP and SP registers are also shown below the ACO signals. The ACO0 and ACO15 output signals are supplied only in the case of register AC0. Logic circuit 1632 is provided for the AC0 register. Corresponding logic is not provided for the remaining registers. The output of inverter 1634 is connected to the SHF15 line. The input of inverter 1634 is connected to the output of OR gate 1636. The outputs of AND gates 1638 and 1640 provide the two inputs to OR gate 1636. The AC10 signal provides one input to AND gate 1638. The other inputs to AND gate 1638 are provided by the output of inverter 1642, the input of which is connected to receive the SLCAC0L signal. The SLCAC0L signal also provides one input to AND gate 1640. The other inputs to AND gate 1640 are connected to the SHF15 line.

Figure 37:
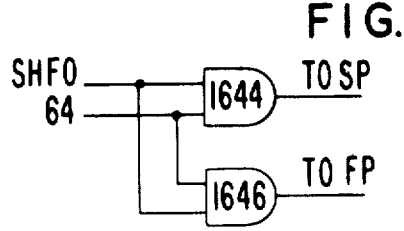

FIG. 37 shows additional logic for the frame pointer and stack pointer registers. The SHF0 and 64 signals are supplied as inputs to AND gates 1644 and 1646. The output of AND gate 1644 is connected to the D0 terminal of the integrated circuit in the stack pointer corresponding to flip-flop circuit 1620. The output of AND gate 1646 is connected to the corresponding terminal on the corresponding circuit in the frame pointer.

FIG. 36B shows details of the AC1 register. The AC1 register comprises 74LS194A type 4-bit bi-directional universal shift register circuits 1650, 1652, 1654 and 1656, providing inputs to 74LS240 type buffer/line driver integrated circuits 1658, 1660, 1662 and 1664. Bus 1532 has its SHF0 through SHF15 lines connected, four to each circuit, respectively, to the shift register circuits 1650 through 1656. Lines 1666 interconnect each of the circuits 1650 through 1656. The D$_{SR}$ terminal of shift register circuit 1656 is connected to the output of inverter 1668. The input to inverter 1668 is connected to the CARSHFL signal. The S0 and S1 terminals of shift register circuit 1650 are respectively connected to the inputs of inverters 1670 and 1672. The inputs of inverter 1670 and 1672 are respectively connected to receive the DSR and DSL signals. The MR terminal of shift register circuit 1650 is connected to the +5 Volt source. The DSL terminal of shift register circuit 1650 is connected to receive the SHFCRY signal. The Q0 through Q3 terminals of shift register circuit 1650 are connected to the inputs of buffer/line driver circuit 1658. The corresponding terminals of the shift registers 1652 through 1656 are similarly connected to the inputs of buffer/line drivers 1660 through 1664. The D$_{SR}$ terminal of shift register circuit 1650 is connected to the Q3 output of shift register circuit 1652, and the D$_{SL}$ terminal of the circuit 1652 is connected to the Q0 output of circuit 1650. In a similar manner, the D$_{SR}$ terminal of circuit 1552 is connected to the Q3 terminal of circuit 1654 and the D$_{SL}$ terminal of circuit 1654 is connected to the Q0 output of circuit 1652. Correspodingly, the D$_{SR}$ terminal of circuit 1654 is connected to the Q3 output of circuit 1656, and the D$_{SL}$ terminal of circuit 1656 is connected to the Q0 output of circuit 1654. The Q3 terminal of circuit 1650 provides the AC10 signal, and the Q0 output of the circuit 1656 provides the AC115 signal. Four of the outputs of each buffer/line driver circuit 1658 through 1664 are respectively connected to lines SRC0L through SRC15L of bus 1542. The other four outputs of each circuit 1658 through 1664 are respectively connected to the DST0L through DST15L lines of bus 1544.

Figure 38:
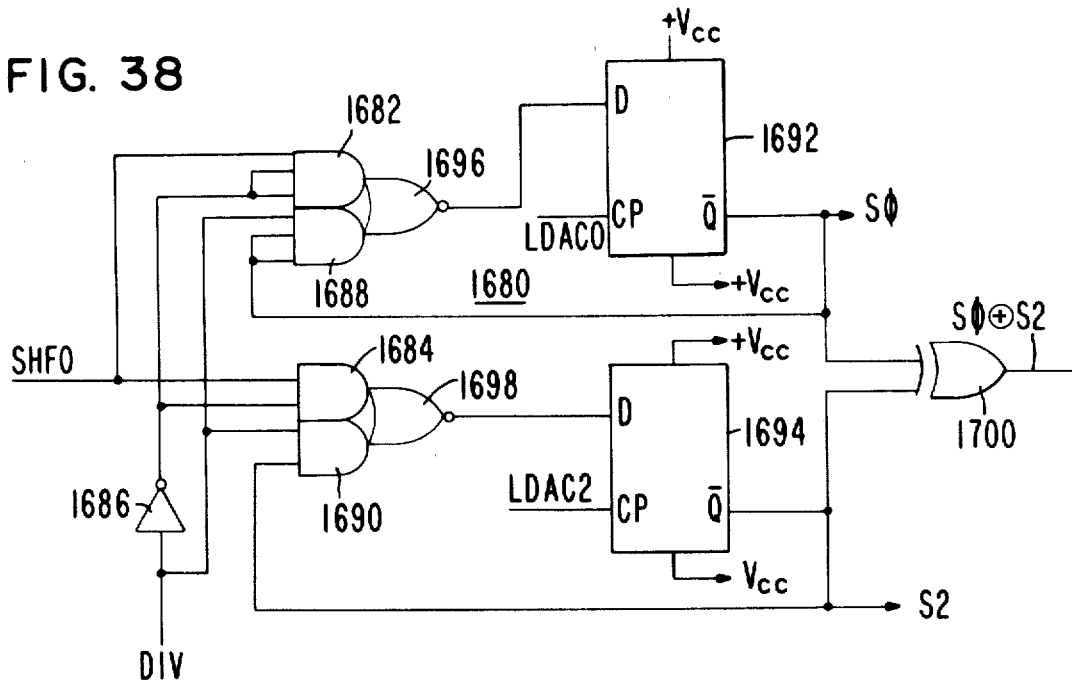

FIG. 38 shows details of double shift instruction logic circuit 1680 connected to the register file 166. The SHF0 terminal of bus 164 is connected to AND gates 1682 and 1684. The output of inverter 1686 provides the other two inputs to AND gates 1682 and 1684. The input to inverter 1686 is connected to receive the DIV signal, which is also supplied as an input to AND gate 1688 and 1690. The other input to AND gates 1688 and 1690 are the respective $\overline{Q}$ outputs of 74LS74 type flip-flop integrated circuits 1692 and 1694. The outputs of AND gates 1682 and 1688 are connected to the inputs of NOR gate 1696, and the outputs of AND gates 1684 and 1690 are connected to the inputs of NOR gate 1698. The outputs of NOR gates 1696 and 1698 are respectively connected to the D inputs to flip-flops 1692 and 1694. The clock pulse input CP of flip-flop circuit 1692 is connected to receive the LDAC0 signal, and the corresponding terminal of flip-flop 1694 is connected to receive the LDAC2 signal. The remaining inputs to the flip-flops 1692 and 1694 are connected to receive the +Vcc potential. The $\overline{Q}$ terminals of flip-flop 1692 provides the S0 signal and is also connected to one input of exclusive OR gate 1700. The $\overline{Q}$ terminal of flip-flop circuit 1694 is connected to the other input of exclusive OR gate 1700 and provides the S2 signal. The output of exclusive OR gate 1700 is the sum of the S0 and S2 signals.

Figure 39:
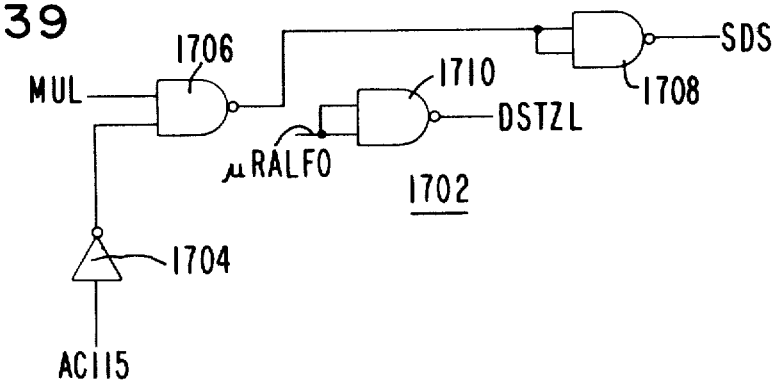

FIG. 39 shows an additional logic circuit 1702 connected to the register file 166. The ACl15 signal is supplied as an input to inverter 1704. The output of inverter 1704 forms one input to NAND gate 1706. The other input to NAND gate 1706 is the MUL signal. The output of NAND gate 1706 is supplied to the two inputs of NAND gate 1708, the output of which provides the SDS signal. The μRALF0 signal is supplied to both inputs of NAND gate 1710. The output of NAND gate 1710 provides the DSTZ signal.

Figure 40:
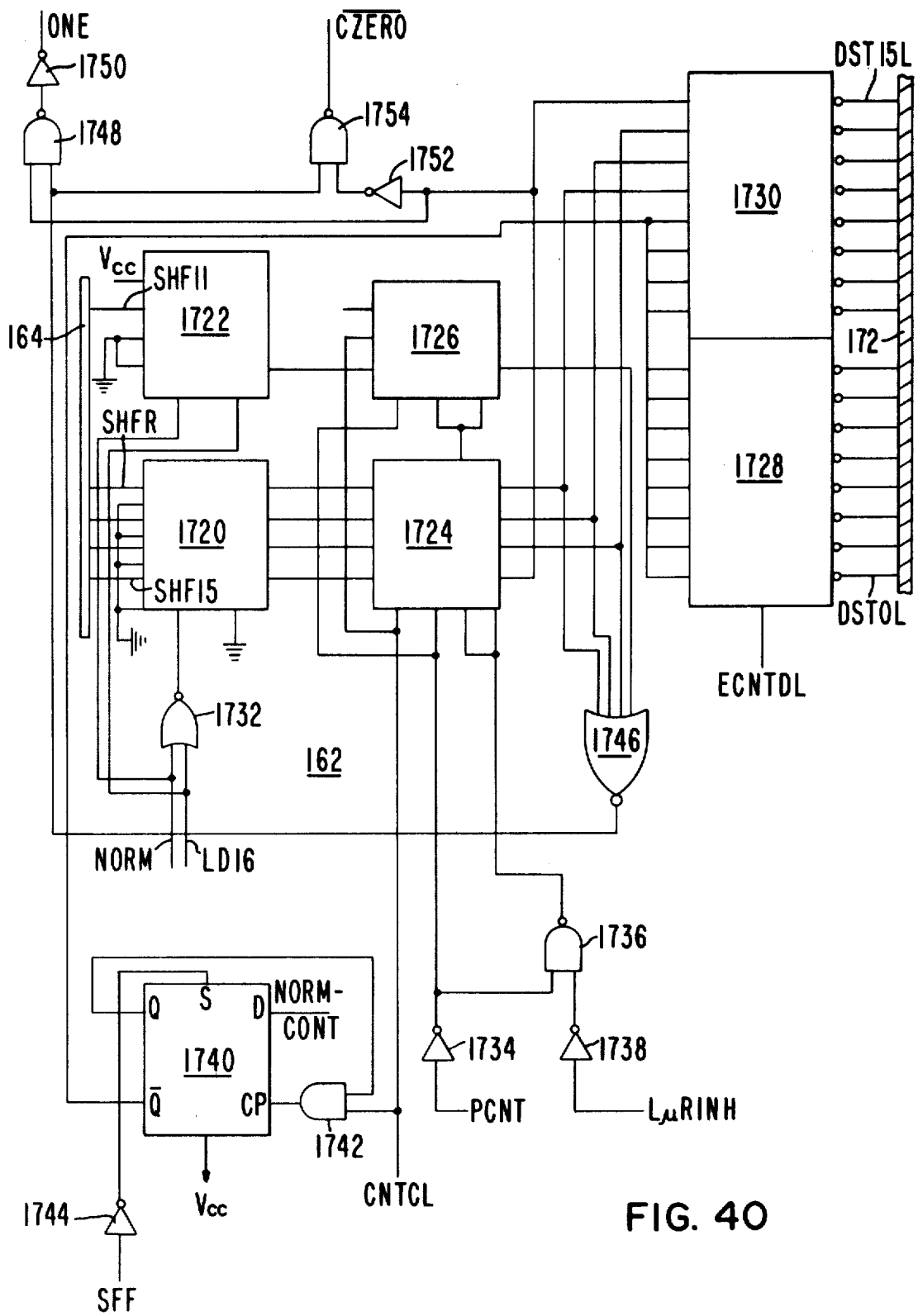

FIG. 40 shows details of the five bit counter 162 and its associated logic. The shifter 162 comprises a 74LS157 type quad 2 -input multiplexer integrated circuit 1720, a 74SL153 type dual four input multiplexer integrated circuit 1722, two 74LS161 type modulo-16 binary counter integrated circuits 1724 and 1726, and two 74LS240 type buffer/line driver integrated circuits 1728 and 1730. The SHF12 through SHF15 lines of bus 164 are connected to multiplexer circuit 1720. The SHF11 terminal is connected to the multiplexer circuit 1722. The Ea and I2a terminals of the multiplexer circuit 1722 are grounded, and the I1a terminal is connected to the +Vcc potential. The S1 terminal of multiplexer circuit 1722 is connected to receive the NORM signal and the S0 terminal is connected to receive the LD16 signal. The NORM and LD16 signals are also supplied as inputs to NOR gate 1732, the output of which is connected to the S terminal of multiplexer circuit 1720. The I0a, I0b, I0c, I0d and I0e terminals of multiplexer circuit 1720 are grounded. The Z$_a$ through Z$_d$ outputs of the multiplexer circuit 1720 are connected to the P$_0$ through P$_3$ inputs to the counter circuit 1724. The Z$_a$ output of the multiplexer circuit 1722 is connected to the P$_0$ input of counter circuit 1726. The output of inverter 1734 is connected to the PE terminal of counter circuits 1724 and 1726. The input of inverter 1734 is connected to receive the PCNT signal. The output of inverter 1734 is also supplied as an input to NAND gate 1736. The other input to NAND gate 1736 is provided by the output of inverter 1738, the input of which is connected to receive the LμRINH signal. The output of NAND gate 1736 is connected to the CEP and CET terminals of counter circuit 1724. The clock pulse input terminal CP of the counter circuits 1724 and 1726 are connected to receive the CNTCL signal. The $Q_0$ through $Q_3$ terminals of counter circuit 1724 are connected to four inputs of the buffer/line driver circuit 1730. The remaining inputs to the buffer/line driver circuit 1730 and the inputs to the buffer/line driver 1728 are all connected to the $\overline{Q}$ output of 74LS74 type flip-flop circuit 1740. The Q output of flip-flop circuit 1740 forms one input to AND gate 1742. The other input to AND gate 1742 is the CNTCL signal. The output of AND gate 1742 is connected to the clock pulse input CP of flip-flop circuit 1740. The set terminal S of the flip-flop circuit 1740 is connected to the output of inverter 1744, the input of which is connected to receive the SFF signal. The $\overline{C_{D2}}$ terminal of the flip-flop circuit 1740 is connected to the +Vcc potential. The D input terminal to flip-flop circuit 1740 is connected to receive the NORMCOMP signal. The $\overline{OE_1}$ and $\overline{OE_2}$ terminals of the buffer/line driver circuit 1728 are connected to receive the ECNTDL signal. The outputs of the buffer/line driver circuits 1728 and 1730 are respectively connected to the DST0L through DST15L lines of bus 172. The $Q_1$ through $Q_3$ outputs of the counter circuit 1724 and the $Q_0$ output of the counter circuit 1726 are connected as inputs to NOR gate 1746. The output of NOR gate 1746 is connected to one input of NAND gate 1748. The other input to NAND gate 1748 is supplied by the $Q_0$ output of counter circuit 1724. The output of NAND gate 1748 is supplied to the input of inverter 1750, the output of which supplies the ONE signal. The $Q_0$ output of counter circuit 1724 is also supplied as an input to inverter 1752, the output of which forms one input to NAND gate 1754. The other input to NAND gate 1754 is from the output of NOR gate 1746. The output of NAND gate 1754 is the $\overline{\text{CZERO}}$ signal.

FIG. 41 shows a portion of the double shift logic circuit 1680. AND gate 1760 is connected to receive the $\mu$RBRQ signal, the $\mu$RR/W and the $\mu$RO2 signals as inputs. The output of AND gate 1760 is the DSR signal. The $\mu\overline{\text{RBRQ}}$ and $\mu$RR/W signals are also supplied as inputs to AND gate 1762. The other input to AND gate 1762 is the $\mu$R02 signal. The output of AND gate 1762 is the DSL signal. The $\mu$RPCE and $\mu\overline{\text{RINC}}$ signals are supplied as inputs to NOR gate 1764. The other input to NOR gate 1764 is from the $\overline{O_5}$ output of 74LS138 type 1-of-8 decoder/demultiplexer integrated circuit 1766. The output of NOR gate 1764 is the NORM signal, which is supplied as an input to NAND gate 1768. The other input to NAND gate 1768 is the AC00 signal. The output of NAND gate 1768 provides the $\overline{\text{NORMCOMP}}$ signal, which is supplied as inputs to inverters 1770 and NAND gate 1772. The output of inverter 1770 is the NORMCOMP signal. A second input to NAND gate 1772 is the output of AND gate 1762. The third input to NAND gate 1772 is provided by the output of NAND gate 1774. One input to NAND gate 1774 is provided by the output of AND gate 1776. One input to AND gate 1776 is supplied by the $\mu$RR/W signal. The other input to AND gate 1776 is supplied by the output of NAND gate 1778. The $\overline{O_3}$ and $\overline{O_7}$ terminals of decoder/demultiplexer circuit 1766 provide the two inputs to NAND gate 1778. The A0, A1 and A2 inputs of the decoder/demultiplexer circuit 1766 are connected to receive the $\mu$RO0, the $\mu$RO1 and the $\mu$RO2 signals, respectively. The $E_1$ and $E_2$ terminals of decoder/demultiplexer circuit 1766 are connected to receive the $\mu$RBRQ signal. The $E_3$ terminal is connected to the +Vcc potential. The other input to NAND gate 1774 is supplied by the output of inverter 1780, which receives the $\overline{\text{CZERO}}$ signal as its input. The $\overline{\text{CZERO}}$ signal is also supplied as an input to AND gate 1782. The other input to AND gate 1782 is supplied by the output of AND gate 1776. The output of AND gate 1782 is the PRSL signal. The output of NAND gate 1772 is connected to the input of AND gate 1784. The other input to AND gate 1784 is provided by the output of NAND gate 1786. The inputs to NAND gate 1786 are connected to the output of AND gate 1760 and the output of NAND gate 1774. The output of AND gate 1784 is the $\overline{\text{LSAC1}}$ signal. The $\overline{O_0}$ and $\overline{O_2}$ outputs of decoder/demultiplexer circuit 1766 provide inputs to NAND gate 1779, the output of which is the MUL signal. The $\overline{O_2}$ output of decoder/demultiplexer circuit 1776 is also provided as an input to inverter 1781, the output of which is the MULS signal. The $\overline{O_4}$ and $\overline{O_6}$ outputs of the decoder/demultiplexer circuit 1766 are provided as the inputs to NAND gate 1783, the output of which is the DIV signal.

FIG. 42 shows an additional portion of the double shift logic circuits 1680. The PRSL and IR3 signals are provided as inputs to NAND gate 1788. The output of NAND gate 1788 is the INHDSL signal.

FIG. 43 shows yet another portion of the double shift logic circuit 1680. The $\mu\overline{\text{RPCE}}$, $\mu$RINC and $\mu\overline{\text{ROO}}$ signals are supplied as inputs to AND gate 1790. The output of AND gate 1790 is the LD16 signal.

FIG. 44 shows details of another portion of the double shift logic circuit 1680. The $\mu$RDM0, $\mu$RDM1 and $\mu$RDM2 signals are supplied as inputs to AND gate 1792. The output of AND gate 1792 provides one input to NAND gate 1794. The other input to NAND gate 1794 is the F signal. The output of NAND gate 1794 is the $\overline{\text{DST-AC2}}$ signal. The $\overline{\text{DST-AC2}}$ signal is supplied as an input to inverter 1796. The output of inverter 1796 is the DST-AC2 signal.

FIG. 45 shows details of the trap logic circuit 1800. The $\overline{\text{FLGIN}}$ signal is supplied as an input to NAND gate 1802 and to inverter 1804. A second input to NAND gate 1802 is provided by the Q output of 74LS74 type flip-flop circuit 1806. A third input to NAND gate 1802 is provided by the output of NAND gate 1808. One input to NAND gate 1808 is connected to receive the $\mu$RALF1 signal. The other input to NAND gate 1808 is provided by the output of inverter 1810. The input of inverter 1810 is connected to the output of NAND gate 1812. The inputs to AND gate 1812 are connected to receive the $\mu$RSCON and $\mu$RDCON signals. The output of NAND gate 1802 forms one input to NAND gate 1814. A second input to NAND gate 1814 is provided by the output of NAND gate 1816. One input to NAND gate 1816 is provided by the output of inverter 1804. The second input is provided by the 1BB2 signal, and the remaining input is provided by the output of NAND gate 1808. A third input to NAND gate 1814 is provided by the output of NAND gate 1818. One input to NAND gate 1818 is supplied by the output of inverter 1810. The other input is connected to receive the $\mu$RALF0 signal. The remaining input to NAND gate 1814 is connected to receive the $\mu$MRWD signal. The output of NAND gate 1814 is connected to the D input of flip-flop circuit 1806. The clock pulse input CP of the flip-flop 1806 is connected to receive the L$\mu$R signal. The Q output of flip-flop circuit 1806 provides the TRAPE signal.

FIG. 46 shows a circuit 1820 for producing certain special logic signals. The A0 and A1 terminals of 1-of-8 decoder/demultiplexer circuit 1822 are connected to receive the µRBRM0 signal and the µRMAR signal, respectively. The A2 terminal is grounded. The E1 and E2 terminals are each connected to the output of NAND gate 1824. Two inputs to NAND gate 1824 are connected to receive the µRBHE signal. The E3 terminal of decoder/demultiplexer circuit 1822 is connected to receive the µRBRM1 signal. The O0 and O1 outputs of decoder/dmultiplexer circuit 1822 are connected to the inputs of AND gate 1826. The output of AND gate 1826 is the STACKW signal. Output O1 also provides the CRYOUT signal. The O2 output is connected to the input of inverter 1828. The output of the inverter 1828 is the ZSKP signal. The O3 output is connected to the input of inverter 1830, the output of which forms one input to NAND gate 1832. The other input to NAND gate 1832 is supplied by the LµR1 signal from strobe generator decode logic 508. The output of NAND gate 1832 provides one input to NAND gate 1834. The other input is supplied by the output of NAND gate 1836. The output of NAND gate 1834 forms one input to NAND gate 1836. The other input is connected to receive the F1 signal. The output of NAND gate 1836 is the LSR signal.

FIG. 47 shows another circuit 1840 for producing certain special logic signals. This circuit includes two 74LS138 type 1-of-8 decoder/demultiplexer integrated circuits 1842 and 1844. The µRSM0, µRSM1 and µRSM2 signals are connected to A2, A1 and A0 terminals of the decoder/demultiplexer circuit 1842. The µRDM0, µRDM1 and µRDM2 signals are connected to the corresponding terminals of decoder/demultiplexer circuit 1844. The E1 terminals of both circuits 1842 and 1844 are grounded. The E2 terminals are connected to receive the µRSCON signal. The E3 terminals are connected to receive the µRDCON signal. The O1 terminal of the decoder/demultiplexer circuit 1842 provides the RUN signal, also sometimes identified as the WAIT signal. The O2 terminal provides the OVFSKP signal, which is also supplied as an input to inverter 1846. The output of inverter 1846 is the OVFSKP signal. The O4 terminal provides the EN64K signal. The O5 terminal provides the I/OSKP signal. The O6 terminal provides the EN32K signal. The O7 terminal provides two inputs to NAND gate 1848, the output of which forms one input to NAND gate 1850. The other input to NAND gate 1850 is the ALUCRY signal. The output of NAND gate 1850 is the ESETCRY signal.

FIG. 48 shows another circuit 1860 for providing further special logic signals. The A0, A1 and A2 terminals of 74LS138 type decoder/demultiplexer integrated circuit 1862 are connected to receive the µRO0, µRO1 and µRO2 signals, respectively. The E1 and E2 terminals are grounded. The E3 terminal is connected to receive the µRBRQ signal. The O0 terminal provides the F signal. The O1 terminal provides one input to AND gate 1864, and the O2 terminal provides the other input. The output of AND gate 1864 is connected to one input of NOR gate 1866. The other input to NOR gate 1866 is provided by the output of AND gate 1868, which receives the µRR/W signal as its two inputs. The output of NOR gate 1866 is the R signal. The O3 terminal is connected to the input of inverter 1870, the output of which provides the INT/TRW signal. The O5 terminal provides the DCH signal. The O6 terminal provides the CCR signal.

FIG. 49 shows another circuit 1872 for producing certain special logic signals. The I1a, I2a and I3a terminals of 74LS253 type dual 4-input multiplexer integrated circuit 1874 are connected respectively to receive the S0, S0+S2 and S2 signals, respectively. The OEA terminal is connected to the output of NAND gate 1876. The two inputs to NAND gate 1876 are connected to receive the µRBRQ and µRMAR signals. The S0 and S1 terminals of multiplexer 1874 are connected to receive the µRBM1 and µRBM0 signals, respectively. The Za terminal of multiplexer circuit 1874 is connected to one input of NAND gate 1878. A second input to NAND gate 1878 is connected to receive the µRINH signal. The third input to NAND gate 1878 is connected to the output of NAND gate 1774 in FIG. 41. The remaining input to NAND gate 1878 is connected to the output of NAND gate 1880. The inputs to NAND gate 1880 are connected to receive the AC115, µRBRE, µRBRM0 and µRBRM1 signals. The µRBRE, µRBRM0 and µRBRM1 signals are also supplied as inputs to NAND gate 1882, the output of which is the CLRCRY signal. The output of NAND gate of 1878 forms two inputs to AND gate 1884. The other input to AND gate 1884 is connected to receive the IR0 signal. The output of AND gate 1884 forms one input to NOR gate 1886. The other input to NOR gate 1886 is provided by the output of AND gate 1888. One input to AND gate 1888 is the IR12 signal, and the IR0 signal provides two additional inputs to AND gate 1888. The output of NOR gate 1886 is the INHE signal, which is supplied to the input of inverter 1890 to produce the INHE signal at the output of inverter 1890.

Figure 50:
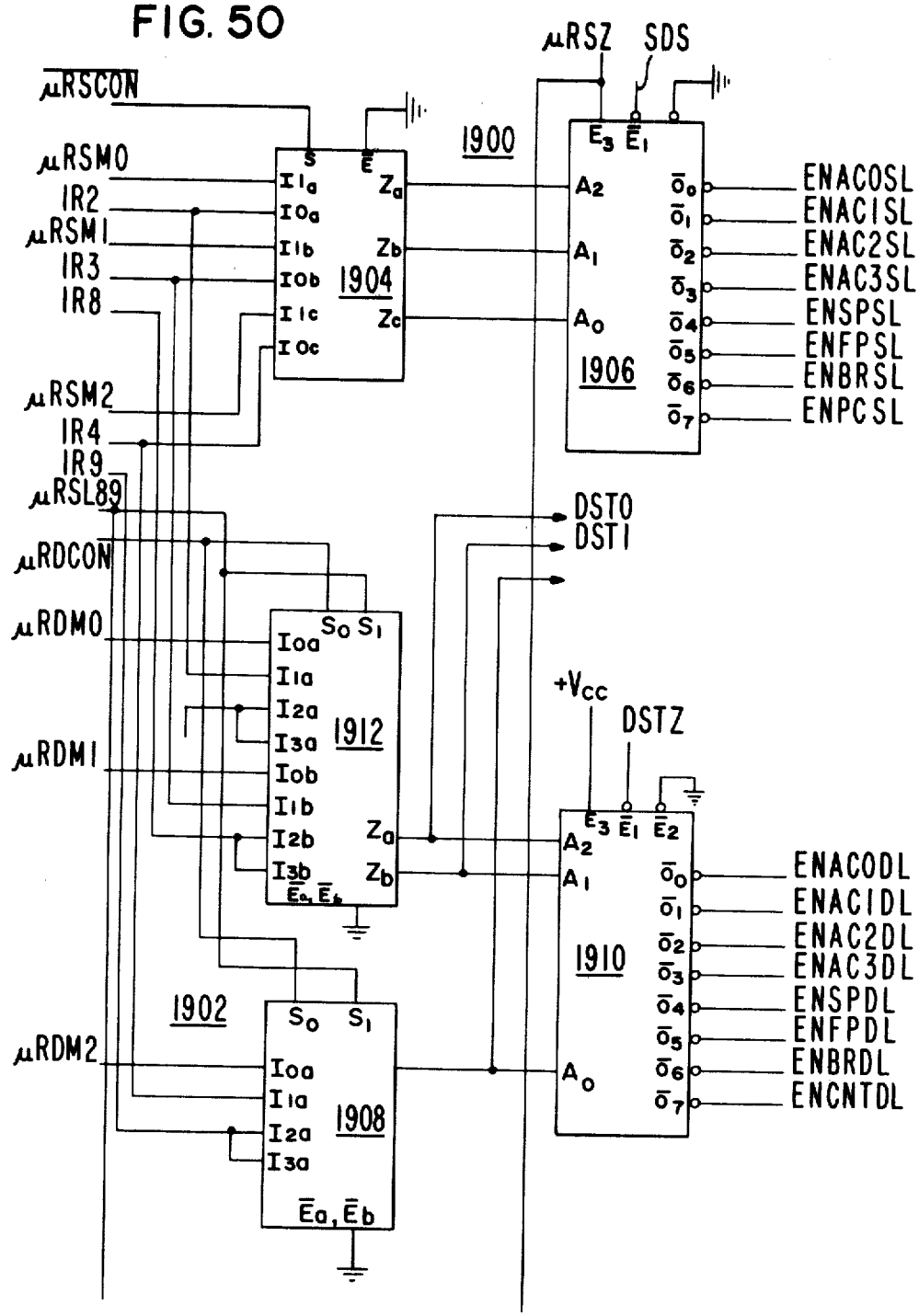

FIG. 50 shows details of source control logic circuit 1900 and destination control logic circuit 1902. The I1d, I0a, I1b, I0b, I1c and I0c terminals of 74LS157 type multiplexer integrated circuit 1904 are respectively connected to receive the µRSM0 signal, the IR2 signal, the µRSM1 signal, the IR3 signal, the µRSM2 signal and the IR4 signal. The S terminal is connected to receive the µRSCON signal. The E terminal is grounded. The Za, Zb and Zc terminals of the multiplexer circuit 1904 are connected to A2, A1 and A0 terminals of 74LS138 type decoder/demultiplexer integrated circuit 1906. The E1 terminal of the circuit 1906 is connected to receive the SDS signal. The E3 terminal is connected to receive the µRSZ signal. The O0 through O7 terminals of the decoder/demultiplexer circuit 1906 respectively provide the ENAC0SL through ENAC3SL, ENSPSL, ENFPSL, ENBRSL and ENPCSL signals.

In the destination control logic circuit 1902, the I0a, I1a and I2a terminals of 74LS153 type multiplexer integrated circuit 1908 are connected to receive, respectively, the µRDM2 signal, the IR4 signal, and the IR9 signal. The I3A terminal also receives the IR9 signal. The S0 terminal is connected to receive the µRDCON signal. The S1 terminal is connected to receive the µRSL89 signal. The Ea and Eb terminals are grounded. The Za output of multiplexer circuit 1908 is connected to the A0 input of 74LS138 type decoder/demultiplexer integrated circuit 1910. The I0a, I1b and I2a terminals of 74LS153 type multiplexer integrated circuit 1912 are connected to receive, respectivley, the µRDM0 and IR2 signals and ground. The I3a terminal is also grounded. The I0b, I1b and I2b terminals of the circuit 1912 are connected respectively to receive the µRDM1, IR3 and IR8 signals. The I3b terminal is also connected to receive the IR8 signal. The S0 terminal is connected to receive the µRDCON signal and the S1 terminal is connected to receive the µRSL89 signal. The Ea and Eb terminals are grounded. The Za terminal of multiplexer circuit 1912 provides the DST0 signal and is connected to the A2 terminal of decoder/demultiplexer integrated circuit 1910. The Zb terminal of the multiplexer circuit 1912 provides the DST1 signal and is connected to the A1 terminal of decoder/demultiplexer circuit 1910. The E2 terminal of decoder/demultiplexer circuit 1910 is grounded. The E1 terminal is connected to receive the DSTZ signal. The E3 terminal is connected to the +Vcc potential. The $\overline{O}0$ through $\overline{O}3$ terminals provide the ENAC0DL through ENAC3DL signals. The $\overline{O}4$ terminal provides the ENSPDL signal. The $\overline{O}5$ terminal provides the ENFPDL signal. The $\overline{O}6$ terminal provides the ENBRDL signal. The $\overline{O}7$ terminal provides the ENCNTDL signal.

FIG. 51 shows a portion of byte instruction logic 1920. The two inputs of NAND gate 1922 are connected to receive the μRSZ and μRSL89 signals. The output of NAND gate 1922 is the $\overline{OR}$ signal, which is provided as an input to NAND gate 1924. The R and μRSL89 signals provide two additional inputs to NAND gate 1924. The output of NAND gate 1924 is the $\overline{ROTLC}$ signal. The $\overline{R}$ and μRSL89 signals provide inputs to NAND gate 1926. The output of NAND gate 1926 is the $\overline{ROTRC}$ signal, which is supplied as an input to inverter 1928. The output of inverter 1928 is connected to one input of NAND gate 1930. The other input to NAND gate 1930 is connected to receive the LμR1 signal. The output of NAND gate 1930 is connected to the S terminal of 74LS74 type flip-flop integrated circuit 1932. The R terminal of the flip-flop 1932 is connected to receive the $\overline{F1}$ signal. The Q output of the flip-flop 1932 is connected to one input of NAND gate 1934. The other two inputs to NAND gate 1934 are connected to receive the R and IN8 signals. The output of NAND gate 1934 is the $\overline{STBR}$ signal. The Q output of the flip-flop 1932 is the BYSKP signal.

FIG. 52 shows another portion of the byte instruction logic 1920. The SHFCRY signal is supplied to the input of inverter 1936. The output of inverter 1936 is connected to two inputs of NOR gate 1938. The $\overline{ROTRC}$ signal provides another input to NOR gate 1938. The output of NOR gate 1938 is connected to the D terminal of 74LS74 flip-flop integrated circuit 1940. The CL signal is supplied as one input to AND gate 1942. The $\overline{Q}$ output of flip-flop circuit 1940 is the other input to AND gate 1942. The output of AND gate 1942 is connected to the clock pulse input CP of flip-flop circuit 1940. The R terminal of flip-flop circuit 1940 is connected to receive the $\overline{F1}$ signal. The Q output terminal of flip-flop circuit 1940 provides the BYCARRY signal.

FIG. 53 shows a logic circuit 1950 for the 5 bit counter 162 shown in FIG. 1. The circuit incorporates three 74LS74 type flip-flop circuits 1952, 1954 and 1956. The D input to flip-flop circuit 1952 is connected to the +Vcc potential. The clock pulse input CP of the flip-flop 1952 is connected to the output of NAND gate 1958. One input to NAND gate 1958 is provided by the $\overline{Q}$ output of the flip-flop 1952. A second input is provided by the LD16 signal. A third input is provided by the LμR1 signal. The R terminal of flip-flop circuit 1952 is connected to receive the $\overline{F1}$ signal. The output of NAND gate 1958 also forms one input to NAND gate 1960. A second input to NAND gate 1960 is provided by the output of inverter 1962, the input of which receives the CL signal. A third input to NAND gate 1960 is provided by the output of NAND gate 1964. One input of NAND gate 1964 is connected to receive the NORM signal. A second input receives the LμR1 signal, and a third input is connected to the $\overline{Q}$ terminal of flip-flop circuit 1954. The output of flip-flop 1960 is the CNTCL signal. The output of NAND gate 1958 is also connected to one input of NAND gate 1966. A second input to NAND gate 1966 is provided by the output of NAND gate 1964. The third input to NAND gate 1966 is provided by the output of NAND gate 1968. One input to NAND gate 1968 is connected to receive the LμR1 signal and the other input is connected to receive the PRSL signal. The output of NAND gate 1966 is the SFF signal. The D terminal of flip-flop circuit 1954 is connected to the +Vcc potential. The clock pulse input CP of flip-flop circuit 1954 is connected to the output of NAND gate 1964. The R terminal of flip-flop circuit 1954 is connected to the output of NAND gate 1970. One input to NAND gate 1970 is the LμR1 signal, and the other input is the F signal, supplied by the output of inverter 1972, the input of which is connected to receive the $\overline{F}$ signal. The D terminal of flip-flop integrated circuit 1956 is grounded. The clock pulse input CP of flip-flop 1956 is connected to the output of inverter 1974. The input of inverter 1974 is connected to receive the LμR1 signal. The S terminal of flip-flop circuit 1956 is connected to the output of inverter 1962. The $\overline{Q}$ output of flip-flop circuit 1956 provides the INCL signal. The Q output of flip-flop circuit 1956 provides one input to NAND gate 1976 and NAND gate 1978. The other input of NAND gate 1976 is connected to receive the LD16 signal. The output of NAND gate 1976 forms one input to NAND gate 1980. A second input to NAND gate 1978 is connected to receive the NORM signal. The output of NAND gate 1978 forms a second input to NAND gate 1980. A third input to NAND gate 1980 is the ECNT signal. The output of NAND gate 1980 is the PCNT signal. The SFF output signal of NAND gate 1966 is connected to the clock pulse input CP of flip-flop integrated circuit 1957. The D and S inputs to the flip-flop circuit 1957 are connected to the +Vcc potential. The R input to flip-flop circuit 1957 is connected to the output of AND gate 1982. One input to AND gate 1982 is connected to receive the $\overline{MRP}$ signal. A second input is connected to the output of NAND gate 1984. One input to NAND gate 1984 is the NORMCOMP signal. The second input of NAND gate 1984 is connected to receive the INCL signal. The remaining input to AND gate 1982 is provided by the output of NAND gate 1986. One input to NAND gate 1986 is the ONE signal, and the other input is the INCL signal. The Q output of flip-flop circuit 1957 is the μRINH signal.

Figure 54:
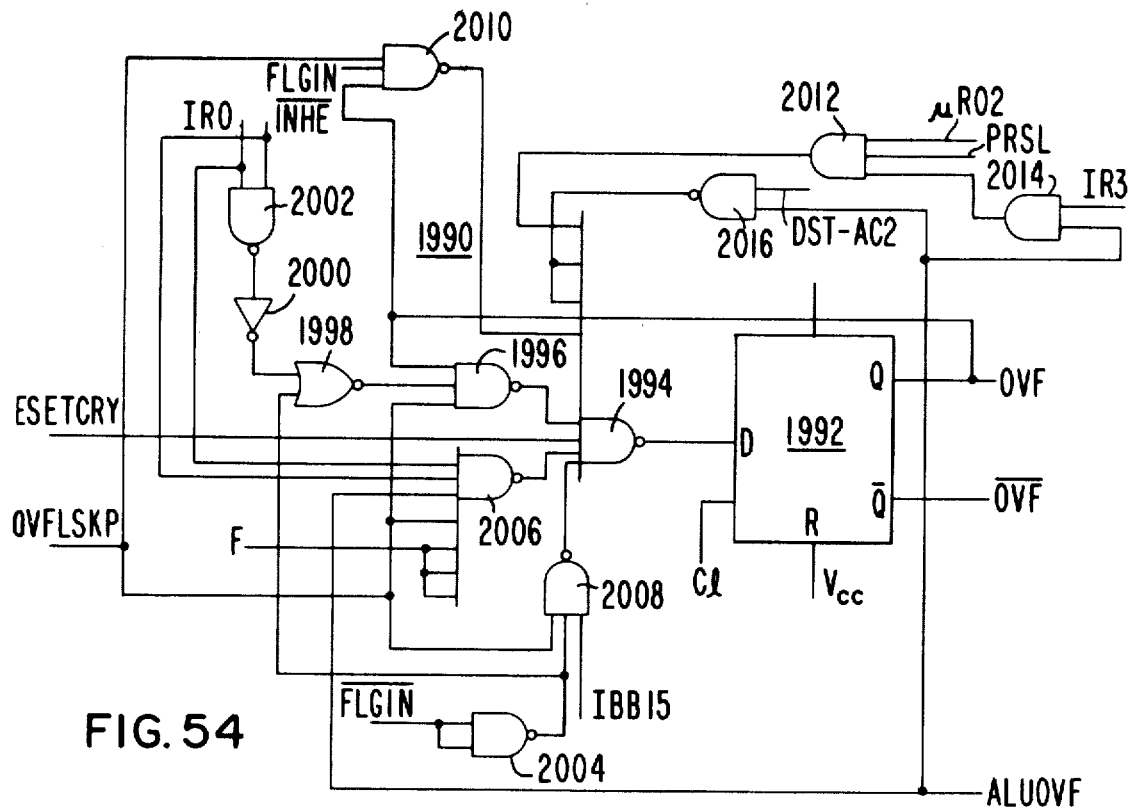

FIG. 54 shows overflow logic circuit 1990. A 74LS74 type flip-flop integrated circuit 1992 has its clock pulse input CP connected to receive the C1 signal. The R terminal of flip-flop circuit 1992 is connected to the +Vcc potential. The D input of flip-flop circuit 1992 is connected to the output of NAND gate 1994. One input to NAND gate 1994 is connected to receive the $\overline{ESETCRY}$ signal. A second input to NAND gate 1994 is connected to the output of NAND gate 1996. One input to NAND gate 1996 is provided by the Q output of flip-flop circuit 1992. A second input to NAND gate 1996 is provided by the output of NOR gate 1998. One input to NOR gate 1998 is connected to the output of inverter 2000, the input of which is connected to the output of NAND gate 2002. One input of NAND gate 2002 is connected to receive the $\overline{INHE}$ signal, and the other input is connected to receive the IR0 signal. The other input of NOR gate 1998 is provided by the output of NAND gate 2004. The two inputs to NAND gate 2004 are connected to receive the $\overline{\text{FLGIN}}$ signal. The remaining input to NAND gate 1996 is connected to receive the OVFLSKP signal. A third input to NAND gate 1994 is provided by the output of NAND gate 2006. One input of NAND gate 2006 is connected to receive the IR0 signal. A second input is connected to receive the $\overline{\text{INHE}}$ signal. A third input is connected to receive the ALUOVF signal. A fourth input is connected to receive the $\overline{\text{OVFLSKP}}$ signal. The remaining three inputs to NAND gate 2006 are provided by the F signal. The remaining input to NAND gate 1994 is provided by the output of NAND gate 2008. One input to NAND gate 2008 is connected to receive the IBB15 signal. A second input is connected to the output of NAND gate 2004. The third input to NAND gate 2008 is connected to receive the $\overline{\text{OVFLSKP}}$ signal. A further input to NAND gate 1994 is provided by the output of NAND gate 2010. One input to NAND gate 2010 is the $\overline{\text{OVFLSKP}}$ signal. A second input is the $\overline{\text{FLGIN}}$ signal, and the third input to NAND gate 2010 is supplied by the Q terminal of flip-flop circuit 1992. Another input to NAND gate 1994 is provided by the output of AND gate 2012. One input to AND gate 2012 is connected to receive the μRO2 signal. A second input is connected to receive the PRSL signal, and the remaining input is connected to the output of AND gate 2014. One input of AND gate 2014 is connected to receive the IR3 signal, and the other input is connected to receive the ALUOVF signal. The remaining inputs to NAND gate 1994 are provided by the output of NAND gate 2016. One input to NAND gate 2016 is connected to receive the DST-AC2 signal, and the other input is connected to receive the ALUOVF signal. The Q output of flip-flop circit 1992 provides the OVF signal and the $\overline{Q}$ terminal provides the $\overline{\text{OVF}}$ signal.

Figure 55:
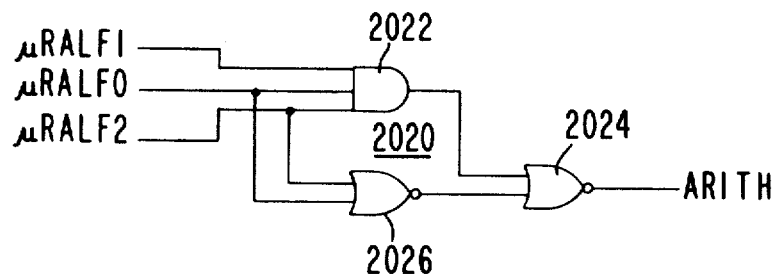

FIG. 55 shows a portion of carry to shifter logic 2020. The μRALF0, μRALF1 and μRALF2 signals provide three inputs to AND gate 2022. The output of AND gate 2022 is connected to one input of NOR gate 2024. The other input to NOR gate 2024 is provided by the output of NOR gate 2026. The two inputs to NOR gate 2026 are connected to receive the μRALF0 and μRALF2 signals. The output of NOR gate 2024 is the ARITH signals.

Figure 56:
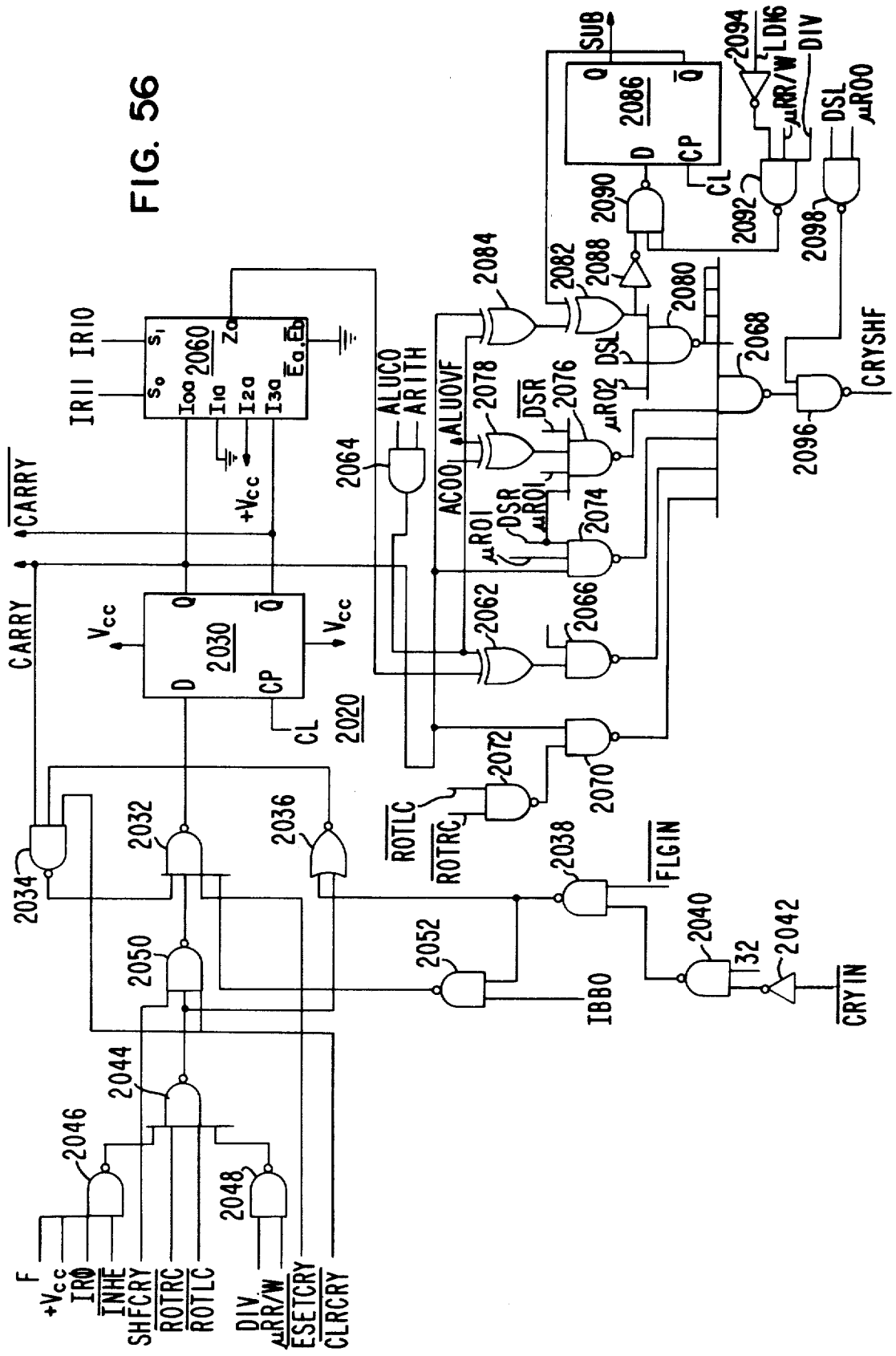

FIG. 56 shows another portion of the carry to shifter logic 2020. A 74LS74 type flip-flop integrated circuit 2030 has its D input connected to the output of NAND gate 2032. One input to NAND gate 2032 is connected to receive the $\overline{\text{ESETCRY}}$ signal. A second input to NAND gate 2032 is connected to the output of NAND gate 2034. One input to NAND gate 2034 is connected to receive the CARRY signal. A second input to NAND gate 2034 is provided by the output of NOR gate 2036. One input to NOR gate 2036 is connected to the output of NAND gate 2038. One input to NAND gate 2038 is connected to receive the $\overline{\text{FLGIN}}$ signal. The other input to NAND gate 2038 is provided by the output of NAND gate 2040. One input to NAND gate 2040 is connected to receive the 32 signal, and the other input is connected to the output of inverter 2042. The CRYIN signal provides the input to inverter 2042. The second input to NOR gate 2036 is provided by the output of NAND gate 2044. Two inputs of NAND gate 2044 are connected to receive the $\overline{\text{ROTRC}}$ and $\overline{\text{ROTLC}}$ signals. A third input of NAND gate 2044 is provided by the output of NAND gate 2046. The four inputs to NAND gate 2046 are connected to receive the F, IR0 and $\overline{\text{INHE}}$ signals, and to the +Vcc potential. The remaining input to NAND gate 2044 is supplied by the output of NAND gate 2048. The two inputs to NAND gate 2048 are connected to receive the DIV and μRR/W signals. Another input to NAND gate 2032 is provided by the output of NAND gate 2050. One input of NAND gate 2050 is connected to receive the SHFCRY signal, a second input to NAND gate 2050 is provided by the output of NAND gate 2044, and the remaining input to NAND gate 2050 is provided by the CLRCRY signal. The remaining input to NAND gate 2032 is provided by the output of NAND gate 2052. One input of NAND gate 2052 is connected to the output of NAND gate 2038, and the other input is connected to receive the IBB0 signal. The Q terminal of the flip-flop circuit 2030 provides the $\overline{\text{CARRY}}$ signal and is connected to the I0a terminal of 74LS153 type multiplexer integrated circuit 2060. The Q terminal of flip-flop integrated circuit 2030 provides the carry signal, and is connected to the I3a terminal of multiplexer circuit 2060. The CL signal provides the input to clock pulse terminal CP of the flip-flop 2030. The R and S terminals of flip-flop 2030 are connected to the +Vcc potential. The I1a terminal of multiplexer circuit 2060 is grounded, and the I2a terminal is connected to the +Vcc potential. The S0 and S1 terminals of the multiplexer circuit 2060 are respectively connected to receive the IR11 and IR10 signals. The $\overline{\text{Ea}}$ and $\overline{\text{Eb}}$ terminals are grounded. The Za terminal of multiplexer circuit 2060 provides one input to exclusive OR gate 2062. The other input to exclusive OR gate 2062 is provided by the output of AND gate 2064. One input of AND gate 2064 is connected to receive the ALUC0 signal, and the other input is connected to receive the ARITH signal. The output of exclusive OR gate 2062 is connected to one input of NAND gate 2066. The other input of NAND gate 2066 is connected to receive the IR0 input. The output of NAND gate 2066 is connected to one input of NAND gate 2068. Another input to NAND gate 2068 is provided by the output of NAND gate 2070. One input of NAND gate 2070 is connected to the output of NAND gate 2072. One input to NAND gate 2072 is connected to receive the $\overline{\text{ROTRC}}$ signal, and the other input is connected to receive the $\overline{\text{ROTRL}}$ signal. The other input to NAND gate 2070 is connected to the Q output of flip-flop integrated circuit 2030. Another input to NAND gate 2068 is provided by the output of NAND gate 2074. One input to NAND gate 2074 is provided by the output of NAND gate 2064. The other two inputs of NAND gate 2074 are connected to receive the μRO1 and DSR signals. Another input to NAND gate 2068 is provided by the output of NAND gate 2076. One input to NAND gate 2076 is connected to receive the $\overline{\text{DSR}}$ signal. A second input is connected to receive the μRO1 signal, a third input is connected to receive the DSR signal, and the remaining input is connected to the output of exclusive OR gate 2078. One input of exclusive OR gate 2078 is connected to receive the ACO0 signal, and the other input is connected to receive the ALUOVF signal. The remaining inputs to NAND gate 2068 are provided by the output of NAND gate 2080. One input to NAND gate 2080 is provided by the μRO0 signal. A second input is provided by the DSL signal. The remaining input is provided by the output of exclusive OR gate 2082. One input of exclusive OR gate 2082 is connected to the output of exclusive OR gate 2084. One input to exclusive OR gate 2084 is connected to receive the CARRY signal, and the other input is connected to the output of AND gate 2064. The other input to exclusive OR gate 2082 is connected to the $\bar{Q}$ terminal of 74LS74 type flip-flop circuit 2086. The output of exclusive OR gate 2082 is also connected to the input of inverter 2088. The output of inverter 2088 forms one input to NAND gate 2090. The remaining inputs to NAND gate 2090 are provided by the output of NAND gate 2092. One input to NAND gate 2092 is provided by the $\mu$RR/W signal. A second input is provided by the DIV signal and a third input is provided by the output of inverter 2094, the input of which is connected to receive the LD16 signal. The output of NAND gate 2090 is connected to the D input to flip-flop circuit 2086. The clock pulse input CP of the flip-flop 2086 is connected to receive the CL signal. The Q output of flip-flop 2086 provides the SUB signal. The output of flip-flop 2068 forms one input to NAND gate 2096. The other input to NAND gate 2096 is provided by the output of NAND gate 2098. The inputs of NAND gate 2098 are connected to receive the DSL and $\mu$RO0 signals. The output of NAND gate 2096 is the CRYSHF signal.

While a system in accordance with this invention can be embodied using the commercially available integrated circuits connected as above, the preferred embodiment of the invention is as a single microprocessor integrated circuit 2100, as shown in FIG. 57. Such an integrated circuit includes all of the circuits described above in a single silicon chip having dimensions of approximately 0.25 inch on a side. Such a circuit may be fabricated in T²L and I²L technology using processes known in the art, such as the process used to fabricate the commercially available 9440 type microprocessor, available from Fairchild Camera and Instrument Corporation, Mountain View, Calif. Terminals IB0 through IB15 of the integrated circuit comprise the information bus 102, also shown in FIG. 1. The bus control 2102 comprise the write terminal W, memory control terminal M, $O_1$ and $O_0$ terminals. The external request bus 2104 comprises the ABORT request terminal, the consol request terminal, the data channel request terminal and the interrupt request terminal. The corresponding bus handshake signals are supplied on clocking terminal CP, ready data terminal $RDY_D$, the bus grant terminal BUSGNT, the ready address terminal $RDY_A$ and the memory ready terminal MR, comprising the bus handshake terminals 2106. Terminal 2108 is connected to the +Vcc potential. Terminal 2110 is connected to a current source $I_{INJ}$. Terminal 2112 is grounded. Status terminals 2114 provide the run, carry and interrupt on signals. Multi-processor signal terminals 2116 provide the bus request and the lock signals required when operating the microprocessor 2100 in a multi-processor mode. Timing strobe terminals 2118 provide the SYN synchronizing signals, the address strobe signal STRBA and the data strobing signal STRBD. Because the microprocessor 2100 of this invention generates appropriate control signals, it can interact with a memory 2120 without the use of a separate controller, as shown in FIG. 58. The microprocessor 2100 is connected to memory 2120, which is, for example, a random access memory (RAM), by a write line 2122 from its write terminal W. Additionally, address and data line 2124 and data line 2126 also connect microprocessor 2100 to memory 2120. Address and data line 2124 also connects microprocessor 2100 to address register 2128. Address line 2130 connects address register 2128 to memory 2120. Line 2132 connects address line 2130 to decoder 2134. Lines 2136 and 2138 respectively connect the memory control terminal M and the data strobe terminal $STRB_D$ to decoder 2134. Line 2139 connects the address strobe terminal $STRB_A$ to address register 2128. Line 2140 connects decoder 2134 to memory 2120. Line 2142 connects decoder 2134 to one shot circuit 2143. Line 2144 connects the output of one shot circuit 2143 to the microprocessor 2100 to provide the $\overline{RDYD}$ signal from one shot 2143.

Figure 6:
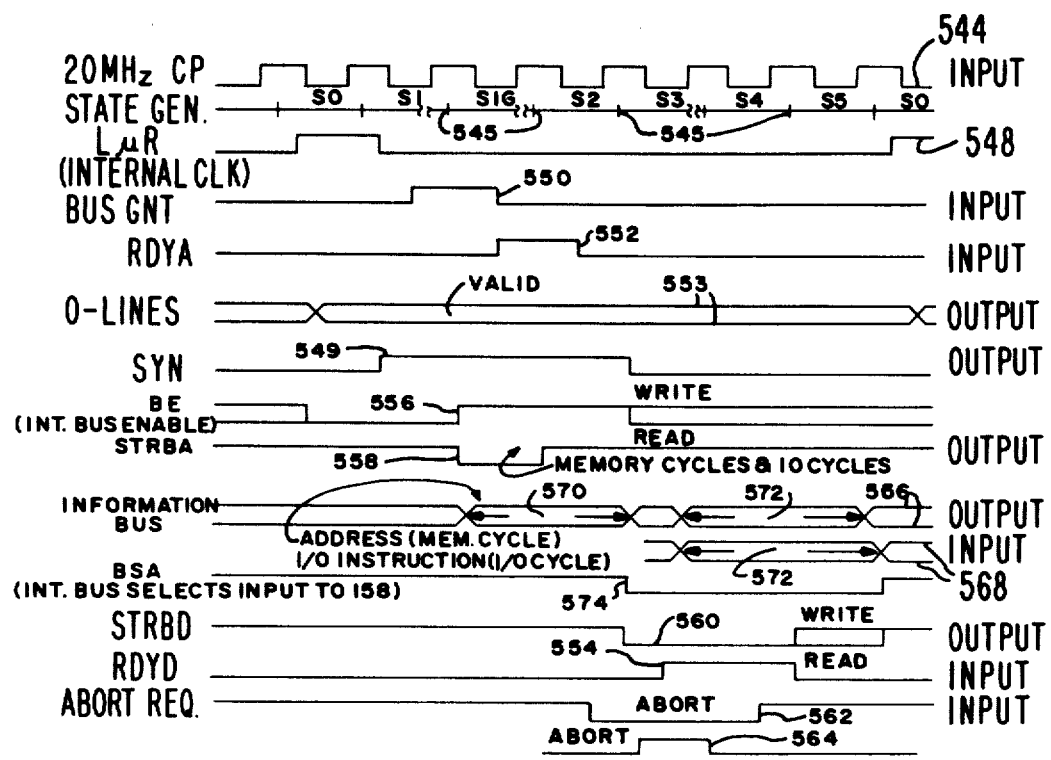

The timing diagram of FIG. 6 is useful for understanding the operation of the memory 2120 with microprocessor 2100. The timing is arranged so that the memory address is latched into address register 2128 with the trailing edge of the STRBA signal 558. The SYN signal 549 indicates the duration of the address phase of the cycle. The address time, controlled by the STRBA and SYN signals 558 and 549, can be extended using the RDYA signal 552. The data strobe STRBD signal 560 has different timing as shown in FIG. 6, depending on whether a read or write cycle is in progress. On the leading edge of the STRBD signal 560, during a read cycle, data may be put on the information bus 102 and, during a write cycle, data is outputted onto the information bus 102 after 50 nonoseconds (ns). At the trailing edge of the STRBD waveform 560, during a read cycle, data is removed from the information bus 102 and, during a write cycle, data is latched from the information bus 102. The synchronization (SYN) strobe 549 occurs every cycle and can be used for the external generation of additional strobes as required. The leading edge of SYN signal 549 indicates the start of the address phase of the cycle, and the trailing edge indicates the start of the data phase of the cycle. During certain write cycles, no address is supplied and no STRBA signal 558 is generated. This mode of operation occurs in increment and skip if zero or decrement and skip if zero (ISZ or DSZ) instrucions, and in auto increment and auto decrement addressing modes. Because the microprocessor 2100 generates the required signals, data channel operations may also be carried out without the use of a separaate controller circuit, as shown in FIG. 59. As shown, RAM 2120 is connected to microprocessor 2100 by the W, $\overline{STRBD}$ and $\overline{M}$ lines 2152, 2154 and 2156. Additionally, data bus 2150 connects information bus 102 to memory 2120. Bus 2158 connects microprocessor 2100 to address latch 2160 and also to information bus 102. Address line 2162 connects address latch 2160 to memory 2120. Address strobe line 2164 also connects the microprocessor 2100 to address latch 2160. Data channel request line 2166 and ready address line 2167 connect data channel controller 2168 to microprocessor 2100. Additionally, the output lines, synchronizing and bus request bus 2170 connects the microprocessor to the data channel controller 2168. Data bus 2172 and control bus 2174 connect the data channel controller 2168 to a suitable storage means (not shown), such as a tape or disc.

FIG. 60 shows timing for a typical data channel operation. The sequence of events during a data channel cycle is initiated by the setting of data channel request (DCH REQ) signals 2180 and 2182, as indicated at 2184. The microprocessor responds with appropriate data channel acknowledge signals. The microprocessor 2100 then three-states information bus 102 and sends the address strobe (STRBA) signal 2186 to address latch 2160. At this time, external logic in the data channel controller 2168 must supply an address to address latch 2160 on information bus 102 and bus 2158. If required, the address time can be extended with the ready address (RDYA) signal 2188. The microprocessor 2100 then outputs the strobe data (STRBD) signal 2190. The data channel controller 2168 then transmits or receives the data channel data and responds to the microprocessor with the ready data (RDYD) signal 2192 to conclude the data channel cycle. The clock signal 544, states 545, internal clock signal 548, synchronizing signal 549, bus grant input signal 550, and information bus input and output signals 566 and 568 perform the same functions as in FIG. 6.

It should be recognized that the microprocessor 2100 can operate with a separate memory controller if desired, in the same manner as the commercially available 9440 type microprocessor. It also should be recognized that the arrangement shown in FIG. 58 can be used for I/O operations by substituting an I/O device for the memory 2120 shown.

The microprocessor of this invention is especially suited for use in a multiprocessor environment. FIG. 61 shows bus arbitration in multiprocessor operations. Two microprocessors 2100 are shown, each connected to a bus arbiter 2200 by request buses 2202 and 2204, synchronizing signal lines 2206 and 2208 and bus grant lines 2210 and 2212. The microprocessors 2100 are connected to the bus arbiter 2200 by bus lock lines 2214 and 2216. Additionally, each microprocessor 2100 is connected to ready data line 2218, bus 2220 and data and address strobe line 2222. Lines 2224 provide appropriate bus control signals from, the bus arbiter 2200 to external devices, now shown. An external address latch 2226 is connected to bus 2220 and data and address strobe line 2222. The address latch 2226 is shared by the microprocessors 2100. The BUS REQ, BUS GNT and BUS LOCK signals allow more than one microprocessor 2100 to share a common bus 2220. The BUS REQ signal is low at the beginning of every cycle in which the bus is required to so indicate. The BUS GNT signal is used to halt a microprocessor 2100 should the bus be unavailable. The BUS LOCK signal indicates that a current memory cycle and the following memory cycle from the microprocessor 2100 supplying the signal must not be interrupted by a memory cycle for another microprocessor 2100. The BUS LOCK signal has two purposes. One purpose is to prevent the external memory address latch 2226 from being overwritten during those instructions which rely on the address remaining in this register. The other purpose is to provide a method of synchronizing separate software tasks using a standard semaphore system. The bus arbiter 2200 determines which processor has access to the bus 2220.

When embodied in a $T^2L$ and $I^3L$ bipolar integrated circuit, a microprocessor system in accordance with this invention provides significant speed and performance advantages over prior art microprocessor systems. The performance advantages of this invention are summarized in the following Table II, which compares the performance characteristics of the invention against five commercially available microprocessors, each identified by their product type number. The results show that the invention has significant speed advantages in all categories of operations over any of the prior art microprocessor systems. As a result, the system of this invention should materially increase the utilization of microprocessors in environments where high performance is required.

TABLE II

|  | % Mix | Base execution times in microseconds (μs) at nominal clock speeds | | | | | |
|---|---|---|---|---|---|---|---|
|  |  | Inv. | 68000 | 8086 | Z8000 | 9900 | 9440 |
| CPU operations |  |  |  |  |  |  |  |
| ALU instructions |  | 0.3 | 0.5 | 0.38 | 1 | 3.36 | 1.25 |
| Hardware multiply |  | 3.5 | 8.75 | 15.5 | 17.25 | 12.5 |  |
| Hardware divide |  | 5.7 | 17.75 | 19.4 | 25 | 25.9 |  |
| Memory operations |  |  |  |  |  |  |  |
| Load, Store |  | 0.6 | 1.75 | 1.9 | 2.5 | 5.28 | 3.08 |
| Test and Branch |  | 0.6 | 1.75 | 1 | 1.5 | 2.4 | 3.66 |
| I/O control operations |  | 0.8 | 1.25 | 1.25 | 2.25 | 2.88 | 2.08 |
| Instructions |  |  |  |  |  |  |  |
| ALU | 25 | 7.5 | 12.5 | 9.5 | 25 | 84 | 31.3 |
| MPY | 6 | 21 | 52.5 | 93 | 103.5 | 75 | 396.6 |
| DIV | 1.5 | 8.6 | 26.6 | 29.1 | 37.5 | 38.9 | 168.8 |
| Load, Store | 35 | 21 | 61.3 | 66.5 | 87.5 | 184.8 | 107.8 |
| Test and Branch | 30 | 18 | 52.5 | 30 | 45 | 72 | 109.8 |
| I/O control | 2.5 | 2 | 3.1 | 3.1 | 5.6 | 7.2 | 7 |
| Total | 100% | 78.1 | 208 | 231.6 | 303.6 | 461.9 | 823.3 |
| Normalization |  | 1 | 2.66 | 3 | 3.89 | 5.91 | 10.5 |

It should now be apparent to those skilled in the art that a microprocessor system capable of achieving the objects of the invention has been provided. The system overlaps address and ALU operations to speed-up execution. Repetitive instructions involving shifts of 32 bits are executed very rapidly, due to the novel register file in the system. An internal counter is linked to the data path to increase efficiency of execution of certain instructions. The bus register is provided as two 8-bit registers with separate control to allow very fast byte instructions. A system self-test feature can be initiated from the console of a system incorporating the microprocessor system, to allow quick test of microprocessor system operation. Data and program protection is provided through provision of an ABORT function. Floating point arithmetic operations can be carried out very rapidly in the system.

It should be further be apparent to those skilled in the art that various changes in form and details of the invention as shown and described above may be made. It is intended tht such changes be included within the spirit and scope of the claims appended hereto.

What is claimed is:

1. A microprocessor for facilitating the execution of instructions which require repetitive shift and arithmetic logic unit operations comprising:

an arithmetic logic unit having a first and a second input and an output;
a plurality of register means, at least one of which is a bi-directionally shifting register means; and
means for selectively coupling each of said plurality of register means to said first and said second inputs and said output of said arithmetic logic unit.

2. The microprocessor of claim 1 comprising:
means for repeating an arithmetic logic unit operation and a bi-directionally shifting register means operation and wherein at least one other of said plurality of register means comprises a counting means; and
means coupled to said counting means for controlling the number of repetitions of said arithmetic logic unit operation and said bi-directionally shifting register means operation.

3. The microprocessor of claim 2 comprising:
a shifter; and
means for coupling said shifter to said output of said arithmetic logic unit and to an input of said plurality of register means.